(12) United States Patent
Fleming et al.

(10) Patent No.: US 12,514,939 B2
(45) Date of Patent: Jan. 6, 2026

(54) STABLE RADIOPHARMACEUTICAL COMPOSITIONS AND USES THEREOF

(71) Applicant: ALPHA-9 ONCOLOGY INC., Vancouver (CA)

(72) Inventors: Alison Fleming, Mansfield, MA (US); Megan Bumgarner, Boston, MA (US); Thomas Kostelnik, Vancouver (CA); Imma Carbo-Bague, Vancouver (CA); Julie Rousseau, Vancouver (CA); Chengcheng Zhang, Vancouver (CA); Kaveh Matinkhoo, Vancouver (CA); Jutta Wanner, Vancouver (CA); Mark Dornan, Toronto (CA)

(73) Assignee: ALPHA-9 ONCOLOGY, INC., Vancouver (CA)

( * ) Notice: Subject to any disclaimer, the term of this patent is extended or adjusted under 35 U.S.C. 154(b) by 0 days.

(21) Appl. No.: 19/056,537

(22) Filed: Feb. 18, 2025

(65) Prior Publication Data

US 2025/0255993 A1 Aug. 14, 2025

Related U.S. Application Data

(63) Continuation of application No. PCT/CA2025/050197, filed on Feb. 14, 2025.

(60) Provisional application No. 63/553,569, filed on Feb. 14, 2024, provisional application No. 63/663,556, filed on Jun. 24, 2024, provisional application No. 63/663,561, filed on Jun. 24, 2024.

(51) Int. Cl.
| | |
|---|---|
| *A61K 51/08* | (2006.01) |
| *A61K 9/08* | (2006.01) |
| *A61K 47/10* | (2017.01) |
| *A61K 47/12* | (2006.01) |
| *A61K 47/18* | (2017.01) |
| *A61K 47/22* | (2006.01) |

(52) U.S. Cl.
CPC ............ *A61K 51/088* (2013.01); *A61K 9/08* (2013.01); *A61K 47/10* (2013.01); *A61K 47/12* (2013.01); *A61K 47/183* (2013.01); *A61K 47/22* (2013.01); *A61K 51/083* (2013.01); *A61K 2121/00* (2013.01)

(58) Field of Classification Search
CPC ........ A61K 51/00; A61K 5/08; A61K 51/088; A61K 9/00; A61K 9/08; A61K 47/00; A61K 47/10; A61K 47/12; A61K 47/183; A61K 47/22; A61K 51/083; A61K 2121/00
See application file for complete search history.

(56) References Cited

U.S. PATENT DOCUMENTS

| | | | |
|---|---|---|---|
| 5,384,113 A * | 1/1995 | Deutsch | ............ A61K 51/083 424/1.49 |
| 10,149,911 B2 | 12/2018 | Honda et al. | |
| 11,279,698 B2 | 3/2022 | Babich et al. | |
| 11,351,276 B2 | 6/2022 | Riddoch et al. | |
| 11,439,714 B2 | 9/2022 | McCann et al. | |
| 11,471,543 B2 | 10/2022 | Sohi et al. | |
| 11,491,246 B2 | 11/2022 | McCann | |
| 11,857,647 B2 | 1/2024 | Prasad et al. | |
| 11,998,620 B2 | 6/2024 | Basilion et al. | |
| 12,030,500 B2 | 7/2024 | Kanoh et al. | |
| 12,303,592 B2 | 5/2025 | Shah et al. | |
| 12,337,199 B2 | 6/2025 | Cao et al. | |
| 2019/0336623 A1 | 11/2019 | Tworowska et al. | |
| 2023/0011134 A1 | 1/2023 | Salter et al. | |
| 2025/0000908 A1 | 1/2025 | Moskowitz et al. | |
| 2025/0160354 A1 | 5/2025 | Schinkel et al. | |

FOREIGN PATENT DOCUMENTS

| | | | |
|---|---|---|---|
| WO | WO-2021168567 A1 * | 9/2021 | ........... A61K 51/044 |
| WO | 2022-082312 A1 | 4/2022 | |
| WO | 2023/191839 A2 | 10/2023 | |

OTHER PUBLICATIONS

Wharton et al, Molecules, vol. 28, No. 3155, 16 pages (Year: 2023).*
Gentile et al, BioPharm International (www.biopharminternational.com), pp. 36-42 (Year: 2017).*
Ingham et al, 2022 NETRF Symposium Poster Abstracts, "Preclinical toxicity and therapy study of 225Ac-crown-TATE", pp. 1-22 , especially, pp. 21-22 (Year: 2022).*
Wharton, "Preclinical evaluation of MC1R targeting theranostic pair [155Tb]Tb-crown-αMSH and [161Tb]Tb-crown-αMSH", Nuclear Medicine and Biology, vols. 136-137, Sep.-Oct. 2024, 108925.
Yang, "Synthesis and Evaluation of a New Macrocyclic Actinium-225 Chelator, Quality Control and in Vivo Evaluation of 225Ac-crown-αMSH Peptide", Chem. Eur. J., 10.1002/chem.202002999 (2020).
Authelin, Jean-Rene, et al., "Freezing of Biologicals Revisited: Scale, Stability, Excipients, and Degradation Stresses", Journal of Pharmaceutical Sciences, 09 (2020) 44-61.
Shalaev, Evgenyi, "Freezing of Aqueous Solutions and Chemical Stability of Amorphous Pharmaceuticals: Water Clusters Hypothesis", Journal of Pharmaceutical Sciences 108 (2019) 36-49.

(Continued)

*Primary Examiner* — D. L. Jones
(74) *Attorney, Agent, or Firm* — Bryan Cave Leighton Paisner LLP

(57) ABSTRACT

Stabilized radiopharmaceutical formulations or dosage forms comprising radiolabeled conjugates of formula RC-L-TM are disclosed. Methods of making and using stabilized radiopharmaceutical formulations or dosage forms comprising the radiolabeled conjugates are also disclosed, including the preparation and stabilization of targeted radiodiagnostic and radiotherapeutic compounds comprising the radiolabeled conjugate.

18 Claims, 8 Drawing Sheets

Specification includes a Sequence Listing.

(56) References Cited

OTHER PUBLICATIONS

Vetrakova et al., "Comparing the acidities of aqueous, frozen, and freeze-dried phosphate buffers: Is there a "pH memory" effect?", International Journal of Pharmaceutics, 530: 316-325 (2017).
Benet et al., "The Effects of pH and Excipients on Exenatide Stability in Solution", Pharmaceutics 2021, 13(8), 1263.

* cited by examiner

Experiment 1 (6 d, RT)

RCP = 61%

Experiment 1 (6 d, -20°C)

RCP = 96%

*Experiment 2 (5 d, -20°C)

200 mM ascorbate
5 mM gentisic acid

RCP = 93%

Experiment 2 (5 d, -20°C)

200 mM ascorbate
0 mM gentisic acid

RCP > 99%

STABLE RADIOPHARMACEUTICAL COMPOSITIONS AND USES THEREOF

CROSS REFERENCE TO RELATED APPLICATIONS

The present application is a continuation of PCT international application no. PCT/CA2025/050197, filed on Feb. 14, 2025, which claims benefit to U.S. Provisional Application No. 63/553,569, filed Feb. 14, 2024, U.S. Provisional Application No. 63/663,556, filed Jun. 24, 2024, and U.S. Provisional Application No. 63/663,561, filed Jun. 24, 2024. The entire contents of the above applications are incorporated by reference as if recited in full herein.

FIELD

The present disclosure relates to formulations of certain radiolabeled compounds for in vivo imaging or treatment of diseases or conditions.

INCORPORATION BY REFERENCE OF SEQUENCE LISTING

This application contains references to amino acids and/or nucleic acid sequences that have been filed concurrently herewith as sequence listing XML file "A9OC-030-seq.xml", file size of 9,635 bytes, created on Feb. 11, 2025. The aforementioned sequence listing is hereby incorporated by reference in its entirety pursuant to 37 C.F.R. § 1.52(e)(5).

BACKGROUND

Radioligand therapy (RLT) has shown clinical efficacy in treating diseases, including cancers, that express molecular targets on the cell membrane of diseased tissues. The major radionuclides used in RLT are beta emitting radionuclides, including lutetium-177, yttrium-90, and strontium-89. For example, $^{177}$Lu-dotatate, a lutetium-177 labeled compound targeting somatostatin receptors (SSTR), was approved by the Food and Drug Administration (FDA) for treating patients with SSTR-positive neuroendocrine tumors.

The use of alpha emitters for cancer therapy has two distinct advantages over beta emitter therapies. The short range of alpha radiation in human tissue corresponding to only a few cell diameters (<0.1 mm) allows the selective killing of targeted cancer cells while potentially sparing surrounding healthy tissue. At the same time, the high energy of alpha radiation of several MeV and its associated high linear energy transfer leads to highly effective cell killing via DNA double strand and DNA cluster breaks, which are largely independent of cell cycle and oxygenation status. Of the alpha emitters, by far most clinical experience is available with $^{225}$Ac (T1/2=9.9 d) and its short-lived daughter nuclide $^{213}$Bi (T1/2=46 min).

DOTA, with the structure shown below in Formula 1, has been studied for attaching radionuclides (e.g., $^{225}$Ac) to peptides, antibodies and other targeting molecules.

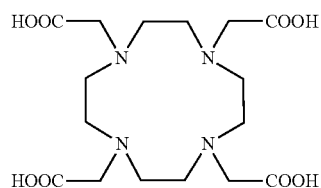

Formula 1

DOTA, however, is known to have decreased thermodynamic stability towards larger metal ions, and its chelation to $^{225}$Ac is relatively slow, among other issues.

To address the shortcomings of DOTA, Yang et al., US2023/0270892A1 disclose 2,2',2'',2'''-(1,10-dioxa-4,7,13,16-tetraazacyclooctadecane-4,7,13,16-tetrayl)tetraacetic acid (corresponding to Formula 2 below and also known as "CROWN") as a chelator for chelating radionuclides.

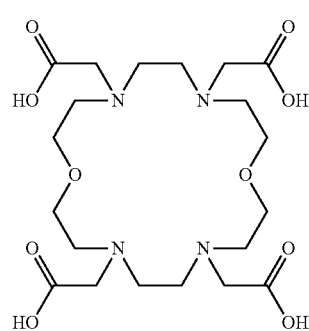

Formula 2

More specifically, Yang et al. disclose coupling the chelator to a biological targeting moiety such as Tyr$^3$-octreotate ("TATE") to facilitate targeted delivery of the chelated radionuclide in a mammalian subject.

Ingham et al., in preclinical evaluation of $^{225}$Ac-CROWN-TATE—an alpha-emitting radiopharmaceutical for neuroendocrine tumors, *J. Nucl Med*, vol 64, Issue supplement 1 (June 2023), reported that a peptide receptor radionuclide therapy using $^{225}$Ac-CROWN-TATE (Formula 3) shows promise in that it slows tumor growth in mice bearing AR42J tumor xenografts.

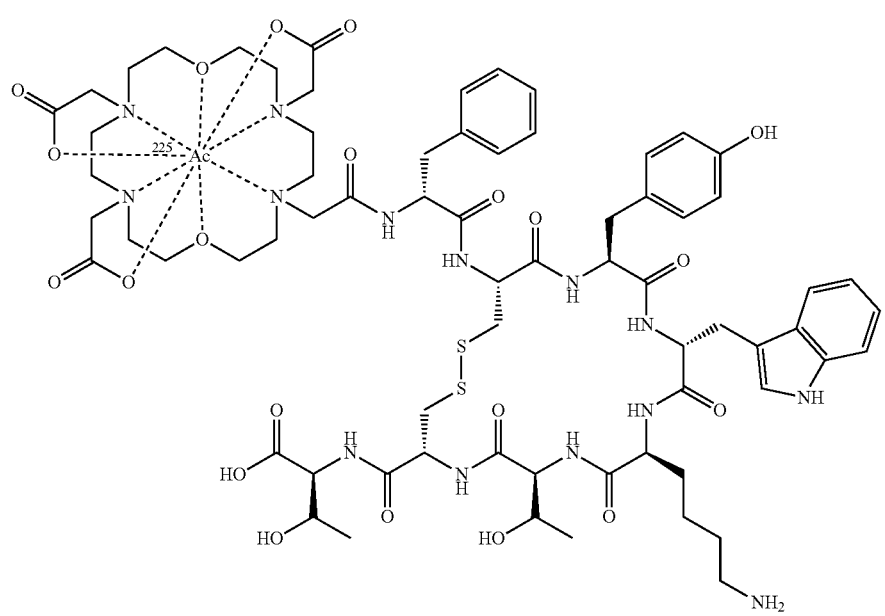

Formula 3

While the CROWN chelator offers many significant advantages over more traditional chelators such as DOTA, ensuring the stability of the metal-CROWN complex may be challenging due to the potential for the complex to dissociate in a solution. Yang et al. have reported significant dissociation over time in a solution due to trans-metalation when La(NO3)3 was added in 5-fold molar excess to the a solution containing a $^{225}$Ac-complexed ligand via CROWN. Significant dissociation was also reported in the presence of the competing free metal scavenger DTPA over a period of 7 hours. (Yang et al., Chem. Eur. J. 2020, 26, 11435-11440, Supporting Information) Trans-metalation and release of free $^{225}$Ac in solution is challenging when considering that $^{225}$Ac patient doses are generally manufactured centrally and shipped to the location of administration. Commercial radiotherapies have shelf-lives on the order of 3 to 5 days. Radiolytic degradation is another major factor affecting the shelf life of therapeutic radiopharmaceuticals.

The development of time-stable dosage forms of radiopharmaceuticals comprising the CROWN chelator is the key to the successful implementation of radiolabeled conjugates comprising this chelator in clinical practice. There remains a need for stable radiopharmaceutical compositions or stable dosage forms of radiopharmaceuticals that comprise CROWN-based radioligands.

SUMMARY

The present disclosure relates generally to formulations of certain radiolabeled compounds comprising the CROWN chelator. The formulations disclosed herein are unexpectedly stable for a sufficient amount of time so they are suitable for medical imaging and/or treatment of diseases or conditions.

In one aspect, this disclosure covers a radiopharmaceutical composition comprising a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

Formula I where * and  designate possible points of attachment of the chelator to L, and when the chelator is attached to L at the point designated by , the point designated by * represents the group —OH;

wherein the radiopharmaceutical composition is an aqueous formulation having a pH value in the range of 5-8 and optionally comprises one or more stabilizing agents, and wherein the radiopharmaceutical composition has a radiochemical purity (RCP) of at least 90% after 120 hours of storage at or below room temperature as determined by radio-TLC, iTLC, or HPLC.

In another aspect, this disclosure covers a dosage form comprising a pharmaceutically acceptable frozen aqueous composition for intravenous administration post thaw, the frozen aqueous composition comprising:

a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

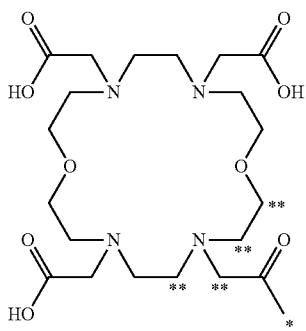

Formula I where * and  designate possible points of attachment of the chelator to L, and when the chelator is attached to L at the point designated by , the point designated by * represents the group —OH; and a pH buffer, wherein the frozen aqueous composition has a pH value in the range of 5-8 upon thawing.

In still another aspect, this disclosure covers a dosage form comprising a pharmaceutically acceptable liquid aqueous composition for intravenous administration, the aqueous composition comprising a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

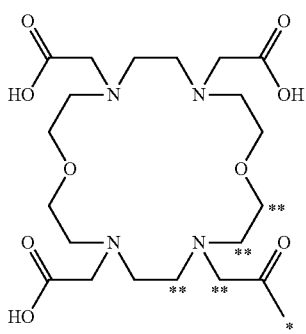

Formula I where * and  designate possible points of attachment of the chelator to L, and when the chelator is attached to L at the point designated by , the point designated by * represents the group —OH; and a pH buffer, wherein the liquid aqueous composition has a pH value of at least 5.5, and wherein the aqueous composition has a radiochemical purity (RCP) of at least 90% after 5 days storage at a temperature below 20° C., as determined by radio-TLC, iTLC, or HPLC.

In still another aspect, this disclosure covers a method of preparing a radiopharmaceutical composition for intravenous administration, wherein the method comprises:

(a) producing a pharmaceutically acceptable frozen aqueous composition, the frozen aqueous composition comprising:

a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

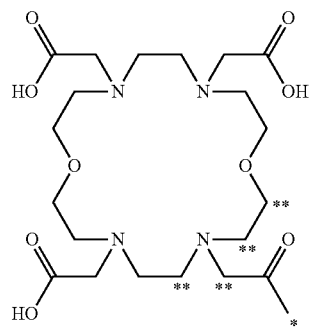

Formula I where * and  designate possible points of attachment of the chelator to L, and when the chelator is attached to L at the point designated by , the point designated by * represents the group —OH; and a pH buffer, (b) thawing the pharmaceutically acceptable frozen aqueous composition to form a radiopharmaceutical composition for intravenous administration, wherein the thawed composition has a pH value in the range of 5-8.

Still within the scope of this disclosure is a method of treating a disease (e.g., cancer) in a subject, wherein the method comprises administering to the subject in need thereof a therapeutically effective amount of a radiopharmaceutical composition or a dosage form described throughout this disclosure.

Also covered by this disclosure is a method of treating a disease (e.g., cancer) in a subject, wherein the method comprises:

(a) thawing a pharmaceutically acceptable frozen aqueous composition to form an aqueous composition, wherein the aqueous composition has a pH value in the range of 5-8 and comprises a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

Formula I where * and  designate possible points of attachment of the chelator to L, and when the chelator is attached to L at the point designated by , the point designated by * represents the group —OH; and (b) administering to the subject in need thereof a therapeutically effective amount of the aqueous composition.

Further aspects of the invention will become apparent from consideration of the ensuing description of preferred embodiments of this invention. A person skilled in the art will realize that other embodiments of the invention are possible and that the details of the invention can be modified in a number of respects, all without departing from the inventive concept. Thus, the following descriptions and examples are to be regarded as illustrative in nature and not restrictive.

DETAILED DESCRIPTION

Figure 1A:
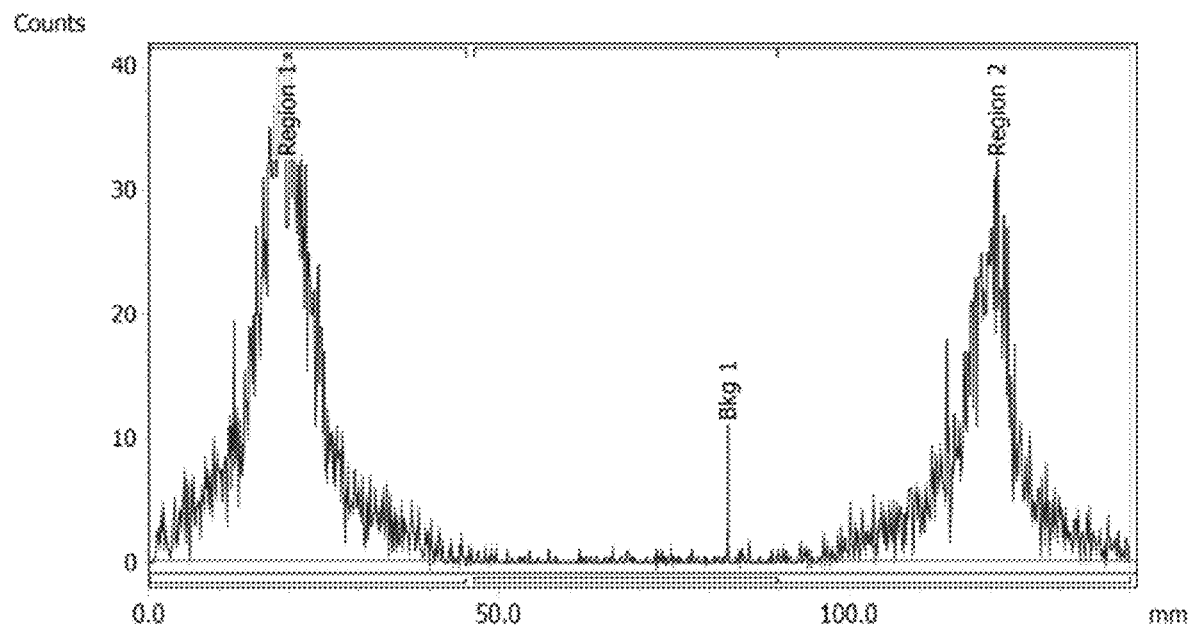
FIGS. 1A-1B show TLC data for $^{225}$Ac-radiolabeled CROWN-TATE formulations, comparing a formulation stored at room temperature (RT) for 6 days (A) with a formulation stored at −20° C. for 6 days (B), as described in Example 1 below.

The present disclosure provides formulations of CROWN-based radiopharmaceuticals and associated storage conditions that ensure the overall radiochemical purity of the radiopharmaceutical composition remains within an acceptable range from the time of manufacture to the time of administration in a patient. Radiochemical purity (RCP) is defined as the proportion of the total radioactivity in the sample which is present as the desired radiolabeled species. Radioactive impurities include chemical species that have degraded (generally due to radiolysis) and radionuclide that has dissociated from the chelator. Ensuring high radiochemical purity (e.g., greater than 85%, greater than 90%, greater than 95%, or even greater than 98%) requires controlling the level of degradation of the radiolabeled conjugate, as well as controlling the dissociation of the radionuclide from the chelator. For CROWN-based radiolabeled conjugates, dissociation can occur if formulation excipients are capable of chelating the radionuclide in solution, and also in the presence of cold metal contaminants that may be present in formulation excipients.

Among the aspects of the present disclosure is the provision of unique pH ranges of the formulations and optional stabilizers or stabilizer combinations that slow or inhibit radiolytic damage to targeted radiotherapeutic and radiodiagnostic compounds that have CROWN as a chelator, and thus preserve the targeting ability and specificity of the compounds. Another aspect of the present disclosure is the provision of storage conditions (e.g., storage temperature) for radiopharmaceutical formulations to reduce dissociation of the radionuclide from the CROWN chelator in formulations containing other chelators or excipients that introduce low levels of free metal contaminants.

Definitions

As used herein, the terms "comprising" (and related terms such as "comprise" or "comprises" or "having" or "including" or "containing") and grammatical variations thereof, are inclusive or open-ended and do not exclude additional, unrecited elements and/or method steps, even if a feature/component defined as a part thereof consists or consists essentially of specified feature(s)/component(s). The term "consisting essentially of" if used herein in connection with a compound, composition, use or method, denotes that additional elements and/or method steps may be present, but that these additions do not materially affect the manner in which the recited compound, composition, method or use functions. The term "consisting of" if used herein in connection with a feature of a composition, use or method, excludes the presence of additional elements and/or method steps in that feature. A compound, composition, use or method described herein as comprising certain elements and/or steps may also, in certain embodiments consist essentially of those elements and/or steps, and in other embodiments consist of those elements and/or steps, whether or not these embodiments are specifically referred to. A use or method described herein as comprising certain elements and/or steps may also, in certain embodiments consist essentially of those elements and/or steps, and in other embodiments consist of those elements and/or steps, whether or not these embodiments are specifically referred to.

As used herein, the singular forms "a," "an," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth. When ranges are used herein for physical properties, such as molecular weight, or chemical properties, such as chemical formulae, all combinations and subcombinations of ranges and specific embodiments therein are intended to be included.

The term "about" or "approximately" can mean within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 15%, up to 10%, up to 5%, or up to 1% of a given value. Alternatively, particularly with respect to biological systems or processes, the term can mean within an order of magnitude, within 5-fold, or within 2-fold, of a value.

As used herein, the recitation of numerical ranges by endpoints includes all numbers subsumed within that range including all whole numbers, all integers and, where suitable, all fractional intermediates (e.g., 1 to 5 may include 1, 1.5, 2, 2.75, 3, 3.80, 4, and 5 etc.).

As used herein, "certain embodiments", "various embodiments", "some embodiments", "an embodiment" and similar terms includes the particular feature(s) described for that embodiment either alone or in combination with any other embodiment or embodiments described herein, whether or not the other embodiments are directly or indirectly referenced and regardless of whether the feature or embodiment is described in the context of a method, product, use, composition, compound, et cetera.

The term "optional" or "optionally" means that the subsequently described event or circumstance may or may not occur, and that the description includes instances where said event or circumstance occurs and instances in which it does not.

The terms "treat," "prevent," "ameliorate," and "inhibit," as well as words stemming therefrom, as used herein, do not necessarily imply 100% or complete treatment, prevention, amelioration, or inhibition. Rather, there are varying degrees of treatment, prevention, amelioration, and inhibition of which one of ordinary skill in the art recognizes as having a potential benefit or therapeutic effect. In this respect, the disclosed methods can provide any amount of any level of treatment, prevention, amelioration, or inhibition of the disorder in a mammal. For example, a disorder, including symptoms or conditions thereof, may be reduced by, for example, about 100%, about 90%, about 80%, about 70%, about 60%, about 50%, about 40%, about 30%, about 20%, or about 10%. Furthermore, the treatment, prevention, amelioration, or inhibition provided by the methods disclosed herein can include treatment, prevention, amelioration, or inhibition of one or more conditions or symptoms of the disorder, e.g., cancer or an inflammatory disease. Also, for purposes herein, "treatment," "prevention," "amelioration," or "inhibition" encompass delaying the onset of the disorder, or a symptom or condition thereof. As used herein, "treating" includes the concepts of "alleviating", which refers to lessening the frequency of occurrence or recurrence, or the severity, of any symptoms or other ill effects related to a disorder and/or the associated side effects. The term "treating" also encompasses the concept of "managing" which refers to reducing the severity of a particular disease or disorder in a patient or delaying its recurrence, e.g., lengthening the period of remission in a patient who had suffered from the disease.

As used herein, the term "diagnostic agent" includes an "imaging agent". As such, a "diagnostic radiometal" includes radiometals that are suitable for use as imaging agents.

As used herein, the term "imaging" includes positron emission tomography (PET) imaging, single-photon emission computerized tomography (SPECT) imaging, or other medical imaging technologies and/or methods that use radionuclides for such imaging.

The term "subject" refers to an animal (e.g. a mammal or a non-mammal animal). The subject may be a human or a non-human primate. The subject may be a laboratory mammal (e.g., mouse, rat, rabbit, hamster and the like). The subject may be an agricultural animal (e.g. equine, ovine, bovine, porcine, camelid and the like) or a domestic animal (e.g. canine, feline and the like). In some embodiments, the subject is a human.

The terms "radiolabeled conjugate" and "radiolabeled compound," as used herein, are used interchangeably herein to refer to radiolabeled conjugates of the formula RC-L-TM, or a derivative or salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

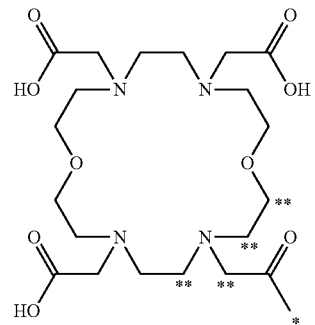

Formula I where * and  designate possible points of attachment of the chelator to L, and when the chelator is attached to L at the point designated by , the point designated by * represents the group —OH. For example, a radiolabeled conjugate may be CROWN-L-TATE, wherein L is bond or a linker, or derivatives or salts thereof, in which a radionuclide is bonded to the CROWN moiety via two or more separate coordinate bonds.

As used herein, the term "cellular antigen binding moiety" refers to a chemical moiety that specifically binds to an antigen on cell surface or to an intracellular antigen. The cellular antigen binding moiety may bind to antigens including any of proteins, peptides, carbohydrates, nucleic acids, fatty acids, or derivatives thereof, located on the cell surface, transmembrane, or intracellularly.

The term "moiety" refers to a specific segment or functional group of a molecule. Chemical moieties are often recognized chemical entities embedded in or appended to a molecule.

The compounds disclosed herein may also include base-free forms, salts, solvates, or pharmaceutically acceptable salts thereof. Unless otherwise specified, the compounds claimed and described herein are meant to include all racemic mixtures and all individual enantiomers or combinations thereof, whether or not they are explicitly represented herein.

The compounds disclosed herein may be shown as having one or more charged groups, may be shown with ionizable groups in an uncharged (e.g. protonated) state or may be shown without specifying formal charges. As will be appreciated by the person of skill in the art, the ionization state of certain groups within a compound (e.g., without limitation, $CO_2H$, $PO_3H_2$, $SO_2H$, $SO_3H$, $SO_4H$, $OPO_3H_2$ and the like) is dependent, inter alia, on the pKa of that group and the pH at that location. For example, but without limitation, a carboxylic acid group (i.e. COOH) would be understood to usually be deprotonated (and negatively charged) at neutral pH and at most physiological pH values, unless the protonated state is stabilized. Likewise, $OSO_3H$ (i.e. $SO_4H$) groups, $SO_2H$ groups, $SO_3H$ groups, $OPO_3H_2$ (i.e. $PO_4H_2$)

groups and PO₃H groups would generally be deprotonated (and negatively charged) at neutral and physiological pH values.

As used herein, the terms "salt" and "solvate" have their usual meaning in chemistry. As such, when the compound is a salt or solvate, it is associated with a suitable counter-ion. It is well known in the art how to prepare salts or to exchange counter-ions. Generally, such salts can be prepared by reacting free acid forms of these compounds with a stoichiometric amount of a suitable base (e.g. without limitation, Na, Ca, Mg, or K hydroxide, carbonate, bicarbonate, or the like), or by reacting free base forms of these compounds with a stoichiometric amount of a suitable acid. Such reactions are generally carried out in water or in an organic solvent, or in a mixture of the two. Counter-ions may be changed, for example, by ion-exchange techniques such as ion-exchange chromatography. All zwitterions, salts, solvates and counter-ions are intended, unless a particular form is specifically indicated.

The terms "TATE" and "[Tyr³]octreotate" are used interchangeably herein to refer to the amino acid sequence D-Phe-c[Cys-Tyr-D-Trp-Lys-Thr-Cys]-Thr or D-Phe¹-cyclo(Cys²-Tyr³-D-Trp⁴-Lys⁵-Thr⁶-Cys⁷)-Thr⁸.

The term "unlabeled conjugate" as used herein refers to a conjugate of formula C-L-TM wherein TM is a cellular antigen binding moiety, L is a bond or a linker, and C is a chelator without including a radionuclide.

The term "CROWN-L-TATE" as used herein corresponds to Formula 4 below, as well as derivatives and salts thereof, More generally, with respect to any pharmaceutical composition disclosed herein, non-limiting examples of suitable excipients include any suitable buffers, stabilizing agents, salts, antioxidants, complexing agents, tonicity agents, cryoprotectants, lyoprotectants, suspending agents, emulsifying agents, antimicrobial agents, preservatives, chelating agents, binding agents, surfactants, wetting agents, non-aqueous vehicles such as fixed oils, or polymers for sustained or controlled release. See, for example, Berge et al. 1977. (*J. Pharm Sci.* 66:1-19), or Remington—The Science and Practice of Pharmacy, 21st edition (Gennaro et al editors. Lippincott Williams & Wilkins Philadelphia), each of which is incorporated by reference in its entirety.

With regard to stereoisomers, it should be understood that a solid line designation for the bonds in the compositions corresponding to the structural formulae disclosed herein for attachment of a substituent group to a chiral carbon atom of the compound indicates that these groups may lie either below or above the plane of the page (i.e., all isomeric forms of the compounds disclosed herein are contemplated, including racemates, racemic mixtures, and individual enantiomers or diastereomers).

Radiolabeled Conjugates

In one embodiment, the present disclosure is directed to a liquid aqueous composition (e.g., an aqueous composition) comprising a radiolabeled conjugate, a radiolysis stabilizing solution comprising a radiolysis stabilizer selected from gentisic acid or a salt thereof, ascorbic acid or a salt thereof, ethanol, or a combination thereof, dispersed in an aqueous Formula 4

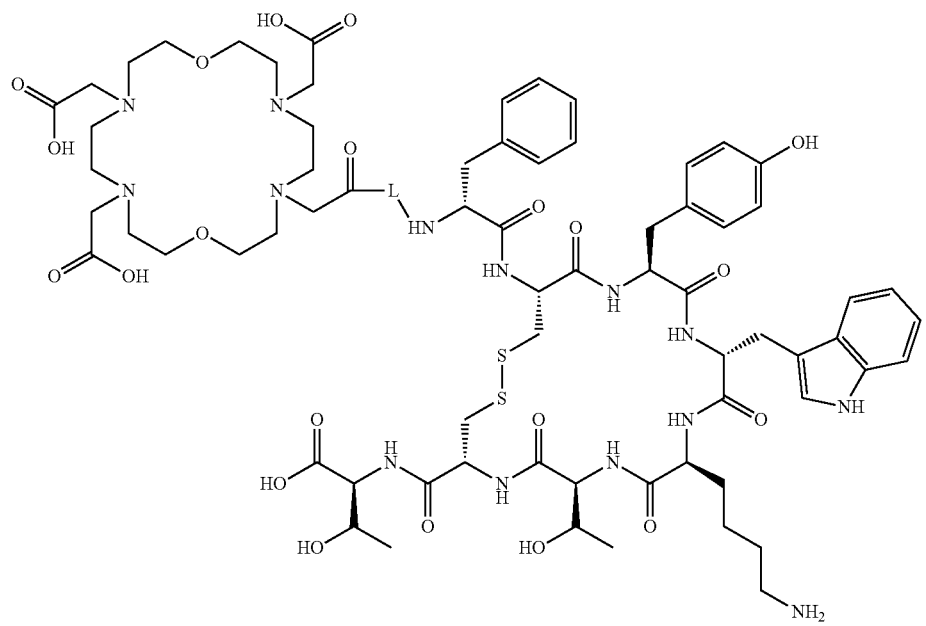

wherein L is a bond or a linker as otherwise defined herein.

The term "CROWN-TATE" as used herein corresponds to Formula 4, or derivatives or salts thereof, wherein L is a bond.

In certain embodiments, the salt or counter-ion may be pharmaceutically acceptable for administration to a subject.

vehicle, the radiolabeled conjugate having the formula RC-L-TM, or a derivative or salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

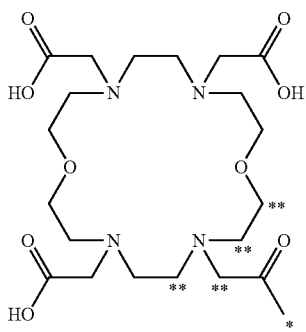

Formula I where * and  designate possible points of attachment of the chelator to L, and when the chelator is attached to L at the point designated by , the point designated by * represents the group —OH. In certain embodiments, TM is a somatostatin receptor (SSTR) binding moiety corresponding to those listed in Table 1, such as TATE ([Tyr³]octreotate), or a salt or derivative thereof.

TABLE 1

SSTR-binding moieties and amino acid sequences

| SEQ ID NO | NAME | SEQUENCE |
|---|---|---|
| 1 | octreotate | d-Phe-c[Cys-Phe-d-Trp-Lys-Thr-Cys]-Thr |
| 2 | [Tyr³]octreotate | d-Phe-c[Cys-Tyr-d-Trp-Lys-Thr-Cys]-Thr |
| 3 | octreotide | d-Phe-c[Cys-Phe-d-Trp-Lys-Thr-Cys]-Thr-ol |
| 4 | [Tyr³]octreotide | d-Phe-c[Cys-Tyr-d-Trp-Lys-Thr-Cys]-Thr-ol |
| 5 | [1-Nal³]-octreotide | d-Phe-c[Cys-1-Nal-d-Trp-Lys-Thr-Cys]-Thr-ol |
| 6 | lanreotide | 2-Nal-c[Cys-Tyr-d-Trp-Lys-Val-Cys]-Thr-NH₂ |
| 7 | JR-11 | Cpa-c[d-Cys-Aph(Hor)-d-Aph(Cbm)-Lys-Thr-Cys]-d-Tyr-NH₂ |

TABLE 1-continued

SSTR-binding moieties and amino acid sequences

| SEQ ID NO | NAME | SEQUENCE |
|---|---|---|
| 8 | JR-10 | p-NO₂-Phe-c[d-Cys-Tyr-d-Aph(Cbm)-Lys-Thr-Cys]-d-Tyr-NH₂ |
| 9 | LM3 | p-Cl-Phe-c[d-Cys-Tyr-d-Aph(Cbm)-Lys-Thr-Cys]-d-Tyr-NH₂ |
| 10 | vapreotide | d-Phe-c[Cys-Tyr-d-Trp-Lys-Val-Cys]-Trp-NH₂ |

According to certain embodiments, the radiolabeled conjugate is prepared by radiolabeling an unlabeled conjugate having the formula C-L-TM, or a salt or derivative thereof, with a radionuclide $R^N$, wherein C is an unlabeled chelator corresponding to Formula I or a derivative thereof.

In some embodiments, the chelator in Formula I is attached at the attachment point designated by * to L, wherein L is a bond or a linker. A representative structure of relevant radiolabeled conjugates can correspond to Formula 5, or a derivative and/or a salt thereof, wherein L, TM, and $R^N$ are as defined above:

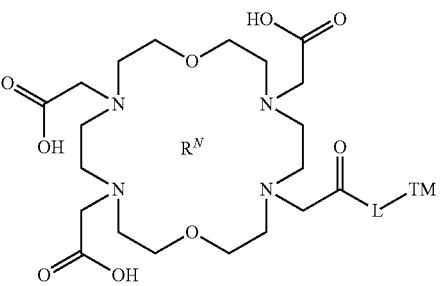

Formula 5

More specifically, in certain embodiments, the present disclosure is directed to a liquid aqueous composition comprising a radiolabeled conjugate, a radiolysis stabilizing solution comprising a radiolysis stabilizer selected from gentisic acid or a salt thereof, ascorbic acid or a salt thereof, ethanol, or a combination thereof, dispersed in an aqueous vehicle, wherein the radiolabeled conjugate corresponds to Formula 5a, or a derivative and/or a salt thereof:

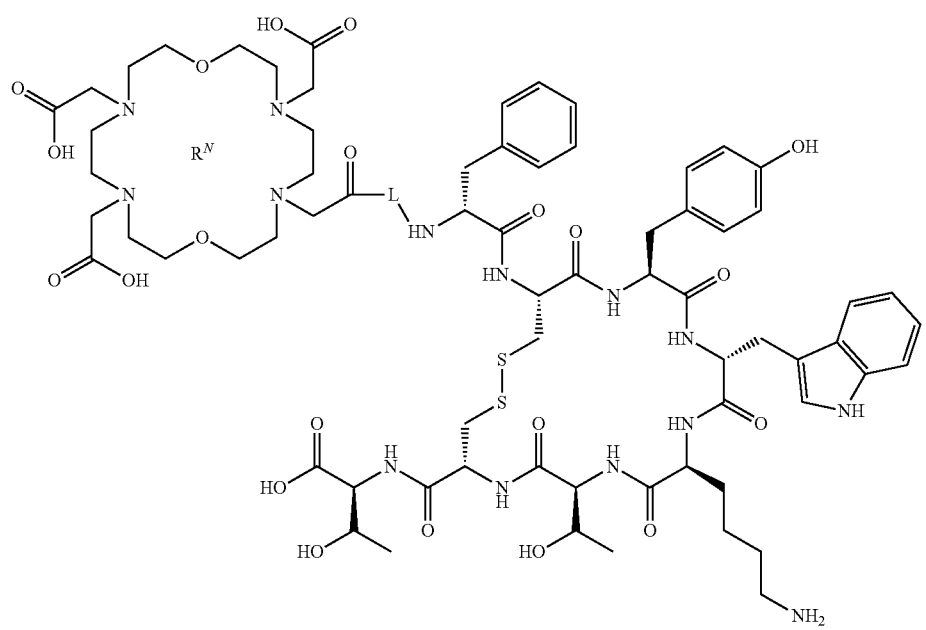

Formula 5a wherein L is a bond or a linker, TM is TM is a cellular antigen binding moiety, and $R^N$ is a radionuclide chelated by the radiolabeled conjugate.

In some embodiments, the chelator in Formula I is attached at the attachment point designated by ** to L, wherein the point designated by * represents the group —OH and L is a bond or a linker. A representative structure of relevant radiolabeled conjugates can correspond to Formula 6, Formula 6a, Formula 6b, Formula 6c, or a derivative and/or a salt thereof, wherein L, TM, and $R^N$ are as defined above:

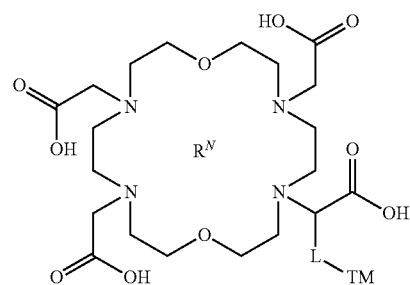

Formula 6

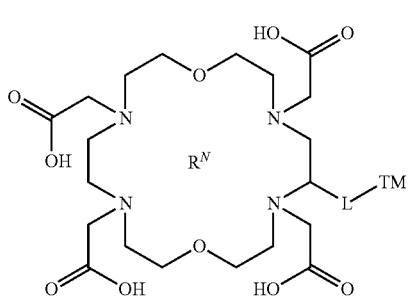

Formula 6a

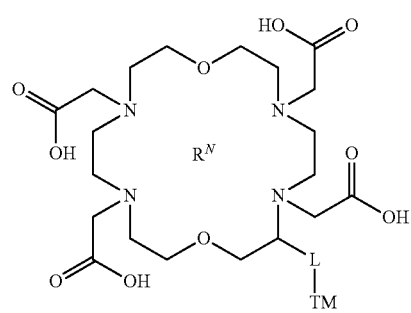

Formula 6b

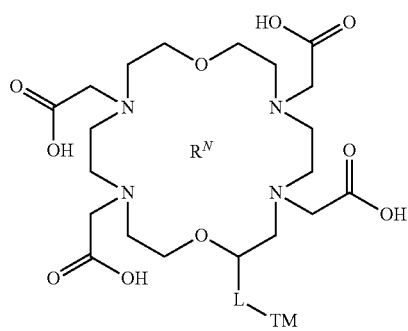

Formula 6c

In the case where L is a bond, the bond may be an amide bond, and/or may be a bond formed with the chelator via a carboxyl group, an ester group, an imide, a thioamide, a thioester, a guanidinium, an ether, a thioether, an amine, or the like.

According to one embodiment, the radiolabeled conjugate may correspond to Formula 7 below comprising CROWN-TATE, such as in a case where L is a bond:

Formula 7

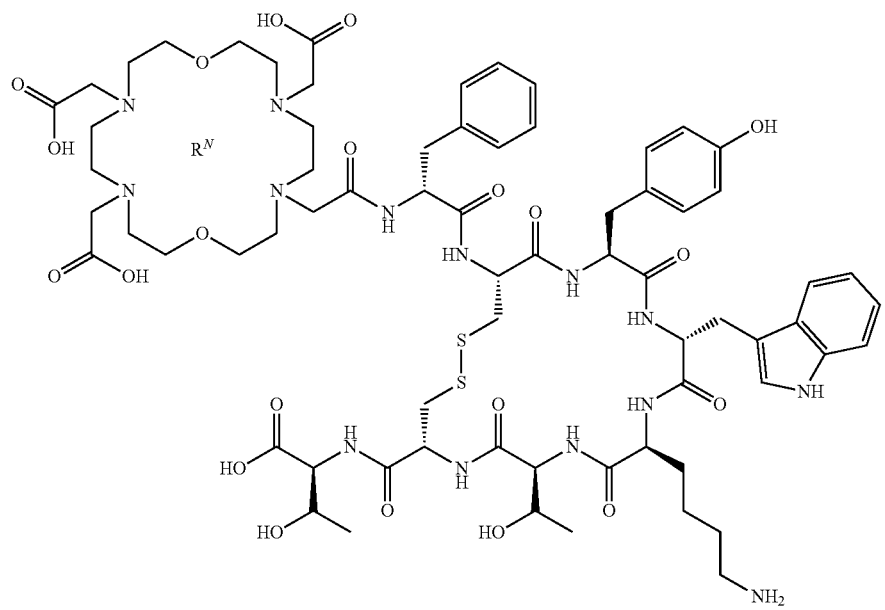

Radionuclides

In general, the radionuclide $R^N$ is a radioisotope appropriate for radiotherapy or radiodiagnostics. For example, in some embodiments, the radionuclide may be selected from the group consisting of $^{18}$F, $^{123}$I, $^{131}$I, $^{44}$Sc, $^{47}$Sc, $^{61}$Cu, $^{64}$Cu, $^{67}$Cu, $^{67}$Ga, $^{68}$Ga, $^{72}$As, $^{77}$As, $^{86}$Y, $^{89}$Y, $^{90}$Y, $^{89}$Zr, $^{90}$Nb, $^{94m}$Tc, $^{99m}$Tc, $^{105}$Rh, $^{109}$Pd, $^{111}$In, $^{114m}$In, $^{117m}$Sn, $^{137}$Cs, $^{141}$Cs, $^{140}$La, $^{141}$Ce, $^{142}$Pr, $^{143}$Pr, $^{145}$Pr, $^{149}$Pm, $^{149}$Tb, $^{152}$Tb, $^{155}$Tb, $^{161}$Tb, $^{150}$Eu, $^{153}$Sm, $^{159}$Gd, $^{161}$Ho, $^{166}$Ho, $^{165}$Er, $^{165}$Dy, $^{166}$Dy, $^{167}$Tm, $^{170}$Tm, $^{169}$Yb, $^{175}$Yb, $^{177}$Lu, $^{186}$Re, $^{188}$Re, $^{198}$Au, $^{199}$Au, $^{203}$Pb, $^{212}$Pb, $^{211}$At, $^{211}$Fr, $^{212}$Bi, $^{213}$Bi, $^{225}$Ac, $^{226}$Th, and $^{227}$Th. The exact radiolabel selected for incorporation into the radiolabeled chelator will be dependent on the nature of the chelating agent or chemical group present in the compound for radiolabel attachment and the intended use of the final compound. For example, $^{18}$F, $^{123}$I, $^{99m}$Tc, $^{111}$In, $^{68}$Ga, $^{64}$Cu, $^{89}$Zr, $^{90}$Y, $^{186}$Re, and $^{44}$Sc are suitable for PET and/or SPECT imaging, and $^{67}$Cu, $^{212}$Pb, $^{213}$Bi, $^{177}$Lu, $^{225}$Ac, and $^{188}$Re are suitable for radiotherapy applications.

In some embodiments, the radiolabeled conjugate comprises a radionuclide $R^N$ selected from the group consisting of $^{44}$Sc, $^{47}$Sc, $^{61}$Cu, $^{64}$Cu, $^{67}$Cu, $^{67}$Ga, $^{68}$Ga, $^{72}$As, $^{77}$As, $^{86}$Y, $^{89}$Y, $^{90}$Y, $^{89}$Zr, $^{90}$Nb, $^{94m}$Tc, $^{99m}$Tc, $^{105}$Rh, $^{109}$Pd, $^{111}$In, $^{114m}$In, $^{117m}$Sn, $^{137}$Cs, $^{141}$Cs, $^{140}$La, $^{141}$Ce, $^{142}$Pr, $^{143}$Pr, $^{145}$Pr, $^{149}$Pm, $^{149}$Tb, $^{152}$Tb, $^{155}$Tb, $^{161}$Tb, $^{150}$Eu, $^{153}$Sm, $^{159}$Gd, $^{161}$Ho, $^{166}$Ho, $^{165}$Er, $^{169}$Er, $^{165}$Dy, $^{166}$Dy, $^{167}$Tm, $^{170}$Tm, $^{169}$Yb, $^{175}$Yb, $^{177}$Lu, $^{186}$Re, $^{188}$Re, $^{198}$Au, $^{199}$Au, $^{203}$Pb, $^{212}$Pb, $^{211}$At, $^{211}$Fr, $^{212}$Bi, $^{213}$Bi, $^{225}$Ac, $^{226}$Th, and $^{227}$Th.

In certain embodiments, the radionuclide selected for incorporation into the radiolabeled conjugate is $^{67}$Cu, $^{149}$Tb, $^{161}$Tb, $^{177}$Lu, $^{212}$Pb, or $^{225}$Ac. In certain embodiments, the radionuclide selected for incorporation into the radiolabeled conjugate is $^{177}$Lu. In certain embodiments, the radionuclide selected for incorporation into the radiolabeled conjugate is $^{225}$Ac.

Linker

The terms "linker" and "linking group" are used synonymously herein to refer to any chemical group that serves to couple the cellular antigen binding moiety (TM) to the radiolabeled chelator (RC) or unlabeled chelator (C), while not adversely affecting either the targeting function of the cellular antigen binding moiety, or the radionuclide complexing function of the radiolabeled chelator. That is, the "linker" or "linking group" may correspond to the moiety "L" in the formula RC-L-TM, in the formula C-L-TM, or in the Formula 5 above in certain embodiments. In other embodiments, the radiolabeled conjugate having the formula RC-L-TM and/or the Formula 5, or the unlabeled conjugate C-L-TM may be absent a linker or linking group, or in other words L can correspond to a bond directly bonding the radiolabeled chelator (RC) or unlabeled chelator (C) to the cellular antigen binding moiety (TM). Linking groups may optionally be present in the stabilized radiopharmaceutical formulations of the invention.

According to certain embodiments, suitable linkers are between about 2 and about 50 atoms in length, for example, between about 2 and about 45 atoms in length, between about 2 and about 40 atoms in length, between about 2 and about 35 atoms in length, between about 2 and about 30 atoms in length, between about 2 and about 25 atoms in length, or between about 2 and about 20 atoms in length, or any amount therebetween. In certain embodiments, the linker is at least 2 atoms in length, for example, at least 2, 3, 4, 5, 6, 7, 8, 9, 10, 11, 12, 13, 14, 15, 16, 17, 18, 19 or 20 atoms in length.

Suitable linkers are typically capable of forming covalent bonds to both the cellular antigen binding moiety (TM) and the radiolabeled chelator (RC) or unlabeled chelator (C). Accordingly, in certain embodiments, the linker comprises functional groups capable of forming covalent bonds, such as primary or secondary amines, hydroxyl groups, carboxylic acid groups or thiol-reactive groups (for example, maleimido groups and chloroacetyl, bromoacetyl and iodoacetyl groups).

In some embodiments, the radiolabeled conjugates of formula RC-L-TM feature that the linker L is $C_{1-50}$ alkyl (e.g., $C_{1-10}$ alkyl, $C_{1-20}$ alkyl, $C_{1-30}$ alkyl, or $C_{1-40}$ alkyl) wherein one or more carbons are each, independently, replaced with O, S, NR, or C—O, wherein R is H or C$_{1-3}$ alkyl. In some embodiments, C$_{1-50}$ alkyl is optionally substituted with halogen, amino, nitrile, nitro, hydroxy, oxo (=O), alkyl, alkenyl, alkynyl, haloalkyl, alkoxy, cycloalkyl, heterocycloalkyl, aryl, heteroaryl, heterocycle, and the like.

In some embodiments, the radiolabeled conjugates of formula RC-L-TM feature that the linker L optionally comprises an albumin binder. Exemplary albumin binders include, but are not limited to, the following:

(CH$_2$)$_{n1}$—CH$_3$ wherein n1 is 8-20;

(CH$_2$)$_{n2}$—C(O)OH wherein n2 is 8-20;

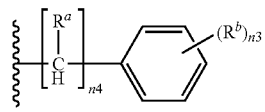

wherein n3 is 1-5, n4 is 1-4, R$^a$ is H or methyl, and R$^b$ is I, Br, F, Cl, H, OH, OCH$_3$, NH$_2$, NO$_2$ or C$_1$-C$_6$ alkyl;

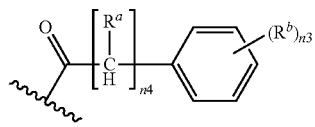

wherein n3 is 1-5, n4 is 1-4, R$^a$ is H or methyl, and R$^b$ is I, Br, F, Cl, H, OH, OCH$_3$, NH$_2$, NO$_2$ or C$_1$-C$_6$ alkyl; and

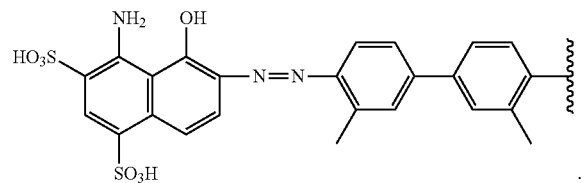 [SMILES: *c1ccc(-c2ccc(N=Nc3ccc4c(S(=O)(=O)O)cc(S(=O)(=O)O)c(N)c4c3O)c(C)c2)cc1C]

In some embodiments, the linker is C$_{1-10}$ alkyl wherein one or more carbons are each, independently, replaced with O, NR, or C=O, wherein R is H or CH$_3$. Examples of the linker include, but are not limited to, the following:

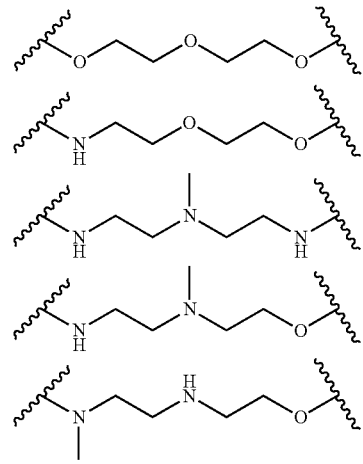

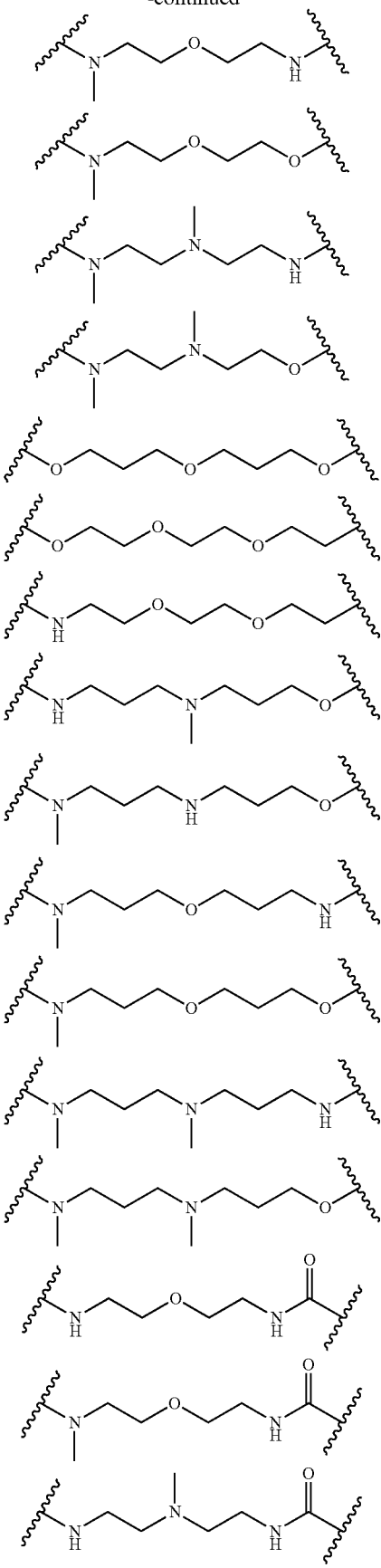

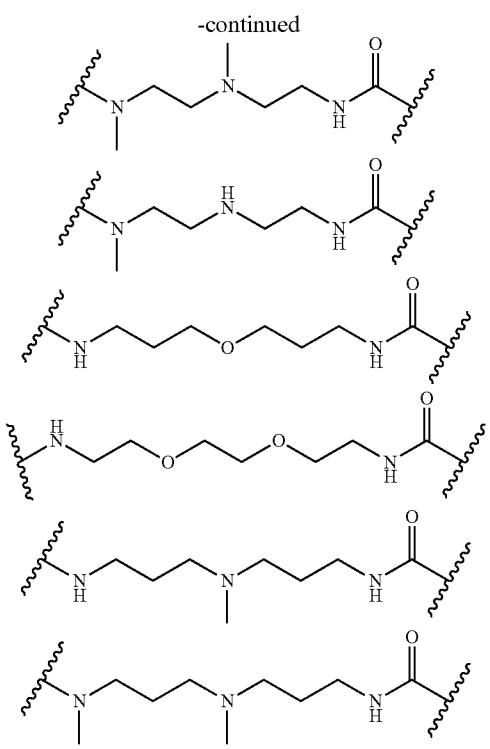

In some embodiments, the linker further comprises one or more (e.g., one to two, one to three, or one to four) charge-modifying groups at either end of the linker. As used herein, the term "charge-modifying group" refers to a chemical group comprising a moiety that can attract a proton to form a positive charge (e.g., a tertiary amine) or lose a proton to form a negative charge (e.g., a carboxylic acid).

In some embodiments, the charge-modifying group is an amino acid unit formed from a natural or unnatural amino acid. Examples of such charge-modifying group include, but are not limited to, 4-amino-1-carboxymethyl-piperidine (ACMP), 2-aminohexanedioic acid (Aad), glutamic acid (Glu), and aspartic acid (Asp):

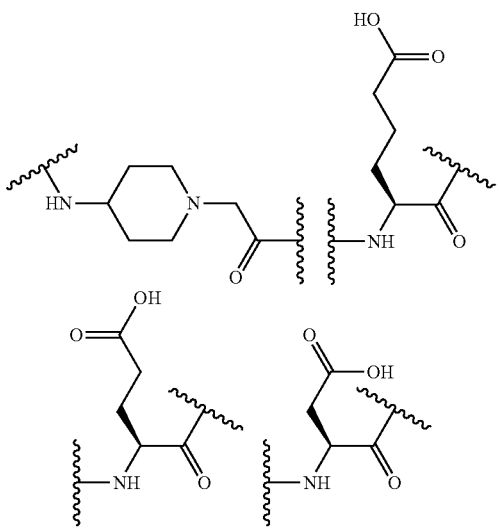

In some embodiments, the linker comprises one or more charge-modifying groups selected from the group consisting of 4-amino-1-carboxymethyl-piperidine (ACMP), 2-aminohexanedioic acid (Aad), aspartic acid (Asp), and glutamic acid (Glu). Examples of the linker comprising a charge-modifying group include, but are not limited to, the following:

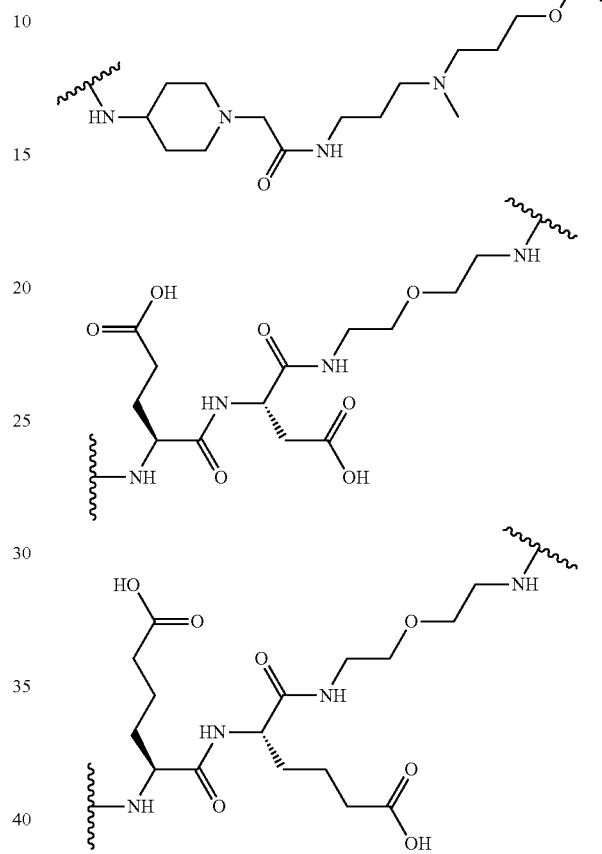

According to certain embodiments, suitable linking groups include peptides (i.e., amino acids linked together) alone, a non-peptide group (e.g., hydrocarbon chain) or a combination thereof containing amino acids and non-peptide groups. In certain embodiments, a linker may be a single amino acid or a peptide with 2-10 amino acids (Xaa) 1-10, wherein Xaa can be a proteinogenic amino acid or non-proteinogenic amino acid.

The term "proteinogenic amino acid" as used herein refers to the 22 amino acids that can be incorporated biosynthetically into proteins during translation, and which includes the 20 amino acids that are in the standard genetic code, specifically alanine (Ala), arginine (Arg), asparagine (Asn), aspartic acid (Asp), cysteine (Cys), glutamic acid (Glu), glutamine (Gln), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val), as well as the 2 additional amino acids (selenocysteine and pyrrolysine) that can be incorporated by special translation mechanisms. The term "non-proteinogenic amino acid" as used herein refers to all other amino acids that are distinct from the proteinogenic amino acids, and includes non-canonical amino acids as well as non-natural or synthetic amino acids.

Table 2 lists exemplary non-proteinogenic amino acids. In certain embodiments, Xaa is an L-amino acid. In certain embodiments, Xaa is a D-amino acid. In certain embodiments, Xaa is a derivative of L- or D-amino acid. Examples of such linkers may include, but are not limited to, Glu, 5 aminoadipic acid (Aad), Asp, Gly-Glu, Gly-Glu-Gly, Gly-Gly-Glu-Gly-Gly, Glu-Glu-Asp, Glu-Gly-Glu, Nle-Glu-Glu, Glu-Nle-Glu, and Glu-aminoadipic acid-Glu, Glu-Glu-Glu, Glu-Glu, and any derivatives or modifications thereof.

11-aminoundecanoic acid (11-Aun), [2-(2-amino-ethoxy)-ethoxy]-acetic acid (also known as 9-amino-4,7-dioxanonanoic acid (mini-PEG)), {2-[2-(2-amino-ethoxy)-ethoxy]-ethoxy}-acetic acid (mini-PEG3), 3-[2-(2-aminoethoxy) ethoxy]propanoic acid (PEG2), PEG4, and the like. Other examples include peptide linkers such as glycine linkers (for example, GG, GGG, GGGG, GGGGG); AAA; SAT; PYP; ASA; SGG; GGSGGS; ASASA; PSGSP;

TABLE 2

List of non-limiting examples of non-proteinogenic amino acids

| | |
|---|---|
| p-aminomethylaniline-diglycolic acid (pABzA-DIG) | 2-25nthracene-(anthracen-2-yl)propanoic acid |
| ornithine (Orn) | 2-25nthracene-(anthracen-9-yl)propanoic acid |
| 3-(1-naphtyl)alanine (Nal) | 2-amino-3-(pyren-1-yl)propanoic acid |
| 3-(2-naphtyl)alanine (2-Nal) | Trp(5-Br), |
| α-aminobutyric acid | Trp(5-OCH$_3$), |
| norvaline | Trp(6-F) |
| norleucine (Nle) | Trp(5-OH) |
| homonorleucine | Trp(CHO) |
| beta-(1,2,3-triazol-4-yl)-L-alanine | N$^\varepsilon$,N$^\varepsilon$,N$^\varepsilon$-trimethyl-lysine |
| 1,2,4-triazole-3-alanine | cysteic acid |
| Phe(4-F), Phe(2-F), Phe(3-F), | 2-aminoadipic acid (2-Aad) |
| Phe(4-Cl), Phe(2-Cl), Phe(3-Cl), | 3-aminoadipic acid (3-Aad) |
| Phe(4-Br), Phe(2-Br), Phe(3-Br), | propargylglycine (Pra) |
| Phe(4-I), Phe(2-I), Phe(2-I), | homopropargylglycine (Hpg) |
| Phe(4-NH$_2$), Phe(2-NH$_2$), Phe(3-NH$_2$), | beta-homopropargylglycine (Bpg) |
| Phe(4-NO$_2$), Phe(2-NO$_2$), Phe(2-NO$_2$), | 2,3-diaminopropionic acid (Dap) |
| homoarginine (hArg) | 2,4-diaminobutyric acid (Dab) |
| 4-(2-aminoethyl)-1-carboxymethyl-piperazine (Acp) | azidolysine (Ly'(N$_3$)) |
| 2-(5'-azidopentyl)a'anine, 2-(6'-azidohexyl)alanine | azido-ornithine (Orn(N$_3$)) |
| 2-amino-4-guanidinobutyric acid (Agb) | amino-4-azidobutanoic acid Dab(N$_3$) |
| 2-amino-3-guanidinopropionic acid (Agp) | tranexamic acid |
| β-alanine | 4-amino-1-carboxymethyl-piperidine (Pip) |
| 4-aminobutyric acid | NH$_2$(CH$_2$)$_2$O(CH$_2$)$_2$C(O)OH |
| 5-aminovaleric acid | NH$_2$(CH$_2$)$_2$[O(CH$_2$)$_2$]$_2$C(O)OH (dPEG2) |
| 6-aminohexanoic acid | NH$_2$(CH$_2$)$_2$[O(CH$_2$)$_2$]$_3$C(O)OH |
| 7-aminoheptanoic acid | NH$_2$(CH$_2$)$_2$[O(CH$_2$)$_2$]$_4$C(O)OH |
| 8-aminooctanoic acid | NH$_2$(CH$_2$)$_2$[O(CH$_2$)$_2$]$_5$C(O)OH |
| 9-aminononanoic acid | NH$_2$(CH$_2$)$_2$[O(CH$_2$)$_2$]$_6$C(O)OH |
| 10-aminodecanoic acid | citrulline (Cit) |
| 2-aminooctanoic acid | β-(3-benzothienyl)alanine (Bta) |
| tert-leucine (Tle) | oxazolidine-4-carboxylic acid (4-oxa-L-Pro) |
| 4-chlorophenylalanine (Cpa) | cyclopentylglycine (Cpg) |
| thiazoline-4-carboxylic acid (Thz) | any N-methylated version of a proteinogenic amino acid or non-proteinogenic amino acid in this Table |
| αMe-Trp | any D-amino acid of a proteinogenic amino acid or any D-amino acid of a non-proteinogrenic amino acid in this Table |
| Trp(Me) | Trp(7-Me) |
| Trp(6-Me) | Trp(5-Me) |
| Trp(4-Me) | Trp(2-Me) |
| Trp(7-F) | Trp(5-F) |
| Tpi(2,3,4,9-tetrahydro-1H-pyrido[3,4-b]indol-3-carboxylic acid) | cyclobutylglycine |
| Trp(4-F) | 5,5-dimethyl-1,3-thiazolidine-4-carboxylic acid (Me$_2$Thz) |
| 7-Aza (7-azatryptophan) | 2,3-dehyrdo-Val |
| 4,4-difluoroproline (difluoroPro) | cyclopropylglycine |
| statine (Sta) | |

In certain embodiments, the linker comprises carboxylic acid and amine reactive groups. Examples of such linkers include, but are not limited to, 4-amino-(1-carboxymethyl) piperidine (Pip), 2-aminobutyric acid (Abu), 4-aminobutyric acid (γ-Abu or GABA), α-aminoisobutyric acid (Aib), 5-aminovaleric acid (5-Ava), 6-aminohexanoic acid (ε-Ahx or Ahx), 7-aminoheptanoic acid, 8-aminooctanoic acid (8-Aoc), 9-aminononanoic acid, 10-aminodecanoic acid, PSPSP; ASASA; PSPSP; KKKK; RRRR; Gly$_4$Ser; (Gly$_4$Ser)$_2$; (Gly$_4$Ser)$_3$; (Gly$_4$Ser)$_4$; (Gly$_4$Ser)$_5$ and (Gly$_4$Ser)$_6$.

In one embodiment, examples of linkers include, but are not limited to, 4-amino-(1-carboxymethyl) piperidine, glycine, cysteic acid, glutamate, aspartic acid, aminoadipic acid, hexyl, polyethylene glycol (PEG), or derivative thereof. In certain embodiments, a linker may contain two to 20 PEGs (PEG$_{2-20}$) connected together. In certain embodiments, a linker may be:

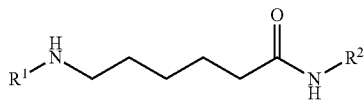

or derivatives, wherein $R^1$ can be a chelator or another linker, and $R^2$ can be another linker, or a spacer, or a cellular antigen binding moiety.

In certain embodiments, the linker can be a single atom, such as a heteroatom (e.g., O, N, or S), a group of atoms, such as a functional group (e.g., amine, —C(=O)—, —CH$_2$—), or multiple groups of atoms, such as an alkylene chain. Suitable linkers include but are not limited to oxygen, sulfur, carbon, nitrogen, alkyl, alkenyl, cycloalkyl, cycloalkenyl, heterocycloalkyl, alkoxyl, aryl, heteroaryl, ether, amine, diamine, amide, alkylamine, thioether, carboxylates, polymer, derivatives or combinations thereof.

In certain embodiments, the linker can be any of $R^1$, —C(O)OR$_1$OC(O)—, —C(O)R$_1$N—, —C(O)OR$_1$NH—, —C(O)R$_1$C(O)—, —NHR$_1$NH—, —C(O) NHR$_1$NHC(O)—, or —C(S)OR$_1$OC(S)—; wherein R$_1$ is O, S, C$_1$-C20 alkyl; C1-C20 heteroalkyl; C1-C20 alkylamine; C1-C20 alkoxyl; C1-C20 alkanoyloxyl; or C1-C20 alkylamido, any of which can optionally be substituted with one or more substituents including halogen, alkoxyl, alkyl, alkenyl, cycloalkyl, cycloalkenyl, heterocycloalkyl, aryl, heteroaryl, amine, cyano, nitro, hydroxyl, carbonyl, acyl, carboxylic acid (—COOH), —C(O)R$^2$, —C(O)OR$_2$, carboxylate (—COO—), primary amide (e.g., —CONH$_2$), secondary amide (e.g., —CONHR$_2$), —C(O)NR$_2$R$_3$, —NR$_2$R$_3$, —NR$_2$S(O)$_2$R$_3$, —NR$_2$C(O)R$_3$, —S(O)$_2$R$_2$, —SR$_2$, and —S(O)$_2$NR$_2$R$_3$, sulfinyl group (e.g., —SOR$_2$), and sulfonyl group (e.g., —SOOR$_2$); wherein R$^2$ and R$_3$ can each independently be hydrogen, halogen, hydroxyl, alkyl, haloalkyl, alkenyl, alkynyl, cycloalkyl, heterocycloalkyl, aryl, heteroaryl, carbonyl, cyano, amino, alkylamino, dialkylamino, alkoxyl, aryloxyl, cycloalkyl, alkoxycarbonyl, aminocarbonyl, alkylaminocarbonyl, or dialkylaminocarbonyl.

In certain embodiments, the linker can be: a hydrocarbon linker containing between 1 and 10 carbon atoms (C1-C10), including 2, 3, 4, 5, 6, 7, 8 or 9 carbon atoms that is optionally saturated or unsaturated, optionally substituted with one or more heteroatoms or having one or more substituents; the hydrocarbon linker can be linear, cyclic and/or branched, e.g. 8-aminooctanoic acid, 6-aminohexanoic acid; an aromatic linker containing an aromatic moiety such as a benzyl group, e.g. aminophenylacetic acid; an amino acid linker having between 1 and 10 amino acid residues, including 2, 3, 4, 5, 6, 7, 8, or 9 amino acid residues, any one or more of which may be naturally occurring amino acid residues, D-amino acid residues or other non-naturally occurring residues, examples of which include GlyGly, GluGluGlu, GlySerGlySer, a cyclized linker, or cyclized ring structure, optionally a cyclized amino acid linker, e.g. aminocyclohexanecarboxylic acid; a PEG-linker of any suitable length; cationic linkers, whether formed from amino acid residues or other residues, e.g., Pip, 4-(2-aminoethyl)-1-carboxymethyl-piperazine (Acp); anionic linkers, whether formed from amino acid residues or other residues, e.g. AspAsp, GluGlu; a carbohydrate containing linker; click chemistry linkers (triazoles), and any other suitable linker or combinations or modifications thereof.

In one embodiment, the linking group includes L-glutamine and a hydrocarbon chain, or a combination thereof.

In another embodiment, the linking group includes a pure peptide linking group consisting of a series of amino acids (e.g., diglycine, triglycine, gly-gly-glu, gly-ser-gly, etc.), in which the total number of atoms between the N-terminal residue of the targeting molecule and the metal chelator in the polymeric chain is 1-12 atoms.

In yet a further embodiment, the linking group includes a hydrocarbon chain [i.e., R$_1$-(CH$_2$)$_n$-R$_2$] wherein n is 0-10, preferably n=3 to 9, R$_1$ is a group (e.g., H$_2$N—, —SH, —COOH) that can be used as a site for covalently linking to the radiolabeled chelator (RC) (or unlabeled chelator (C) used to form the radiolabeled chelator (RC)); and R$_2$ is a group that is used for covalent coupling to the SSTR-binding moiety (TM). Several chemical methods for conjugating ligands or preferred metal chelators to biomolecules have been well described in the literature [Wilbur, 1992; Parker, 1990; Hermanson, 1996; Frizberg et al., 1995]. One or more of these methods could be used to link the radiolabeled chelator (RC) (or unlabeled chelator (C) used to form the radiolabeled chelator (RC)) to the SSTR-binding moiety (TM). These methods include the formation of acid anhydrides, aldehydes, arylisothiocyanates, activated esters, or N-hydroxysuccinimides [Wilbur, 1992; Parker, 1990; Hermanson, 1996; Frizberg et al., 1995].

In certain embodiments, any of the linkers described herein can be connected together to form a group of linkers.

Cellular Antigen Binding Moiety

The cellular antigen binding moiety is a chemical moiety that specifically binds to an antigen (i.e., a biological target) on cell surface or to an intracellular antigen. According to certain embodiments, the cellular antigen binding moiety can be any of a peptide, antibody, antigen-binding fragment of an antibody, peptidomimetic, receptor ligand, small molecule, steroid, hormone, growth factor, cytokine, hapten, aptamer, affibody molecule, enzyme, protein, molecule that recognizes cell surface receptors (including molecules involved in growth metabolism or function of cells), lipid, lipophilic group, carbohydrate, or any other molecule or targeting component capable of binding to the antigen at a location within the body. The antigen as used herein can be any of proteins, peptides, carbohydrates, nucleic acids, fatty acids, or derivatives thereof, located on the cell surface, transmembrane, or intracellularly. According to certain aspects, the antigens are those that are overexpressed in cancer cells relative to normal cells, e.g. tumor-associated antigens.

In some embodiments, cellular antigens or biological targets to which the cellular antigen binding moieties bind may include, but are not limited to, somatostatin receptors (SSTR), prostate specific membrane antigen (PSMA), bradykinin B1 and B2 receptors, melanocortin 1 receptors (MC1R), neurotensin receptors, melanocortin receptors, mesothelin, c-Met, CXCR4, CCK2, BR1, HER2, HER3, folate receptors, fibroblast activation protein (FAP), glypican-3, G-protein coupled receptors (GPCRs), epidermal growth factor receptor (EGFR), FGFR, epidermal growth factor receptor 2 (ERBB2), epidermal growth factor receptor 3 (ERBB3), cytotoxic T-lymphocyte-associated protein 4 (CTLA4), gastrin-releasing peptide receptors (GRPR), estrogen receptor (ER), glucagon-like peptide 1 receptor, hypoxia, integrin α4β1, integrin αvβ3, integrin α4β6, neurokinin1 receptor, poly(ADP-ribose) polymerase 1

(PARP1), programmed cell death protein (PD-1), programmed death-ligand 1 (PD-L1), six-transmembrane epithelial antigen of prostate-1, thymidine kinase, C-X-C chemokine receptor type 4 (CXCR4), transforming growth factor-beta, vascular endothelial growth factor (VEGFR), A33 transmembrane glycoprotein, androgen receptor, CA19.9, carbonic anhydrase 9, carcinoembryonic antigens, CD4, CD8, CD38, CD19, CD20, CD45, and derivatives thereof.

In some embodiments, the cellular antigen binding moieties and their corresponding biological targets include, but are not limited to, the following listed in Table 3.

TABLE 3

Exemplary cellular antigen binding moieties and corresponding biological targets

| Cellular Antigen Binding Moiety | Biological Target |
|---|---|
| huA33, murine A33 mAb | A33 transmembrane glycoprotein |
| dihydrotestosterone (DHT) | androgen receptor (AR) |
| Omburtamab, Ifinatamab deruxtecan, Mirzotamab clezutoclax, Vobramitamab duocarmazine | B7-H3 |
| HuMab-5B1 | CA19.9 |
| Girentuximab | carbonic anhydrase 9 (CA-IX) |
| AMG211 bispecific T-cell engager | carcinoembryonic antigen |
| CCK-66 (with CROWN replacing chelator), MGS5 (with CROWN replacing chelator), MGS8 (with CROWN replacing chelator), CP04 (with CROWN replacing chelator), CCK-66.2 (with CROWN replacing chelator), PP-F11N (with CROWN replacing chelator) | Cholecystokinin B receptor (CCK2R) |
| IAB22M2C minibody | CD8 |
| Rituximab, Obinutuzumab, Ofatumumab | CD20 |
| U36 antibody | CD44v6 |
| hu19V3, 5C9 | CLDN18.2 |
| EMP100 (with CROWN replacing chelator), EMP102 (with CROWN replacing chelator), EMP103 (with CROWN replacing chelator), FPI-2068 | Hepatocyte growth factor (HGF) receptor (HGFR or c-MET) |
| Pentixafor (with CROWN replacing chelator), Plerixafor, Pentixather (with CROWN replacing chelator), NFB | C-X-C chemokine receptor type 4 (CXCR4) |
| 1pilimumab | Cytotoxic T-lymphocyte-associated protein 4 (CTLA-4) |
| ABD-147, SC16, Rova-T, DARPin | Delta-like ligand 3 (DLL3) |
| Afatinib, Cetuximab, Erlotinib, Panitumumab, PD153035 | epidermal growth factor receptor (EGFR) |
| Pertuzumab, Trastuzumab, HER2-nanobody, ABY-025 affibody | Epidermal growth factor receptor 2 (ERBB2 or HER2) |
| Lumretuzumab, GSK2849330, Patritumab deruxtecan, YL 202, SI-B001, Zenocutuzumab | epidermal growth factor receptor 3 (ERBB3 or HER3) |
| 4FMFES | estrogen receptor (ER) |
| FAPI-04, FAPI-21, FAPI-46 | fibroblast activation protein a |
| Galactose | galactose metabolism |
| NeoBOMB 1 peptide (with CROWN substituted for DOTA), AMTG peptide (with CROWN substituted for DOTA), RM2 peptide (with CROWN substituted for DOTA), BAY 864367 peptide (with CROWN-bound ligand label instead of 18F labeling), SB3 peptide (with CROWN substituted for DOTA), CB-TE2A-AR06 peptide (with CROWN substituted for DOTA), RM26 peptide, BBN-RGD peptide, Aca-BBN peptide | gastrin-releasing peptide receptor (GRPR) |
| Exendin-4 peptide | glucagon-like peptide 1 receptor (GLP-1R) |
| Glucose | glucose metabolism |
| Codrituzumab | glypican 3 |
| ASTM, AZA, EF5, HX4, MISO | Hypoxia |
| LLP2A peptidomimetic | integrin α4β1 |
| Alfatide-I, alfatide-II, Fluciclatide, FPP(RGD)2 peptid, galacto-RGD peptide, PRGD2 peptide, RGD-K5 peptide | integrin αvβ3 |
| αvβ6-BP peptide | integrin αvβ6 |
| CycMSHhex targeting peptides; GG-Nle-CycMSHhex; ADV002 | melanocortin-1 receptor (MC1R) |
| MMOT0530A antibody | Mesothelin |
| BT8009 (with CROWN replacing the toxin payload), AGS-22M6, N188 | Nectin-4 |
| SP peptide | Neurokinin1 receptor (NK1R) |
| Neurotensin, 3BP-227 (with CROWN replacing the DOTA chelator), FL-091 (with CROWN replacing the DOTA chelator), NT20.3 | Neurotensin receptor 1 (NTSR1) |

TABLE 3-continued

Exemplary cellular antigen binding moieties and corresponding biological targets

| Cellular Antigen Binding Moiety | Biological Target |
|---|---|
| PARPi | poly(ADP-ribose) polymerase 1 (PARP1) |
| DCFBC (with CROWN-bound ligand replacing 18F labelling), DCFPyL (with CROWN-bound ligand replacing 18F labelling), HuJ591 antibody, TLX591 antibody, PSMA-1007, PSMA-7 (with CROWN-bound ligand replacing 18F labelling); CTT1057 (with CROWN-bound ligand replacing 18F labelling); CTT1403(with CROWN-bound ligand replacing 18F labelling); rhPSMA-7.3 (with CROWN replacing chelator); rhPSMA-10.1 (with CROWN replacing chelator); PSMA-11 (with CROWN replacing the HBED chelator); FC705 (with CROWN replacing chelator); PSMA-R2 (with CROWN replacing chelator); PSMA-617, PSMA-I&T (with CROWN replacing the DOTA chelator); PSMA-ALB-56 (with CROWN replacing chelator); Ibu-DAB-PSMA 56 (with CROWN replacing chelator); RPS-072 56 (with CROWN replacing chelator); PSMA-Trillium 56 (with CROWN replacing chelator); SAR-bisPSMA 56 (with CROWN replacing chelator); CB-TE2A-6 56 (with CROWN replacing chelator); BAY2315497; BAY354682; NG001; ITM-22 | Prostate-specific membrane antigen (PSMA) |
| Durvalumab, nivolumab, pembrolizumab | programmed cell death protein (PD-1) |
| Atezolizumab, BMS-986192 adnectin | programmed death-ligand 1 (PD-L1) |
| MSTP2109A antibody | six-transmembrane epithelial antigen of prostate-1 (STEAP1) |
| Anti-STEAP2 monoclonal antibody (DCABH-13649) | six-transmembrane epithelial antigen of prostate-2 (STEAP2) |
| JR11, LM3, LM4, NOC peptide, TATE peptide (Tyr³-octreotate), TOC peptide, EB-TATE, VMT-alpha-NET (with CROWN replacing chelator) | somatostatin receptor 2 (SSTR2) |
| thymidine | thymidine kinase (DNA replication) |
| fresolimumab | transforming growth factor-beta (TGF-β) |
| bevacizumab | vascular endothelial growth factor receptor (VEGFR) |

Somatostatin receptors can be found in high densities in certain malignancies, including malignancies of the central nervous system, breast, lung, and lymphatic system. According to certain preferred embodiments, the SSTR-binding moiety (TM) that is linked to the radiolabeled chelator (RC) is [tyr³]octreotate, or a salt or derivative thereof. In some embodiments, the SSTR-binding moiety (TM) is one that binds SSTR of subtype SSTR1, SSTR2, SSTR3, SSTR4, or SSTR5. In some embodiments, the SSTR-binding moiety is an SSTR2-binding moiety. According to other embodiments, other SSTR-binding moieties can be used as an alternative and/or in addition to TATE, including derivatives of TATE such as octreotide. Table 1 provides examples of SSTR-binding moieties that may be linked to the radiolabeled chelator (RC), to target cells expressing SSTR for therapeutic or diagnostic purposes.

In some embodiments, the cellular antigen binding moiety comprises [Tyr³]octreotate (referred to herein as "TATE"), which is a targeting moiety having the amino acid sequence d-Phe-c [Cys-Tyr-d-Trp-Lys-Thr-Cys]-Thr. TATE is somatostatin receptor (SSTR) binding moiety, and can act as an SSTR agonist that can be used to target the somatostatin receptor (and specifically, can act as an SSTR-2 binding moiety). The chemical structure of TATE is below:

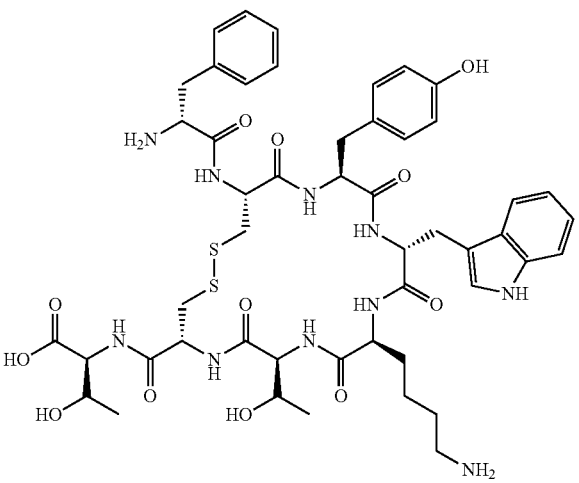 [SMILES: CC(O)[C@H](NC(=O)[C@@H]1CSSC[C@H](NC(=O)[C@H](N)Cc2ccccc2)C(=O)N[C@@H](Cc2ccc(O)cc2)C(=O)N[C@H](Cc2c[nH]c3ccccc23)C(=O)N[C@@H](CCCCN)C(=O)N[C@@H](C(C)O)C(=O)N1)C(=O)O]

In some embodiments, the radiolabeled conjugate comprises a radionuclide (e.g., $^{225}$Ac) chelated to an unlabeled conjugate of the following structure (i.e., CROWN-TATE):

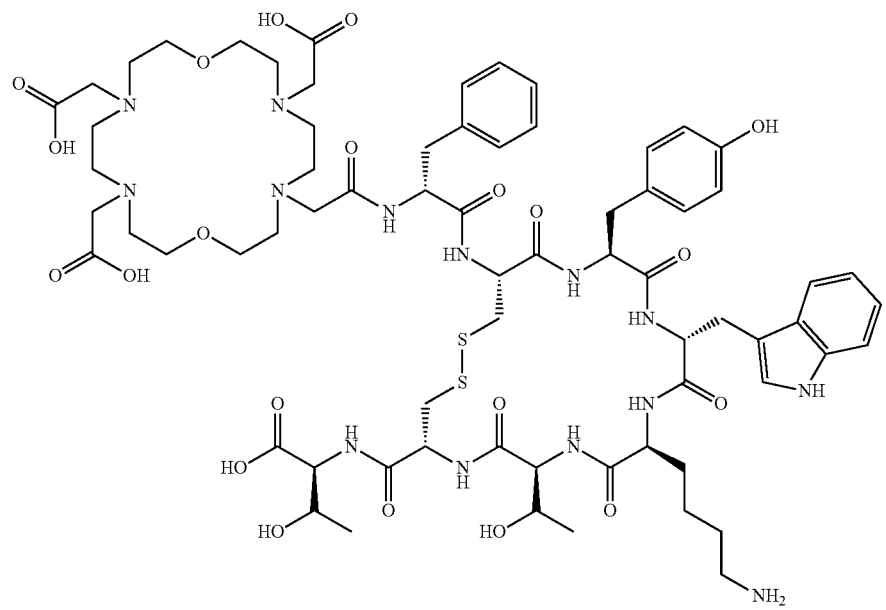 [SMILES: CC(O)[C@H](NC(=O)[C@@H]1CSSC[C@H](NC(=O)[C@@H](Cc2ccccc2)NC(=O)CN2CCOCCN(CC(=O)O)CCN(CC(=O)O)CCOCCN(CC(=O)O)CC2)C(=O)N[C@@H](Cc2ccc(O)cc2)C(=O)N[C@H](Cc2c[nH]c3ccccc23)C(=O)N[C@@H](CCCCN)C(=O)N[C@@H](C(C)O)C(=O)N1)C(=O)O]
In some embodiments, the radiolabeled conjugate comprises a radionuclide (e.g., $^{225}$Ac) chelated to an unlabeled conjugate selected from the following:
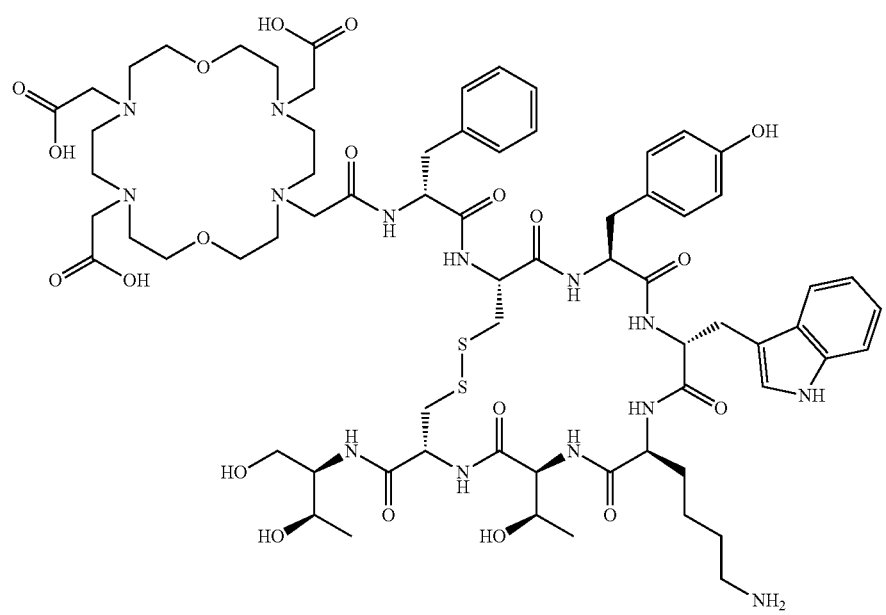
Crown-TOC

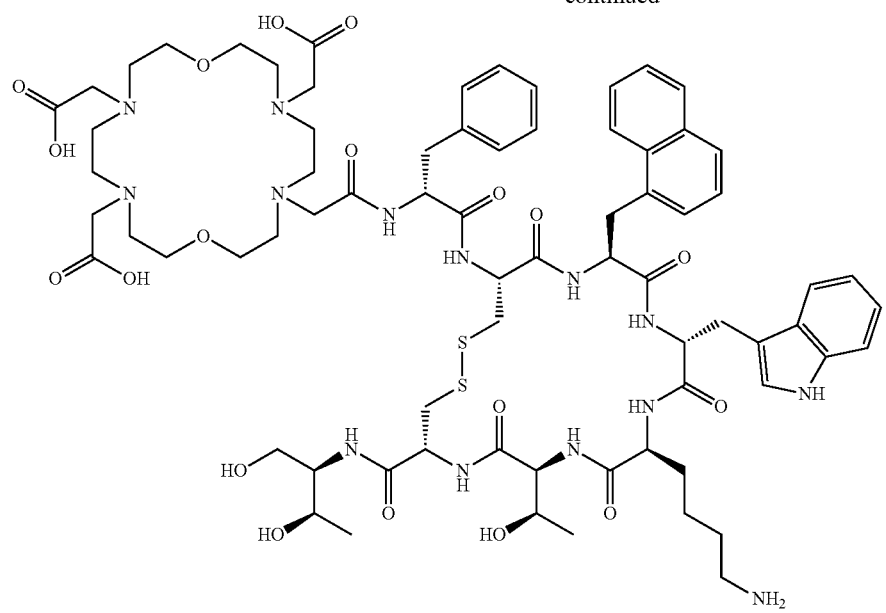
Crown-NOC
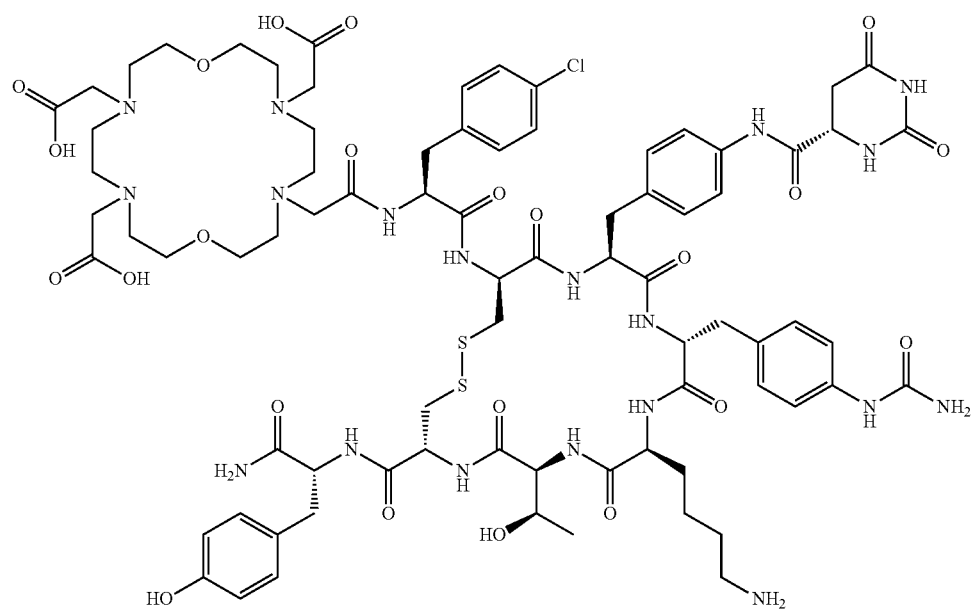
Crown-JR11

-continued
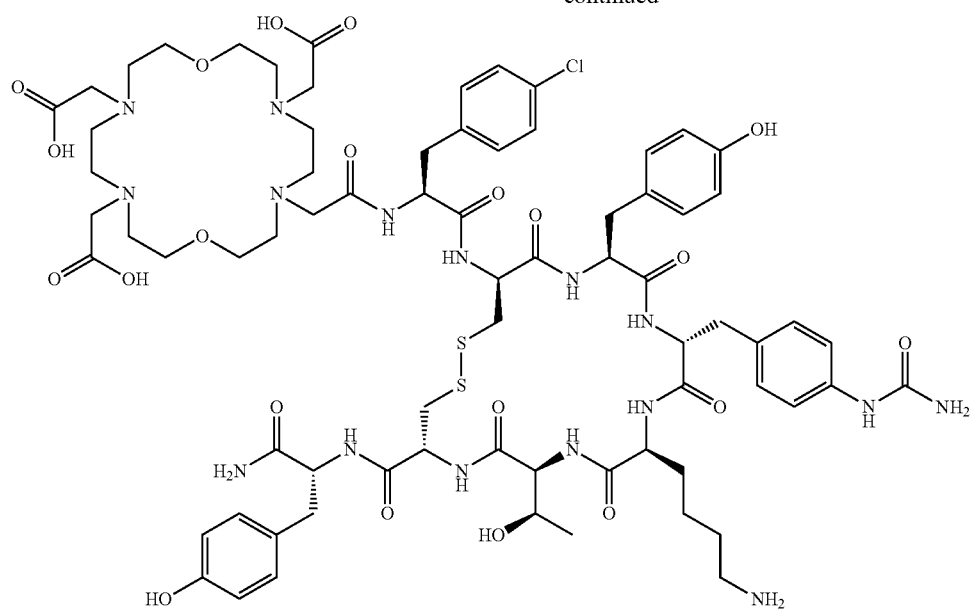
Crown-LM3
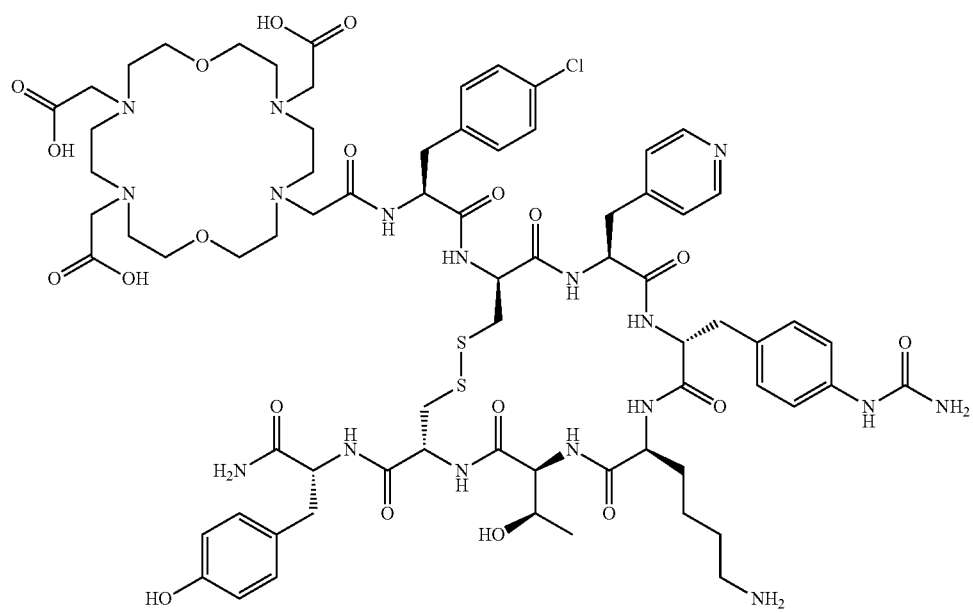
Crown-LM4

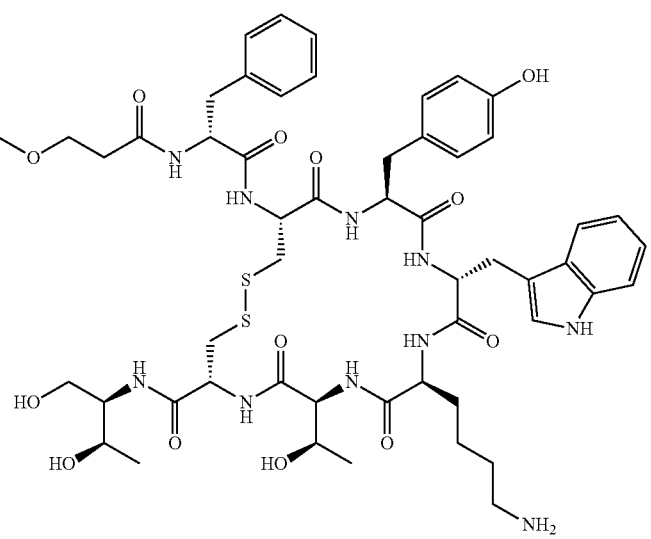
Crown-VMT-alpha-NET
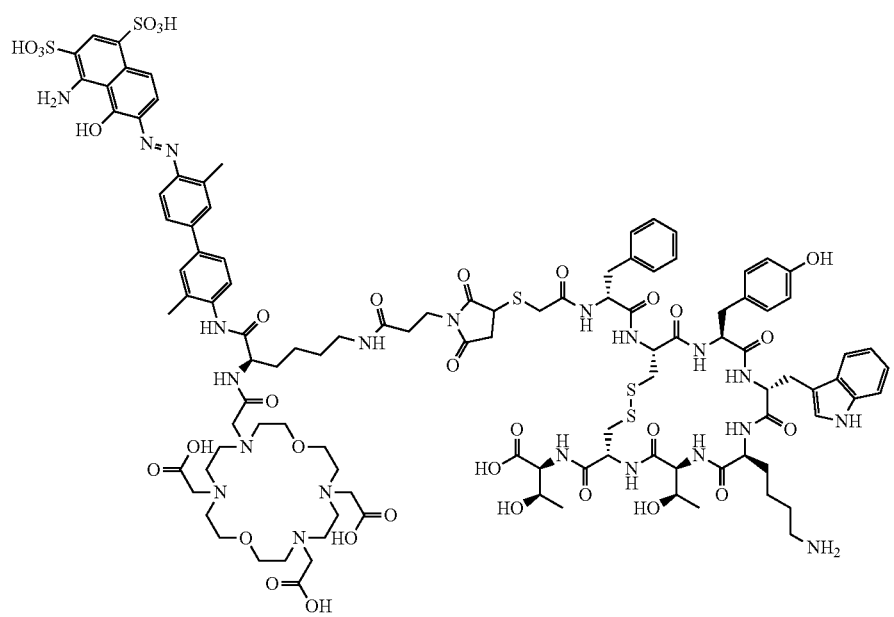
Crown-EB-TATE

-continued
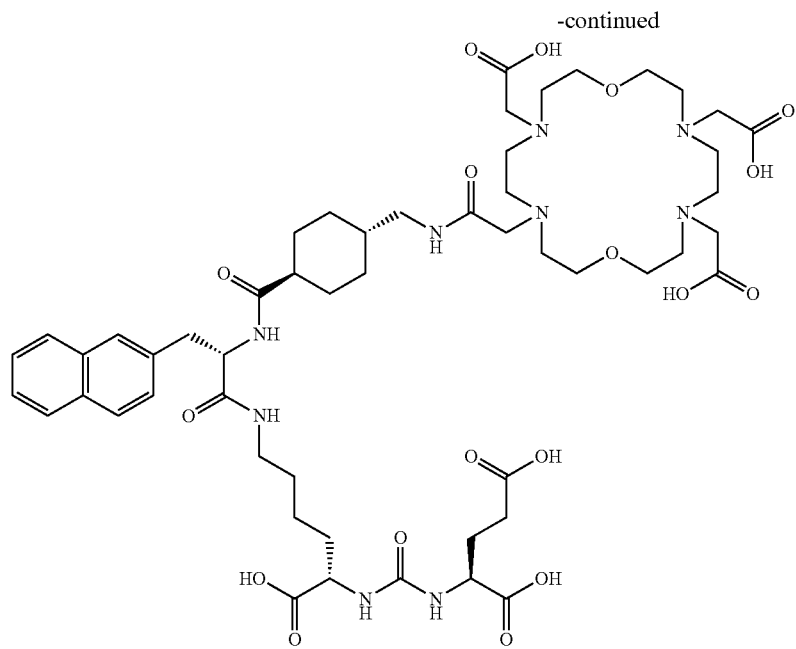
Crown-PSMA-617
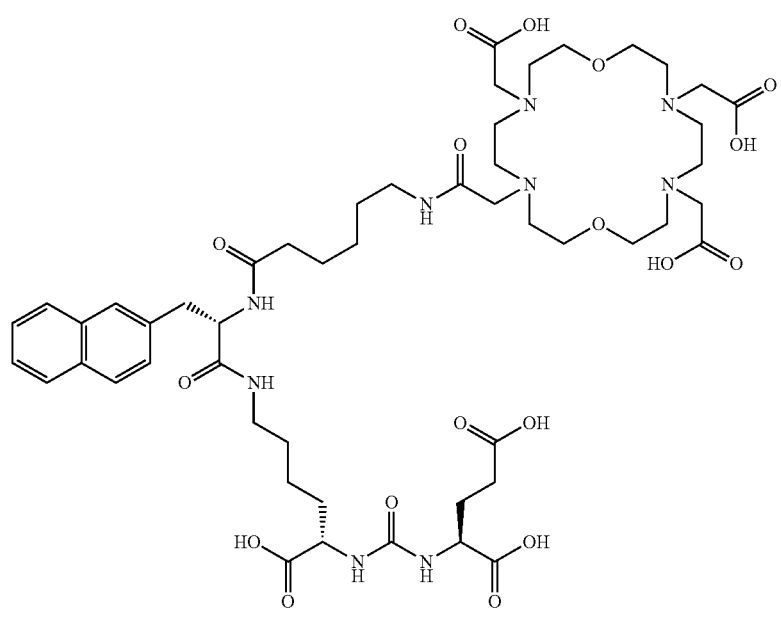
Crown-PSMA-11

-continued
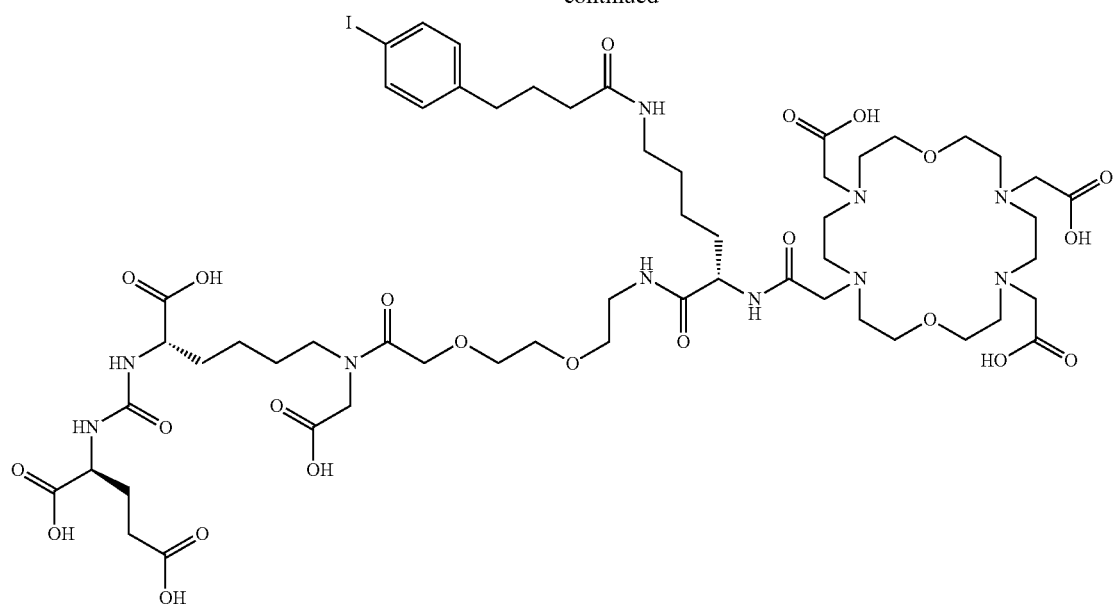
Crown-Ludotadipep
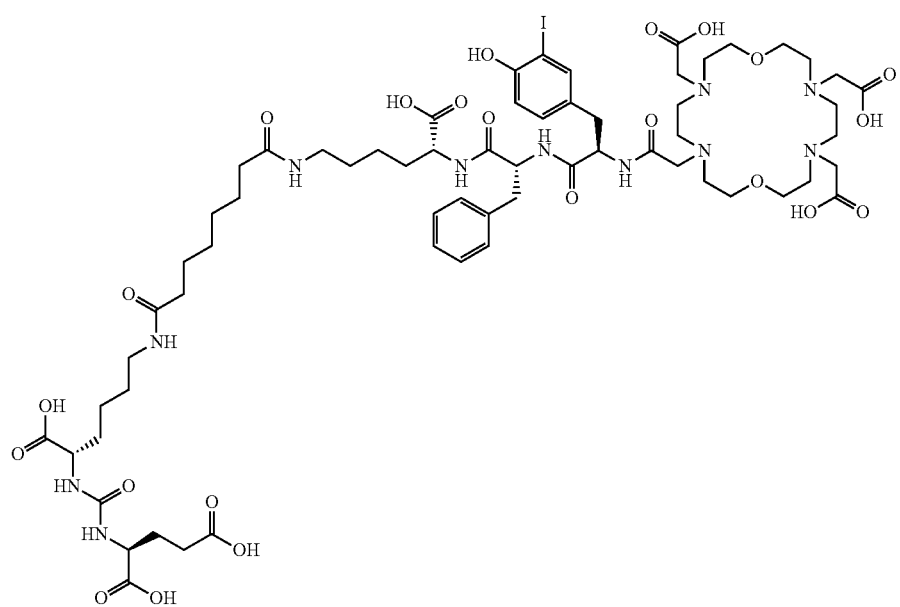
Crown-PSMA-I&T

-continued
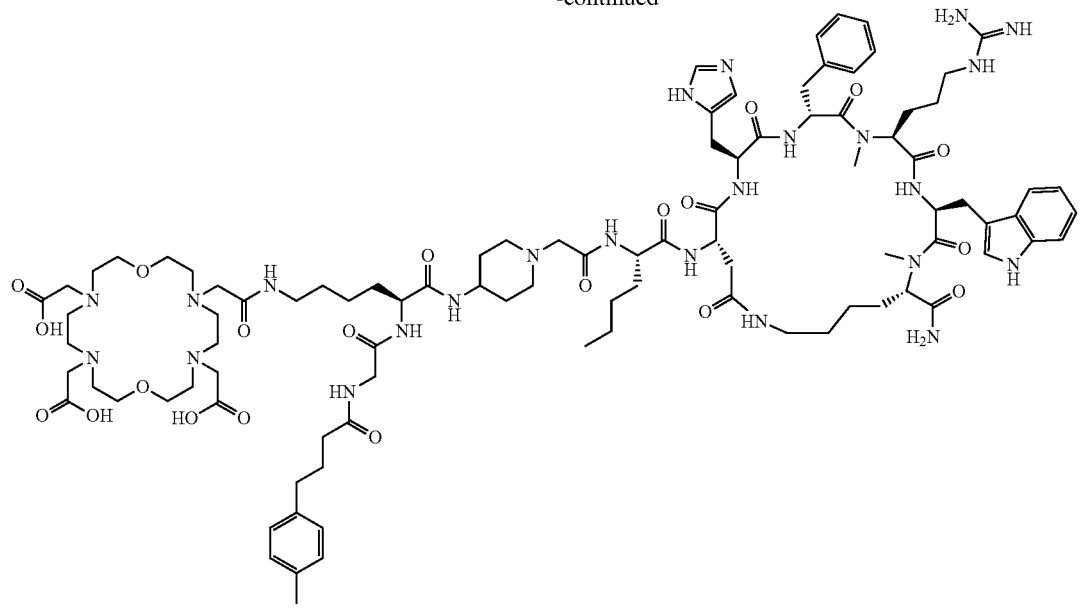
CROWN-MC1R
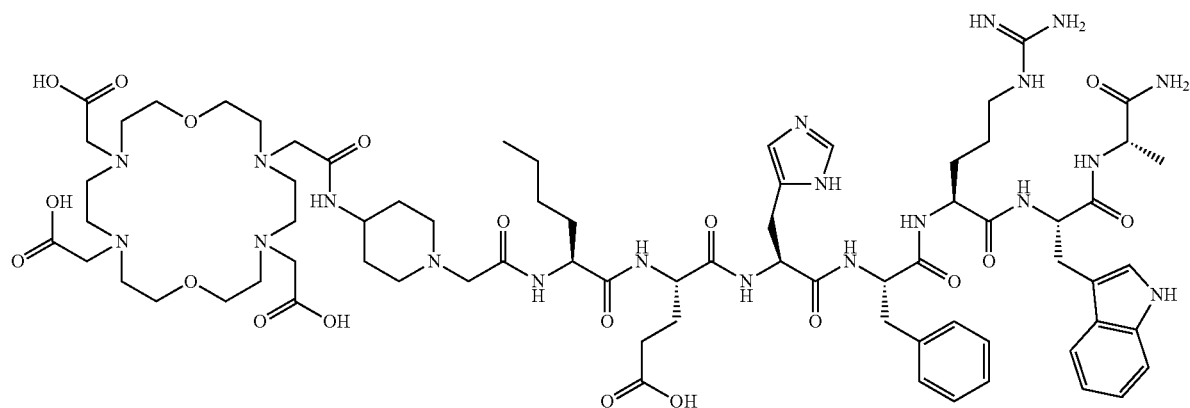
Crown alpha-MSH
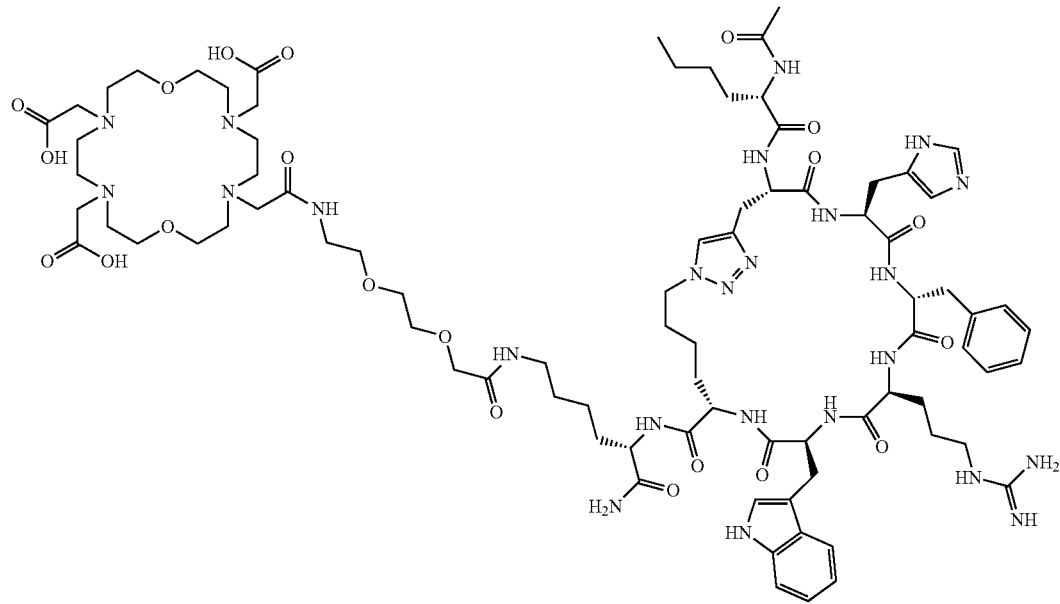
Crown-VMT-01

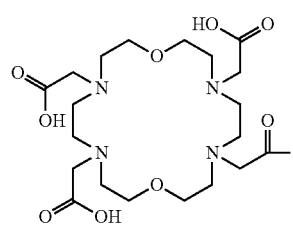
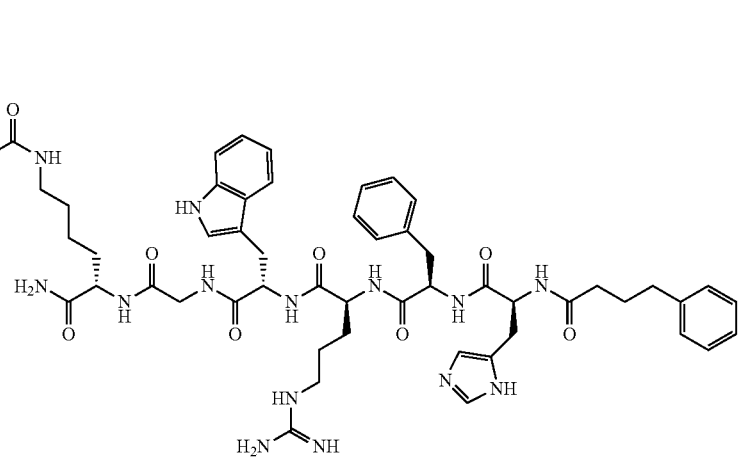
Crown-MTI-201
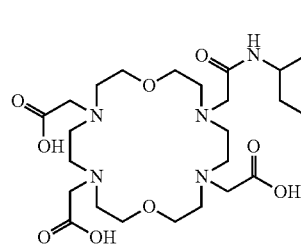
Crown-AMTG
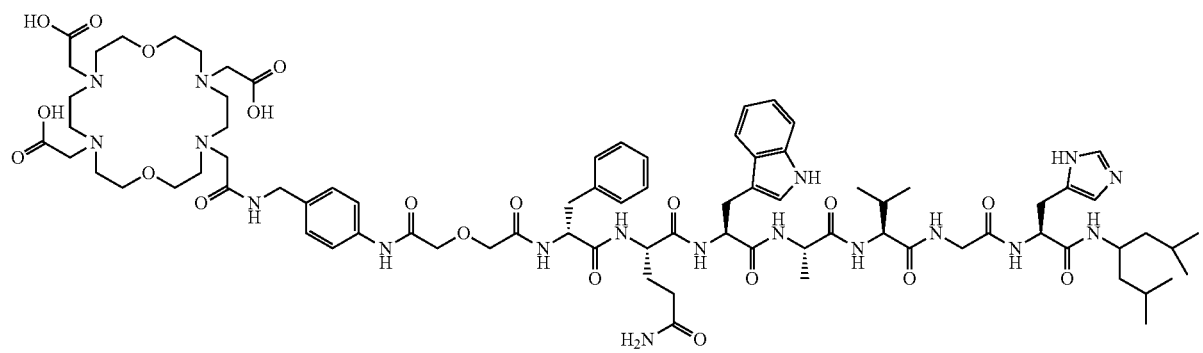
Crown-NeoB
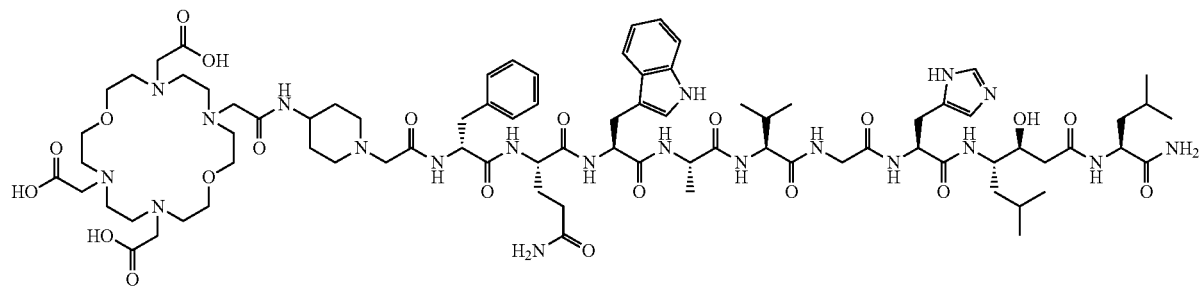
Crown-RM2

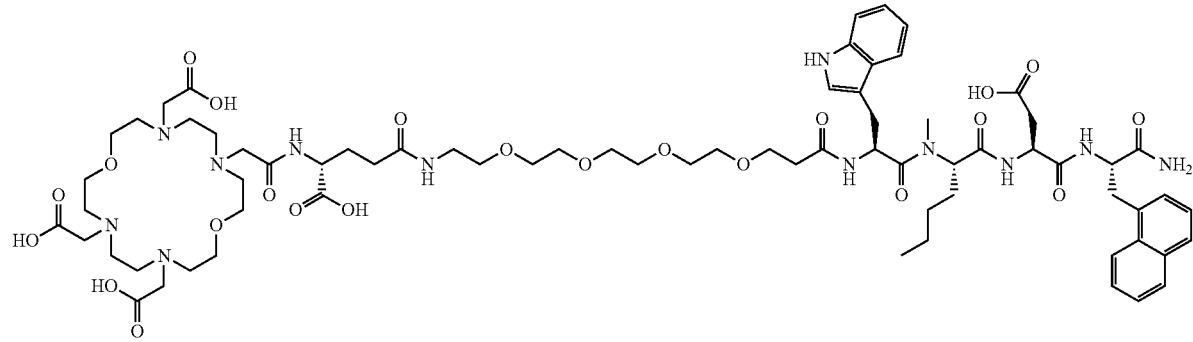
Crown-CCK-66
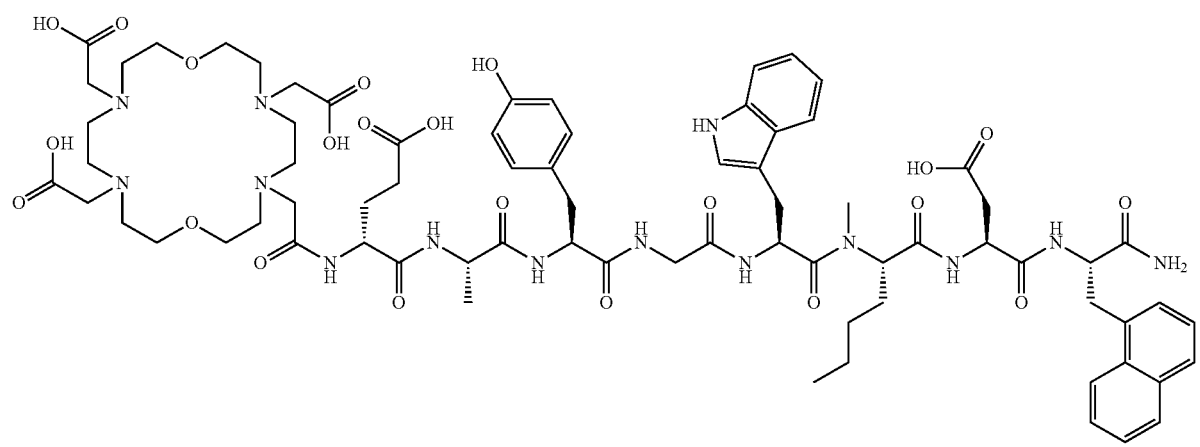
Crown-MGS5
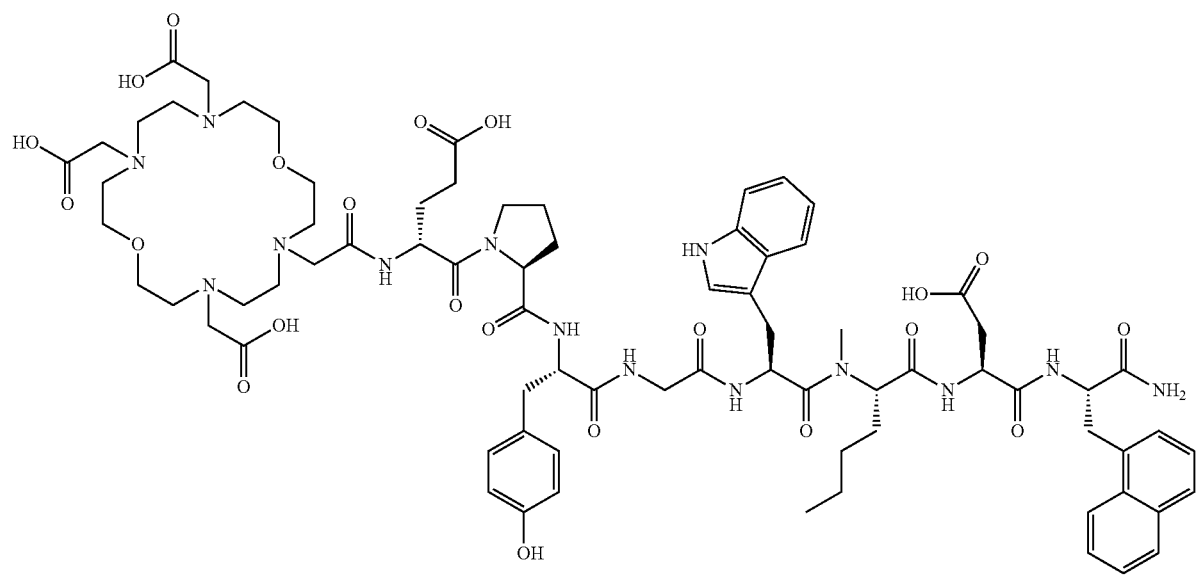
Crown-MGS8

-continued
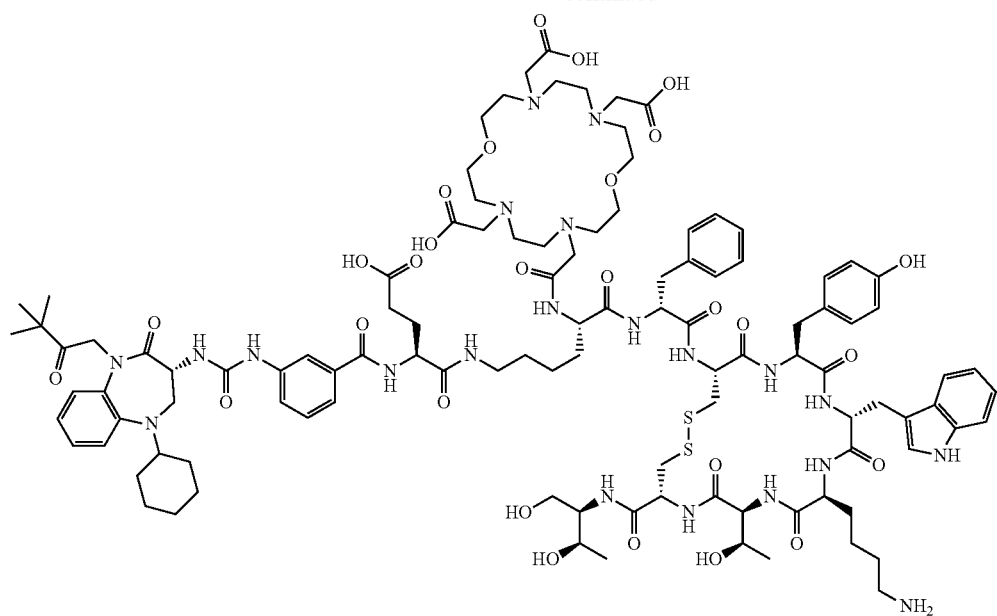
Crown-Dual
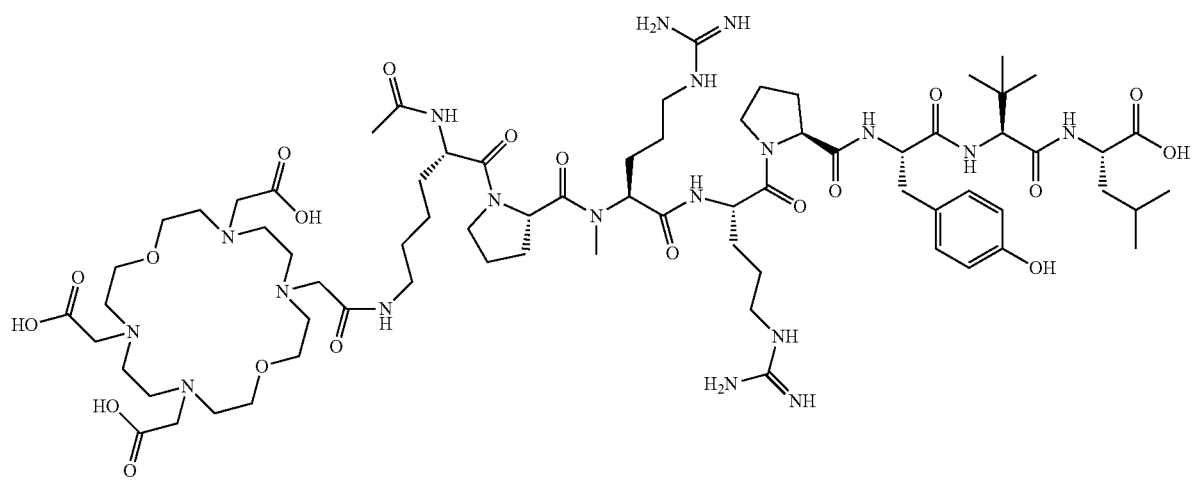
Crown-NT20.3
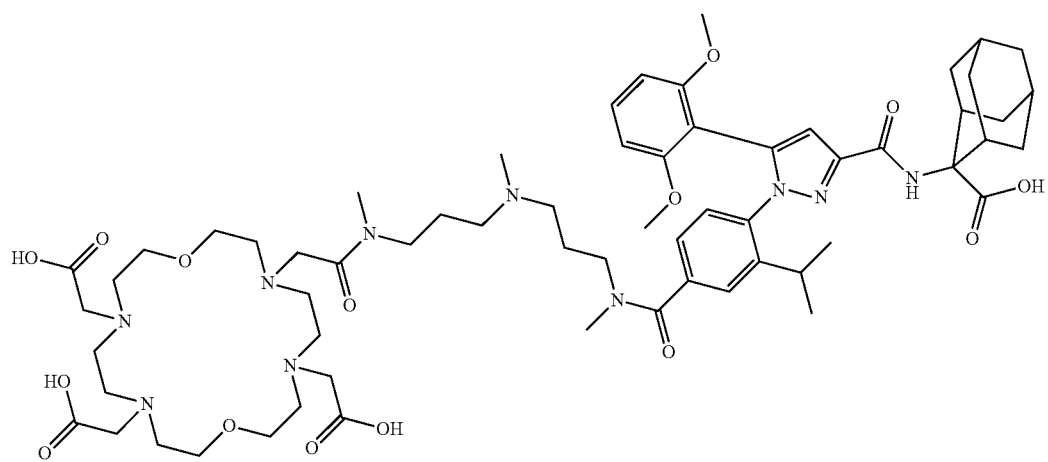
Crown-3BP-227

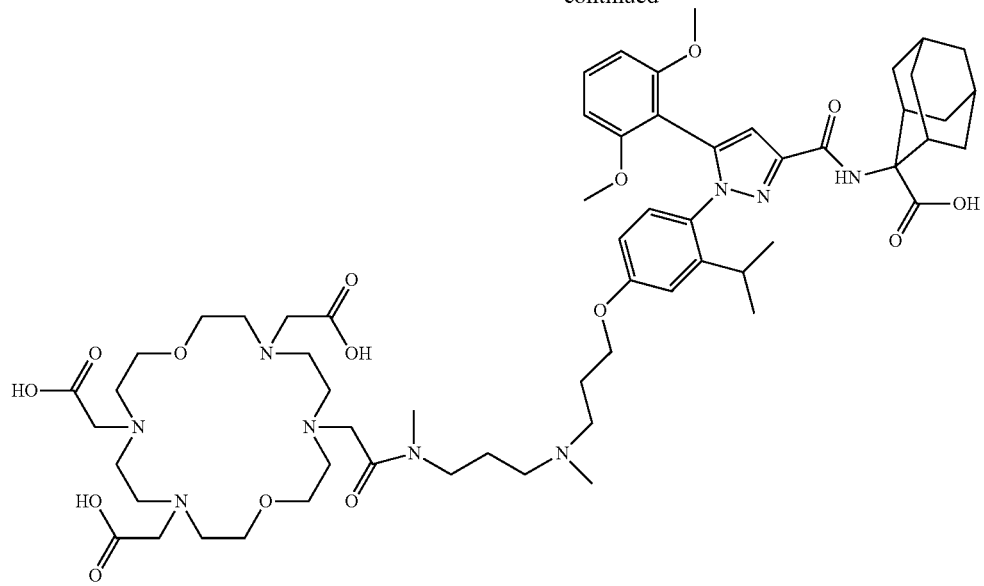

Crown-FL-091

Formulation

The present disclosure provides radiopharmaceutical compositions, i.e., formulations of CROWN-based radiolabeled conjugates set forth above. These formulations can be in various forms such as frozen aqueous compositions and liquid aqueous compositions. The formulations provided in this disclosure are uniquely designed and formulated so that the radiopharmaceutical compositions are stable enough to ensure the overall radiochemical purity (RCP) of the radiopharmaceutical composition remains within an acceptable range from the time of manufacture to the time of administration in a patient.

Unexpectedly, the desirable stability of the CROWN-based radiopharmaceutical compositions can be achieved by formulating the compositions in a unique pH range with a pH buffer and/or storing the compositions at a unique temperature range, as provided in this disclosure. A first pH buffer (e.g., an acetate buffer) is typically present during the radiolabeling process for forming a radiolabeled conjugate, but its effect on the ultimate radiopharmaceutical composition or formulation may be further supplemented by adding a second buffer that can the same or different (e.g., a phosphate buffer) after the radiolabeling is complete. To achieve a desirable stability of the thus formed formulation, the second pH buffer can be used in a concentration of 0.1 mM to 2 M (e.g., 0.1 mM to 1 M, 0.1 mM to 500 mM, 0.1 mM to 300 mM, 0.1 mM to 200 mM, 0.1 mM to 100 mM, 1 mM to 100 mM, 5 mM to 100 mM, or 10 mM to 100 mM).

The desirable stability of a radiopharmaceutical composition or a formulation described herein is attributable to the stabilization of the interaction or complexation between the CROWN chelator and the radionuclide $R^N$ (e.g., $^{225}Ac$), without being limited to a specific type of linkers or a specific type of cellular antigen binding moieties. Optionally, by including certain stabilizing agents commonly used in the radiopharmaceutical field, the stability of the radiopharmaceutical compositions disclosed herein can be further improved. As such, this disclosure provides unique features of certain formulations that are applicable to a broad scope of CROWN-based radiolabeled conjugates.

Radiopharmaceutical Composition

In one aspect, this disclosure covers a radiopharmaceutical composition comprising a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

Formula I

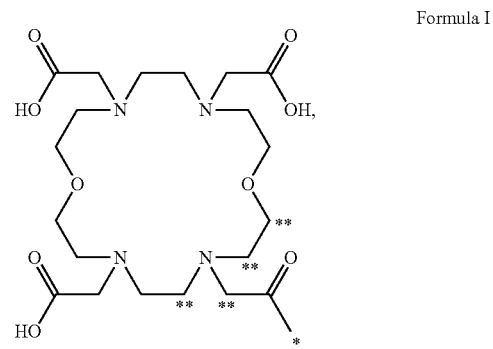 [SMILES: CC(=O)CN1CCOCCN(CC(=O)O)CCN(CC(=O)O)CCOCCN(CC(=O)O)CC1]

where * and  designate possible points of attachment of the chelator to L, and when the chelator is attached to L at the point designated by , the point designated by * represents the group -OH;

wherein the radiopharmaceutical composition is an aqueous formulation having a pH value in the range of 5-8 and optionally comprises one or more stabilizing agents, and wherein the radiopharmaceutical composition has a radiochemical purity (RCP) of at least 90% after 120 hours of storage at or below room temperature as determined by radio-TLC, iTLC, or HPLC.

In some embodiments, the radiopharmaceutical composition is an aqueous formulation having a pH value in the range of pH 5.5-6, pH 6-6.5, pH 6.5-7, pH 7-7.5, pH 7.5-8, pH 5.5-6.5, pH 6-7, pH 6.5-7.5, pH 7-8, pH 5.5-7, pH 6-7.5, pH 6.5-8, pH 5.5-7.5, pH 6-8, or pH 5.5-8. In a preferred embodiment, the radiopharmaceutical composition has a pH value in the range of about 6-8 (e.g., pH 5.8, pH 6.0, pH 6.2, pH 6.4, pH 6.6, pH 6.8, pH 7.0, pH 7.2, pH 7.4, pH 7.6, pH 7.8, pH 8.0, pH 8.2). In a more preferred embodiment, the radiopharmaceutical composition has a pH value in the range of about 7-8 (e.g., pH 6.8, pH 7.0, pH 7.2, pH 7.4, pH 7.6, pH 7.8, pH 8.0, pH 8.2).

In some embodiments, the radiopharmaceutical composition comprises one or more stabilizing agents. The one or more stabilizing agents can comprise a radiolysis stabilizer or a free metal chelator.

The radiolysis stabilizer can be an amino acid or a peptide or a derivative thereof, a vitamin or a derivative thereof, a lipid or a derivative thereof, a carbohydrate or a derivative thereof, or an antioxidant. Examples of a radiolysis stabilizer include, but are not limited to, ethanol, ascorbic acid or a salt thereof, and gentisic acid or a salt thereof, each of which can be used independently or collectively in a radiopharmaceutical composition.

The free metal chelator is not attached to the cellular antigen binding moiety (TM) and is used to limit the free radionuclide (i.e., radionuclide unbound to CROWN) in the radiopharmaceutical composition below a certain level (e.g., below about 0.05 mCi/L). Examples of a free metal chelator include, but are not limited to, DOTA, macropa, DFO, and DTPA, or a combination thereof.

Frozen Aqueous Composition

In another aspect, this disclosure covers a dosage form comprising a pharmaceutically acceptable frozen aqueous composition for intravenous administration post thaw, the frozen aqueous composition comprising:

a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

Formula I

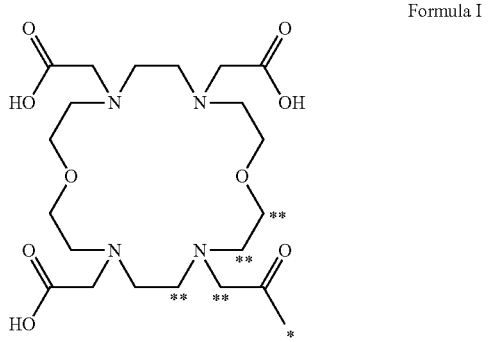 [SMILES: CC(=O)CN1CCOCCN(CC(=O)O)CCN(CC(=O)O)CCOCCN(CC(=O)O)CC1]

where * and  designate possible points of attachment of the chelator to L, and when the chelator is attached to L at the point designated by , the point designated by * represents the group —OH; and a pH buffer, wherein the frozen aqueous composition has a pH value in the range of 5-8 upon thawing.

As used herein, the term "frozen aqueous composition" refers to a pharmaceutical composition that can be formed by freezing an aqueous composition in a freezer, which typically follows the USP definition to be a place in which the temperature is controlled between −25° C. and −10° C. (or between −13° F. and 14° F.). Alternatively, a frozen aqueous composition can also be formed by freezing an aqueous composition in a container, a package, or a place where the temperature is controlled below −25° C. (e.g., about −30° C., about −40° C., about −50° C., about −60° C., about −70° C., or about −80° C.).

In some embodiments, the dosage form described above features that the frozen aqueous composition further comprises one or more stabilizing agents. In certain embodiments, the one or more stabilizing agents comprise a radiolysis stabilizer selected from ethanol, ascorbic acid or a salt thereof, gentisic acid or a salt thereof, or a combination thereof.

In some embodiments, the dosage form described above features that the one or more stabilizing agents comprise ethanol.

In certain embodiments, the dosage form described above features that the frozen aqueous composition comprises ethanol in an amount of 0.1-20% by volume, such as 1-20%, 2-20%, 5-20%, 5-15%, 5-10%, 5-8% by volume. In certain embodiments, the frozen aqueous composition comprises ethanol in the amount of 1-20% by volume. In certain embodiments, the amount of ethanol may be less than 10% by volume, such as less than 8% by volume, less than 5% by volume, or less than 1% by volume, of the frozen aqueous composition. In some embodiments, the ethanol is provided in a concentration of about 0.5% to about 20% by volume. In some embodiments, the ethanol is provided in a concentration of about 5% to about 15% by volume. In some embodiments, the ethanol is provided in a concentration of about 8% to about 12% by volume. In some embodiments, the ethanol is provided in a concentration of about 9% to about 11% by volume. In some embodiments, the ethanol is provided in a concentration of about 10% by volume. In some embodiments, the ethanol is provided in a concentration of at least 0.5% by volume. In some embodiments, the ethanol is provided in a concentration of at least 1% by volume. In some embodiments, the ethanol is provided in a concentration of at least 5% by volume. In some embodiments, the ethanol is provided in a concentration of at least 8% by volume. In some embodiments, the ethanol is provided in a concentration of no more than 20% by volume. In some embodiments, the ethanol is provided in a concentration of no more than 15% by volume. In some embodiments, the ethanol is provided in a concentration of no more than 12% by volume. In some embodiments, the ethanol is provided in a concentration of no more than 11% by volume. In some embodiments, the ethanol is provided in a concentration of no more than 10% by volume. In some embodiments, the ethanol is provided in a concentration of no more than 9% by volume. In some embodiments, the ethanol is provided in a concentration of no more than 8% by volume. In some embodiments, the ethanol is provided in a concentration of about 1-8% by volume, e.g., about 2-8% by volume, about 3-8% by volume, about 4-8% by volume, about 5-8% by volume, about 6-8% by volume, about 7-8% by volume.

In some embodiments, the dosage form described above features that the one or more stabilizing agents comprise ascorbic acid, or a salt thereof, present in the frozen aqueous composition at a concentration of 1-500 mM or 0.1-100 mg/mL.

According to certain embodiments, the ascorbic acid or salt thereof is present in the composition at a concentration of 1 mM to 10 M. In some embodiments, the ascorbic acid or salt thereof is present in the composition at a concentration of 10 mM to 500 mM. In some embodiments, the ascorbic acid or salt thereof present in the composition at a concentration of 20 mM to 500 mM. In some embodiments, the ascorbic acid or salt thereof is present in the composition at a concentration of 40 mM to 250 mM. In some embodiments, the ascorbic acid or salt thereof is present in the composition at a concentration of 80 mM to 125 mM. In some embodiments, the ascorbic acid or salt thereof is present in the composition at a concentration of 90 mM to 110 mM. In some embodiments, the ascorbic acid or salt thereof is present in the composition at a concentration of about 100 mM. In some embodiments, the ascorbic acid or salt thereof is present in the composition at a concentration of about 0.1 mg/mL to 100 mg/mL. In some embodiments, the ascorbic acid or salt thereof is present in the composition at a concentration of about 0.5 mg/mL to 50 mg/mL. In some embodiments, the ascorbic acid or salt thereof is present in the composition at a concentration of about 1 mg/mL to 30 mg/mL. In some embodiments, the ascorbic acid or salt thereof is present in the composition at a concentration of about 1 mg/mL to 10 mg/mL.

According to certain embodiments, the ascorbic acid or salt thereof is present in the composition at a concentration of from about 50 mM to about 500 mM. In some embodiments, the ascorbic acid or salt thereof is present in the composition at a concentration of about 75 mM to about 450 mM. In some embodiments, the ascorbic acid or salt thereof is present in the composition at a concentration of from about 100 mM to about 400 mM. In some embodiments, the ascorbic acid or salt thereof is present in liquid aqueous composition at a concentration of from about 200 mM to about 300 mM. In some embodiments, the ascorbic acid or salt thereof is present in the composition at a concentration of about 250 mM. In some embodiments, the ascorbic acid or salt thereof is present in the composition at a concentration of from about 10 mM to about 300 mM. In some embodiments, the ascorbic acid or salt thereof is present in the composition at a concentration of from about 25 mM to about 250 mM. In some embodiments, the ascorbic acid or salt thereof is present in the composition at a concentration of from about 50 mM to about 200 mM. In some embodiments, the ascorbic acid or salt thereof is present in the composition at a concentration of from about 75 mM to about 150 mM. In some embodiments, the ascorbic acid or salt thereof is present in the composition at a concentration of about 100 mM.

In some embodiments, the ascorbic acid or salt thereof is present in the composition at a concentration of at least 10 mM. In some embodiments, the ascorbic acid or salt thereof is present in the composition at a concentration of at least 25 mM. In some embodiments, the ascorbic acid or salt thereof is present in the composition at a concentration of at least 50 mM. In some embodiments, the ascorbic acid or salt thereof is present in the composition at a concentration of at least 75 mM. In some embodiments, the ascorbic acid or salt thereof is present in the composition at a concentration of at least 100 mM. In some embodiments, the ascorbic acid or salt thereof is present in the composition at a concentration of at least 200 mM. In some embodiments, the ascorbic acid or salt thereof is present in the composition at a concentration of at least 250 mM. In some embodiments, the ascorbic acid or salt thereof is present in the composition at a concentration of no more than 500 mM. In some embodiments, the ascorbic acid or salt thereof is present in the composition at a concentration of no more than 450 mM. In some embodiments, the ascorbic acid or salt thereof is present in the composition at a concentration of no more than 400 mM. In some embodiments, the ascorbic acid or salt thereof is present in the composition at a concentration of no more than 300 mM. In some embodiments, the ascorbic acid or salt thereof is present in the composition at a concentration of no more than 250 mM. In some embodiments, the ascorbic acid or salt thereof is present in the composition at a concentration of no more than 200 mM. In some embodiments, the ascorbic acid or salt thereof is present in the composition at a concentration of no more than 150 mM. In some embodiments, the ascorbic acid or salt thereof is present in the composition at a concentration of no more than 100 mM.

In some embodiments, the dosage form described above features that the one or more stabilizing agents comprise gentisic acid, or a salt thereof, present in the aqueous composition at a concentration of 0.1-1000 mM or 0.1-100 mg/mL.

According to certain embodiments, the gentisic acid or salt thereof is present in the composition at a concentration of 0.1 mM to 1000 mM. In some embodiments, the gentisic acid or salt thereof is present in the liquid aqueous at a concentration of 1 mM to 1000 mM. In some embodiments, the gentisic acid or salt thereof present in the composition at a concentration of 10 mM to 100 mM. In some embodiments, the gentisic acid or salt thereof is present in the composition at a concentration of 10 mM to 150 mM. In some embodiments, the gentisic acid or salt thereof is present in the composition AT a concentration of 20 mM to 125 mM. In some embodiments, the gentisic acid or salt thereof is present in the composition at a concentration of 90 mM to 110 mM. In some embodiments, the gentisic acid or salt thereof is present in the liquid aqueous at a concentration of about 100 mM. In some embodiments, the gentisic acid or salt thereof is present in the composition at a concentration of about 0.1 mg/mL to 100 mg/mL. In some embodiments, the gentisic acid or salt thereof is present in the composition at a concentration of about 0.5 mg/mL to 50 mg/mL. In some embodiments, the gentisic acid or salt thereof is present in the composition at a concentration of about 1 mg/mL to 20 mg/mL.

In some embodiments, the gentisic acid or salt thereof is present in the composition at a concentration of from about 0.5 mM to about 30 mM. In some embodiments, the gentisic acid or salt thereof is present in the composition at a concentration of from about 3 mM to 25 mM. In some embodiments, the gentisic acid or salt thereof is present in the composition at a concentration of from about 5 mM to 20 mM. In some embodiments, the gentisic acid or salt thereof is present in the composition at a concentration of at least 0.5 mM. In some embodiments, the gentisic acid or salt thereof is present in the composition at a concentration of at least 3 mM. In some embodiments, the gentisic acid or salt thereof is present in the composition at a concentration of at least 5 mM. In some embodiments, the gentisic acid or salt thereof is present in the composition at a concentration of no more than 30 mM. In some embodiments, the gentisic acid or salt thereof is present in the composition at a concentration of no more than 25 mM. In some embodiments, the gentisic acid or salt thereof is present in the composition at a concentration of no more than 20 mM.

In some embodiments, the dosage form described above features that the frozen aqueous composition further contains one or more free metal chelators. Optionally, the one or more free metal chelators are present in the composition following the radiolabeling reaction set forth below. The free metal chelators are selected from any of the chelators listed in Table 4 below or a combination thereof. Optionally, the free metal chelator is diethylene triamine pentaacetic acid (DTPA), or a combination of DTPA and one or more than one of the chelators listed in Table 4.

TABLE 4

Exemplary Chelators.
Chelator

DOTA, 1,4,7,10-tetraazacyclododecane-1,4,7,10-tetraacetic acid

CB-DO2A, 4,10-bis(carboxymethyl)-1,4,7,10-tetraazabicyclo[5.5.2]tetradecane

TCMC, 1,4,7,10-tetrakis(carbamoylmethyl)-1,4,7,10-tetraazacyclododecane

3p-C-DEPA p-NH$_2$-Bn-Oxo-DO3A

TABLE 4-continued

Exemplary Chelators.
Chelator

TETA, 1,4,8,11-tetraazacyclotetradecane-1,4,8,11-tetraacetic acid

CB-TE2A, 4,11-bis-(carboxymethyl)-1,4,8,11-tetraazabicyclo[6.6.2]-hexadecane

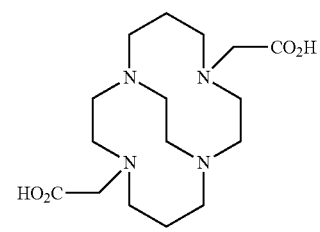

Diamsar

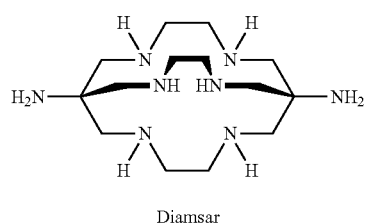

NOTA, 1,4,7-triazacyclononane-1,4,7-triacetic acid

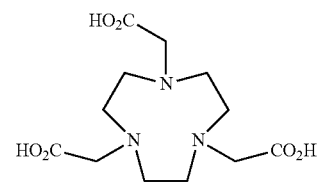 [SMILES: O=C(O)CN1CCN(CC(=O)O)CCN(CC(=O)O)CC1]

NETA, {4-[2-(bis-carboxymethylamino)-ethyl]-7-carboxymethyl-[1,4,7]triazonan-1-yl}-acetic acid

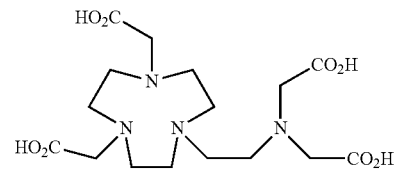 [SMILES: O=C(O)CN1CCN(CCN(CC(=O)O)CC(=O)O)CCN(CC(=O)O)CC1]

HxTSE

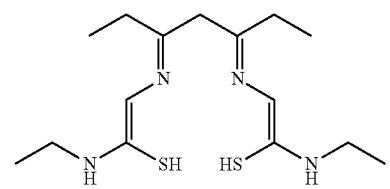 [SMILES: CCN/C(S)=C/N=C(\CC)C/C(CC)=N/C=C(\S)NCC]

P$_2$N$_2$Ph$_2$

TABLE 4-continued

Exemplary Chelators.
Chelator

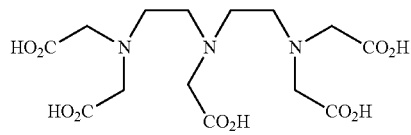

DTPA, diethylene triamine pentaacetic acid

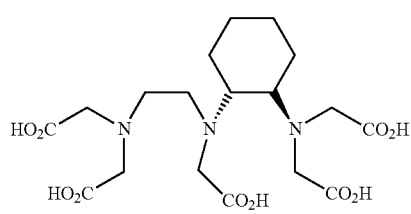

CHX-A00-DTPA, 2-(p-isothiocyanatobenzyl)-
Cyclohexyldiethylenetriaminepentaacetic acid

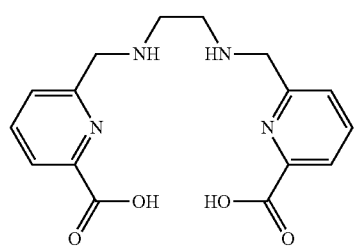 [SMILES: O=C(O)c1cccc(CNCCNCc2cccc(C(=O)O)n2)n1]

H$_2$dedpa, 1,2-[[6-(carboxy)-pyridin-2-yl]-
methylamino]ethane

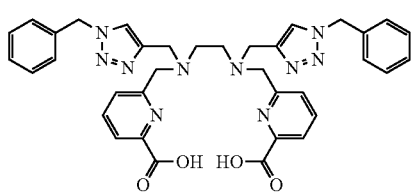 [SMILES: O=C(O)c1cccc(CN(CCN(Cc2cn(Cc3ccccc3)nn2)Cc2cccc(C(=O)O)n2)Cc2cn(Cc3ccccc3)nn2)n1]

H$_2$azapa, N,N'-[1-benzyl-1,2,3-triazole-4-yl]methyl-
N,N'-[6-(carboxy)pyridin-2-yl]-1,2-diaminoethane

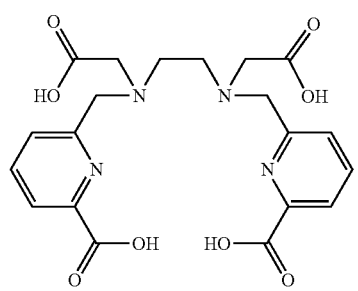 [SMILES: O=C(O)CN(CCN(CC(=O)O)Cc1cccc(C(=O)O)n1)Cc1cccc(C(=O)O)n1]

H$_4$octapa

TABLE 4-continued

Exemplary Chelators.
Chelator

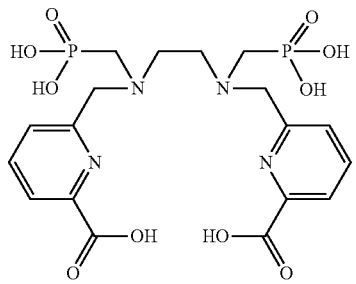 [SMILES: O=C(O)c1cccc(CN(CCN(Cc2cccc(C(=O)O)n2)CP(=O)(O)O)CP(=O)(O)O)n1]

H$_6$phospa

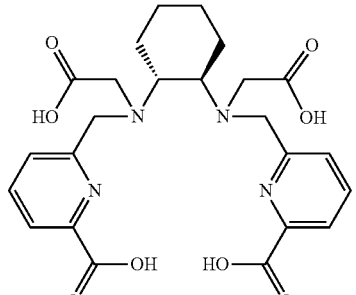

H$_4$CHXoctapa

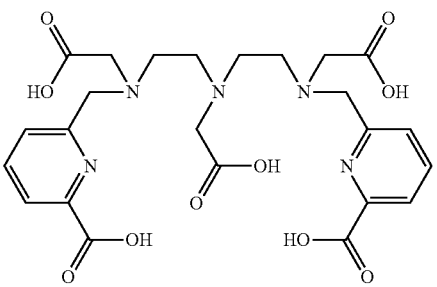 [SMILES: O=C(O)CN(CCN(CC(=O)O)Cc1cccc(C(=O)O)n1)CCN(CC(=O)O)Cc1cccc(C(=O)O)n1]

H$_5$decapa

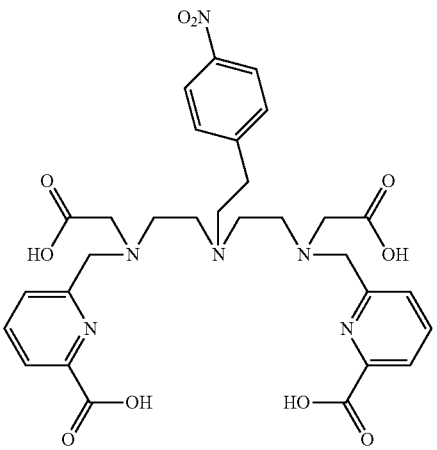 [SMILES: O=C(O)CN(CCN(CCc1ccc([N+](=O)[O-])cc1)CCN(CC(=O)O)Cc1cccc(C(=O)O)n1)Cc1cccc(C(=O)O)n1]

H$_4$neunpa-p-Bn-NO$_2$

TABLE 4-continued

Exemplary Chelators.
Chelator

HBED, N,N'-Bis(2-hydroxybenzyl)ethylenediamine-N,N'-diacetic acid
SHBED, N,N'-bis(2-hydroxy-5-sulfobenzyl)-ethylenediamine-N,N'-diacetic acid

BPCA

PCTA, 3,6,9,15-tetraazabicyclo[9.3.1]-pentadeca-1(15),11,13-triene-3,6,9,-triacetic acid H2-MACROPA (N,N'-bis[(6-carboxy-2-pyridil)methyl]-4,13-diaza-18-CROWN-6)

The concentration of free metal chelators present in the compositions or formulations are expressed as "equivalents" to the moles of CROWN-L-TM conjugate, wherein L is a bond or a linker, and wherein TM is a cellular antigen binding moiety such as TATE or other SSTR binding moiety described herein. In some embodiments, the free metal chelators are present at or less than 1000 equivalents to the moles of CROWN-L-TM conjugate. In some embodiments, the free metal chelators are present at or less than 500 equivalents to the moles of CROWN-L-TM conjugate. In some embodiments, the free metal chelators are present at or less than 100 equivalents to the moles of CROWN-L-TM conjugate. In some embodiments, the free metal chelators are present at or less than 100 equivalents to the moles of CROWN-L-TM conjugate. In some embodiments, the free metal chelators are present at a concentration from 10 to 500 equivalents to the moles of CROWN-L-TM conjugate. In some embodiments, the free metal chelators are present at a concentration of 100 equivalents to the moles of CROWN-L-TM conjugate.

According to certain embodiments, the frozen aqueous composition comprises a free metal chelator comprising diethylene triamine pentaacetic acid (DTPA). DTPA has been reported to bind disassociated other free radionuclides (including $^{225}$Ac and its daughters) in solution, promoting excretion by the kidneys after injection in a patient (Production and Quality Control of Actinium-225 Radiopharmaceuticals, International Atomic Energy Agency, IAEA-TEC-DOC-2057, 2024). In some embodiments, the dosage form described above features that the one or more stabilizing agents comprise DTPA, as a free metal chelator, present in the aqueous composition at a concentration of 0.05-1 mM.

In some embodiments, the frozen aqueous composition comprises DTPA in a concentration of from about 0.10 mM to about 0.50 mM. In some embodiments, the composition comprises DTPA in a concentration of from about 0.20 mM to about 0.30 mM. In some embodiments, the composition comprises DTPA in a concentration of about 0.25 mM. In some embodiments, the composition comprises DTPA in a concentration of at least 0.05 mM. In some embodiments, the composition comprises DTPA in a concentration of at least 0.10 mM. In some embodiments, the composition comprises DTPA in a concentration of at least 0.50 mM. In some embodiments, the composition comprises DTPA in a concentration of at least 0.25 mM. In some embodiments, the composition comprises DTPA in a concentration of no more than 1 mM. In some embodiments, the composition comprises DTPA in a concentration of no more than 0.05 mM. In some embodiments, the composition comprises DTPA in a concentration of no more than 0.3 mm. In some embodiments, the composition comprises DTPA in a concentration of no more than 0.25 mM.

In some embodiments, the dosage form described above features that the frozen aqueous composition has a pH value in the range of pH 5.5-6, pH 6-6.5, pH 6.5-7, pH 7-7.5, pH 7.5-8, pH 5.5-6.5, pH 6-7, pH 6.5-7.5, pH 7-8, pH 5.5-7, pH 6-7.5, pH 6.5-8, pH 5.5-7.5, pH 6-8, or pH 5.5-8.

In some embodiments, the dosage form described above features that the frozen aqueous composition has a pH value in the range of 5.5-8 upon thawing.

In some embodiments, the dosage form described above features that the frozen aqueous composition has a pH value in the range of about 6-8 (e.g., pH 5.8, pH 6.0, pH 6.2, pH 6.4, pH 6.6, pH 6.8, pH 7.0, pH 7.2, pH 7.4, pH 7.6, pH 7.8, pH 8.0, pH 8.2) upon thawing.

In some embodiments, the dosage form described above features that the frozen aqueous composition has a pH value in the range of about 7-8 (e.g., pH 6.8, pH 7.0, pH 7.2, pH 7.4, pH 7.6, pH 7.8, pH 8.0, pH 8.2) upon thawing.

In some embodiments, the dosage form described above features that the frozen aqueous composition is formed by freezing a corresponding liquid aqueous composition at or below −15° C. (e.g., about −20° C., about −30° C., about −40° C., about −50° C., about −60° C., about −70° C., or about −80° C.).

In some embodiments, the dosage form described above features that the frozen aqueous composition is formed by freezing a corresponding aqueous composition at −20° C. or −80° C.

In some embodiments, the dosage form described above features that the radionuclide, $R^N$, is selected from the group consisting of $^{44}$Sc, $^{47}$Sc, $^{61}$Cu, $^{64}$Cu, $^{67}$Cu, $^{67}$Ga, $^{68}$Ga, $^{72}$As, $^{77}$As, $^{86}$Y, $^{89}$Y, $^{90}$Y, $^{89}$Zr, $^{90}$Nb, $^{94m}$Tc, $^{99m}$Tc, $^{105}$Rh, $^{109}$Pd, $^{111}$In, $^{114m}$In, $^{117m}$Sn, $^{137}$Cs, $^{141}$Cs, $^{140}$La, $^{141}$Ce, $^{142}$Pr, $^{143}$Pr, $^{145}$Pr, $^{149}$Pm, $^{149}$Tb, $^{152}$Tb, $^{155}$Tb, $^{161}$Tb, $^{150}$Eu, $^{153}$Sm, $^{159}$Gd, $^{161}$Ho, $^{166}$Ho, $^{165}$Er, $^{169}$Er, $^{165}$Dy, $^{166}$Dy, $^{167}$Tm, $^{170}$Tm, $^{169}$Yb, $^{175}$Yb, $^{177}$Lu, $^{186}$Re, $^{188}$Re, $^{198}$Au, $^{199}$Au, $^{203}$Pb, $^{212}$Pb, $^{211}$At, $^{211}$Fr, $^{212}$Bi, $^{213}$Bi, $^{225}$Ac, $^{226}$Th, and $^{227}$Th.

In some embodiments, the dosage form described above features that the radionuclide, $R^N$, is $^{67}$Cu, $^{149}$Tb, $^{161}$Tb, $^{177}$Lu, $^{212}$Pb, or $^{225}$Ac.

In some embodiments, the dosage form described above features that the cellular antigen binding moiety binds to a biological target selected from the group consisting of androgen receptor (AR), carbonic anhydrase 9 (CA-IX), C-X-C chemokine receptor type 4 (CXCR4), cytotoxic T-lymphocyte-associated protein 4 (CTLA-4), epidermal growth factor receptor (EGFR), epidermal growth factor receptor 2 (ERBB2), epidermal growth factor receptor 3 (ERBB3), fibroblast activation protein α (FAPα), gastrin-releasing peptide receptor (GRPR), glucagon-like peptide 1 receptor (GLP-1R), hypoxia, melanocortin-1 receptor (MC1R), neurotensin receptor 1 (NTSR1), prostate-specific membrane antigen (PSMA), programmed cell death protein (PD-1), programmed death-ligand 1 (PD-L1), six-transmembrane epithelial antigen of prostate-1 (STEAP1), six-transmembrane epithelial antigen of prostate-2 (STEAP2), and somatostatin receptor (SSTR).

In some embodiments, the dosage form described above features that the cellular antigen binding moiety is selected from the group consisting of D-Phe$^1$-cyclo(Cys$^2$-Phe$^3$-D-Trp$^4$-Lys$^5$-Thr$^6$-Cys$^7$)-Thr$^8$ (octreotate), D-Phe$^1$-cyclo(Cys$^2$-Tyr$^3$-D-Trp$^4$-Lys$^5$-Thr$^6$-Cys$^7$)-Thr$^8$ (Tyr$^3$-octreotate or TATE), D-Phe$^1$-cyclo(Cys$^2$-Phe$^3$-D-Trp$^4$-Lys$^5$-Thr$^6$-Cys$^7$)-Thr(ol)$^8$ (octreotide or OC), D-Phe$^1$-cyclo(Cys$^2$-Tyr$^3$-D-Trp$^4$-Lys$^5$-Thr$^6$-Cys$^7$)-Thr(ol)$^8$ (Tyr$^3$-octreotide), D-Phe$^1$-cyclo(Cys$^2$-1-Nal-D-Trp$^4$-Lys$^5$-Thr$^6$-Cys$^7$)-Thr(ol)$^8$ ([1-Nal$^3$]-octreotide or NOC), p-Cl-Phe-cyclo(D-Cys-Tyr-D-Aph(Cbm)-Lys-Thr-Cys)-D-Tyr-NH$_2$ (LM3), 2-Nal-cyclo [Cys-Tyr-d-Trp-Lys-Val-Cys]-Thr-NH$_2$ (lanreotide), p-Cl-Phe-cyclo(D-Cys-Aph(Hor)-D-Aph(Cbm)-Lys-Thr-Cys)-D-Tyr-NH$_2$ (JR-11), p-NO$_2$-Phe-cyclo(D-Cys-Tyr-D-Aph(Cbm)-Lys-Thr-Cys)-D-Tyr-NH$_2$ (JR-10), d-Phe-cyclo [Cys-Tyr-d-Trp-Lys-Val-Cys]-Trp-NH$_2$ (vapreotide), and D-Phe$^1$-cyclo(Cys$^2$-Tyr$^3$-D-Trp$^4$-Lys$^5$-Thr$^6$-Cys$^7$)-Thr(ol)$^8$ (Phe$^1$-Tyr$^3$-octreotide, edotreotide, or TOC).

In some embodiments, the dosage form described above features that the cellular antigen binding moiety is TATE or LM3.

In some embodiments, the dosage form described above features that the linker is optionally substituted $C_{1-50}$ alkyl wherein one or more carbons are each, independently, replaced with O, S, NR, or C=O, wherein R is H or $C_{1-3}$ alkyl.

In some embodiments, the dosage form described above features that the frozen aqueous composition has an RCP of at least 90% after 120 hours of storage as determined by radio-TLC, iTLC, or HPLC.

In some embodiments, the dosage form described above features that the frozen aqueous composition has an RCP of at least 95% after 120 hours of storage as determined by radio-TLC, iTLC, or HPLC.

In some embodiments, the dosage form described above features that the frozen aqueous composition has an RCP of at least 98% after 120 hours of storage as determined by radio-TLC, iTLC, or HPLC.

In some embodiments, the dosage form described above features that the frozen aqueous composition has an RCP of at least 90% (e.g., at least 92%, at least 95%, at least 98%, or at least 99%) at 1 hour post thaw as determined by radio-TLC, iTLC, or HPLC.

In some embodiments, the dosage form described above features that the frozen aqueous composition has an RCP of at least 95% (e.g., at least 96%, at least 97%, at least 98%, or at least 99%) at 3-hour post thaw as determined by radio-TLC, iTLC, or HPLC.

In some embodiments, the dosage form described above features that the frozen aqueous composition has an RCP of at least 95% (e.g., at least 96%, at least 97%, at least 98%, or at least 99%) at 6-hour post thaw as determined by radio-TLC, iTLC, or HPLC.

In some embodiments, the dosage form described above features that the frozen aqueous composition has a pH value in the range of 6-8 upon thawing and has an RCP of at least 95% at 6-hour post thaw as determined by radio-TLC, iTLC, or HPLC.

In some embodiments, the dosage form described above features that the frozen aqueous composition has a pH value in the range of 7-8 upon thawing and has an RCP of at least 98% at 6-hour post thaw as determined by radio-TLC, iTLC, or HPLC.

Liquid Aqueous Composition

In still another aspect, this disclosure covers a dosage form comprising a pharmaceutically acceptable liquid aqueous composition for intravenous administration, the aqueous composition comprising a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

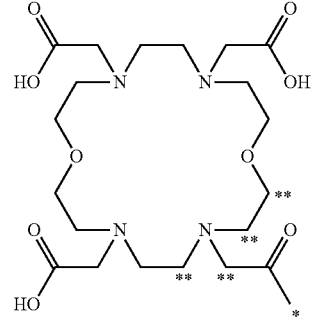

Formula I where * and  designate possible points of attachment of the chelator to L, and when the chelator is attached to L at the point designated by , the point designated by * represents the group —OH; and a pH buffer, wherein the liquid aqueous composition has a pH value of at least 5.5, and wherein the aqueous composition has a radiochemical purity (RCP) of at least 90% after 5 days storage at a temperature below 20° C., as determined by radio-TLC, iTLC, or HPLC.

As used herein, the term "liquid aqueous composition" refers to a pharmaceutical composition that stays in a liquid form while being stored in a cool condition (any temperature between 8° C. and 15° C. or between 46° F. and 59° F.), in a cold condition (any temperature not exceeding 8° C. or 46° F.), or under a refrigerated condition by using a refrigerator (which refers to a cold place in which the temperature is controlled between 2° C. and 8° C. or between 36° F. and 46° F.

In some embodiments, the dosage form described above features that the liquid aqueous composition further comprises one or more stabilizing agents. In certain embodiments, the one or more stabilizing agents comprise a radiolysis stabilizer selected from ethanol, ascorbic acid or a salt thereof, gentisic acid or a salt thereof, or a combination thereof.

In some embodiments, the liquid aqueous compositions comprise (1) antioxidants at effective concentrations to protect the radiolabeled conjugate from radiolytic degradation and (2) free metal chelators (e.g., DTPA) at effective concentrations to scavenge free radionuclide at room temperature storage conditions for up to about 4 hours, 8 hours, 24 hours, 48 hours, or longer, ensuring an RCP of greater than 90%. Such formulations are provided with storage conditions adequate to ensure time to deliver the RCP remains above 85% through the period required to deliver the radiopharmaceutical composition from the site of manufacture to the time of injection, which is generally at least 72 hours, preferably at least 120 hours.

In one such approach, a radiolysis stabilizing solution containing a mixture of any of the following is present before, during, or immediately following, the radiolabeling reaction: gentisic acid or a salt thereof, ascorbic acid or a salt thereof, and ethanol. By way of example, and according to one aspect of the disclosure, a radiolysis stabilizing solution containing gentisic acid or a salt thereof is present before, during or immediately following the radiolabeling reaction. By way of further example, and according to one aspect of the disclosure, a radiolysis stabilizing solution containing ascorbic acid or a salt thereof is present before, during, or formed immediately following the radiolabeling reaction. By way of further example, and according to one aspect of the disclosure, a radiolysis stabilizing solution containing ethanol is present before, during or formed immediately following the radiolabeling reaction. By way of further example, and according to one aspect of the disclosure, a radiolysis stabilizing solution containing gentisic acid or a salt thereof, and ascorbic acid or a salt thereof, is present before, during or formed immediately following the radiolabeling reaction. By way of further example, and according to one aspect of the disclosure, a radiolysis stabilizing solution containing gentisic acid or a salt thereof, and ethanol or a salt thereof, is present before, during or formed immediately following the radiolabeling reaction. By way of further example, and according to one aspect of the disclosure, a radiolysis stabilizing solution containing ethanol and ascorbic acid or a salt thereof, is present before, during or formed immediately following the radiolabeling reaction. By way of further example, and according to one aspect of the disclosure, a radiolysis stabilizing solution containing gentisic acid or a salt thereof, ascorbic acid or a salt thereof, and ethanol is present before, during or formed immediately following the radiolabeling reaction. By way of further example, and according to one aspect of the disclosure, the radiolysis stabilizing solution may further comprise acetic acid, sodium acetate, sodium chloride, or other buffer or salts, or combination thereof; and such radiolysis stabilizing solution is present before, during or formed immediately following the radiolabeling reaction.

In some embodiments, a stabilized formulation of a liquid aqueous composition is provided, the liquid aqueous composition comprises a radiolabeled conjugate and a radiolysis stabilizing solution comprising gentisic acid or a salt thereof, ascorbic acid or a salt thereof, or ethanol, or a combination thereof, dispersed in an aqueous vehicle, the radiolabeled conjugate having the formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

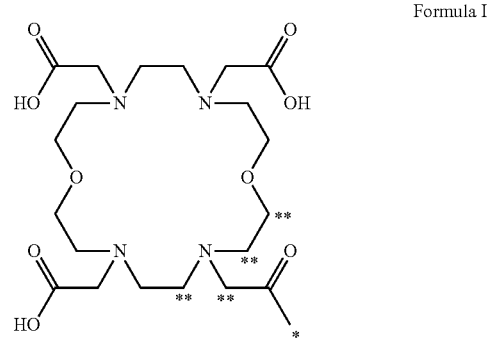

Formula I where * and  designate possible points of attachment of the chelator to L, and when the chelator is attached to L at the point designated by , the point designated by * represents the group —OH.

According to certain embodiments, the cellular antigen binding moiety (TM) is a somatostatin receptor (SSTR) binding moiety corresponding to any of those listed in Table 1, preferably an octreotate (e.g. [tyr³]octreotate), or a salt or derivative thereof.

In certain embodiments, the chelator in Formula I is preferably attached at the attachment point designated by * to the remainder of the radiolabeled conjugate.

According to certain embodiments, a stabilized formulation of a liquid aqueous composition is provided that comprises a radiolabeled conjugate, a radiolysis stabilizing solution comprising gentisic acid or a salt thereof, ascorbic acid or a salt thereof, or ethanol, or a combination thereof, dispersed in an aqueous vehicle, wherein the radiolabeled conjugate corresponds to Formula 5a, or a derivative and/or a salt thereof:

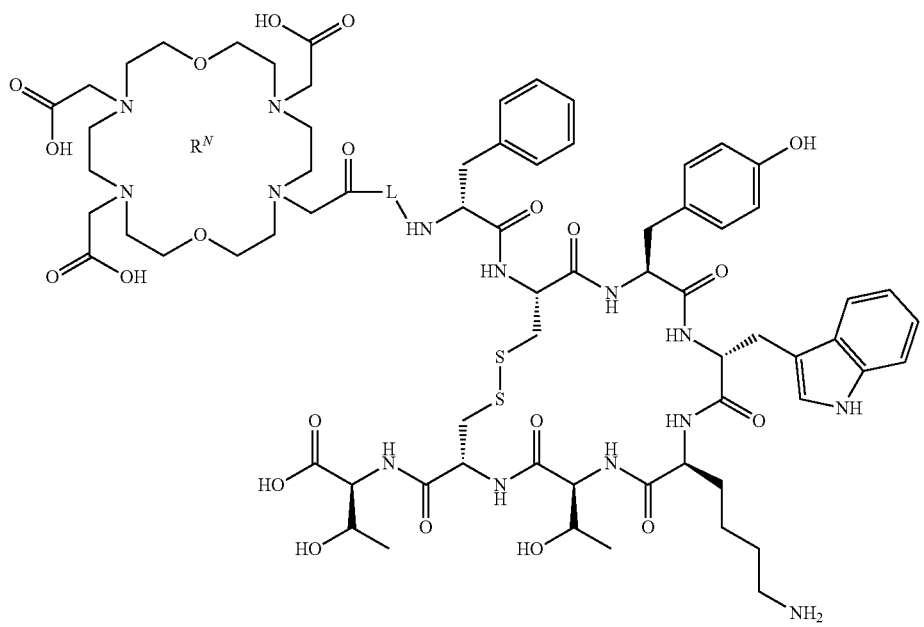

Formula 5a wherein $R^N$ is a radionuclide chelated by the radiolabeled conjugate, L is a bond or a linker.

In one embodiment, the liquid aqueous composition comprises 2,2',2'',2'''-(1,10-dioxa-4,7,13,16-tetraazacyclooctadecane-4,7,13,16-tetrayl)tetraacetic acid (CROWN), linked to the cellular antigen binding moiety (TM) such as the SSTR-binding moiety octreotate (TATE) via a linker L (e.g. CROWN-L-TATE, where L is a linker). In another embodiment, the liquid aqueous composition comprises CROWN directly covalently bonded to the cellular antigen binding moiety (TM) such as TATE (e.g. CROWN-L-TATE, where L is a bond, or in other words CROWN-TATE). According to certain embodiments, the radionuclide, $R^N$ comprises $^{225}$Ac, such as for example when the liquid aqueous composition is a therapeutic and/or treatment composition to be used for therapeutic purposes, although other radionuclides disclosed herein may also be used, such as for example 177Lu. In another embodiment, the radionuclide is 68Ga for stabilized diagnostic formulations. Accordingly, in certain embodiments, the liquid aqueous composition comprises $^{225}$Ac chelated to CROWN, such as in the targeting compound $^{225}$Ac-CROWN-L-TATE (where L is a linker or bond), or simply $^{225}$Ac-CROWN-TATE.

In one embodiment, the radiolysis stabilizing solution provided to stabilize the radiolabeled chelator (RC), such as the radiolabeled chelator corresponding to $^{225}$Ac chelated by CROWN, contains a mixture of any of the following: gentisic acid or a salt thereof, ascorbic acid or a salt thereof, and ethanol. According to one embodiment, the radiolysis stabilizing solution comprises gentisic acid or a salt thereof, and optionally may be substantially absent any of ascorbic acid or salt thereof, or ethanol. According to another embodiment, the radiolysis stabilizing solution comprise ascorbic acid or a salt thereof, and optionally may be substantially absent any of gentisic acid or salt thereof, or ethanol. According to another embodiment, the radiolysis stabilizing solution comprises ethanol, and optionally may be substantially absent any of ascorbic acid or salt thereof, or gentisic acid or salt thereof. According to another embodiment, when the radiolysis stabilizing solution comprises ethanol, the ethanol further serves to solubilize the CROWN-L-TM, wherein TM is the cellular antigen binding moiety such as TATE or other SSTR binding moiety selected from Table 1, wherein L is a bond or a linker, optionally the CROWN-L-TM contains a radionuclide, and further optionally the radionuclide is $^{225}$Ac or $^{177}$Lu. According to yet another embodiment, the radiolysis stabilizing solution comprises gentisic acid or a salt thereof, and ascorbic acid or a salt thereof, and is optionally substantially absent any ethanol. In yet another embodiment, the radiolysis stabilizing solution comprises gentisic acid or a salt thereof, and ethanol or a salt thereof, and optionally may be substantially absent any ascorbic acid or salt thereof. According to another embodiment, the radiolysis stabilizing solution comprises ethanol and ascorbic acid or a salt thereof and is substantially absent any gentisic acid or salt thereof. According to yet another embodiment, the radiolysis stabilizing solution comprises gentisic acid or a salt thereof, ascorbic acid or a salt thereof, and ethanol.

In one embodiment, the liquid aqueous composition comprises an aqueous vehicle, such as a saline solution. In further embodiments, the aqueous vehicle may comprise physiologically acceptable buffer or salt solution, such as phosphate, citrate, or acetate buffers or physiologically acceptable sodium chloride solutions or a combination thereof.

According to certain embodiments, the liquid aqueous composition comprises one or more stabilizing agents selected from gentisic acid or salt thereof, ascorbic acid or salt thereof, ethanol, or a combination thereof. In one embodiment, the liquid aqueous composition comprises one or more of the stabilizing agents in a concentration of from about 0.01 mM to about 5 M. In some embodiments, the one or more stabilizing agents may be present in the composition in a concentration of from about 5 mM, 10 mM, 25 mM, 50 mM, or 75 mM to about 80 mM, 100 mM, 125 mM, 150 mM, 175 mM, 200 mM, 250 mM, or 500 mM. In some embodiments, the one or more stabilizing agents are present in the composition in a concentration of about 0.1 mM to about 500 mM. In some embodiments, the one or more stabilizing agents are present in the composition at a concentration of about 10 mM to about 500 mM. In some embodiments, the one or more stabilizing agents are present in the composition at a concentration of about 20 mM to about 100 mM. In some embodiments, the one or more stabilizing agents are present in the composition at a concentration of from about 0.0001 mg/mL to about 50 mg/mL. In some embodiments, the one or more stabilizing agents are present in the composition in an amount of about 0.01 mg/mL to about 20 mg/mL, about 0.05 mg/mL to about 20 mg/mL, about 0.1 mg/mL to about 10 mg/mL, or about 0.1 mg/mL to about 5 mg/mL. In one embodiment, the liquid aqueous composition comprises a molar ratio of one of the stabilizing agents to another of the stabilizing agents, that is in the range of from 1:5 to 5:1.

According to certain embodiments, the ascorbic acid or salt thereof is present in the liquid aqueous composition at a concentration of 1 mM to 10 M. In some embodiments, the ascorbic acid or salt thereof is present in the composition at a concentration of 10 mM to 500 mM. In some embodiments, the ascorbic acid or salt thereof present in the composition at a concentration of 20 mM to 500 mM. In some embodiments, the ascorbic acid or salt thereof is present in the composition at a concentration of 40 mM to 250 mM. In some embodiments, the ascorbic acid or salt thereof is present in the composition at a concentration of 80 mM to 125 mM. In some embodiments, the ascorbic acid or salt thereof is present in the composition at a concentration of 90 mM to 110 mM. In some embodiments, the ascorbic acid or salt thereof is present in the composition at a concentration of about 100 mM. In some embodiments, the ascorbic acid or salt thereof is present in the composition at a concentration of about 0.1 mg/ml to 100 mg/mL. In some embodiments, the ascorbic acid or salt thereof is present in the composition at a concentration of about 0.5 mg/mL to 50 mg/mL. In some embodiments, the ascorbic acid or salt thereof is present in the composition at a concentration of about 1 mg/mL to 30 mg/mL. In some embodiments, the ascorbic acid or salt thereof is present in the composition at a concentration of about 1 mg/mL to 10 mg/mL.

According to certain embodiments, the ascorbic acid or salt thereof is present in the composition at a concentration of from about 50 mM to about 500 mM. In some embodiments, the ascorbic acid or salt thereof is present in the the liquid aqueous composition at a concentration of about 75 mM to about 450 mM. In some embodiments, the ascorbic acid or salt thereof is present in the composition at a concentration of from about 100 mM to about 400 mM. In some embodiments, the ascorbic acid or salt thereof is present in liquid aqueous composition at a concentration of from about 200 mM to about 300 mM. In some embodiments, the ascorbic acid or salt thereof is present in the composition at a concentration of about 250 mM. In some embodiments, the ascorbic acid or salt thereof is present in the composition at a concentration of from about 10 mM to about 300 mM. In some embodiments, the ascorbic acid or salt thereof is present in the composition at a concentration of from about 25 mM to about 250 mM. In some embodiments, the ascorbic acid or salt thereof is present in the composition at a concentration of from about 50 mM to about 200 mM. In some embodiments, the ascorbic acid or salt thereof is present in the composition at a concentration of from about 75 mM to about 150 mM. In some embodiments, the ascorbic acid or salt thereof is present in the composition at a concentration of about 100 mM.

In some embodiments, the ascorbic acid or salt thereof is present in the liquid aqueous composition at a concentration of at least 10 mM. In some embodiments, the ascorbic acid or salt thereof is present in the composition at a concentration of at least 25 mM. In some embodiments, the ascorbic acid or salt thereof is present in the composition at a concentration of at least 50 mM. In some embodiments, the ascorbic acid or salt thereof is present in the composition at a concentration of at least 75 mM. In some embodiments, the ascorbic acid or salt thereof is present in the composition at a concentration of at least 100 mM. In some embodiments, the ascorbic acid or salt thereof is present in the composition at a concentration of at least 200 mM. In some embodiments, the ascorbic acid or salt thereof is present in the composition at a concentration of at least 250 mM. In some embodiments, the ascorbic acid or salt thereof is present in the composition at a concentration of no more than 500 mM. In some embodiments, the ascorbic acid or salt thereof is present in the composition at a concentration of no more than 450 mM. In some embodiments, the ascorbic acid or salt thereof is present in the composition at a concentration of no more than 400 mM. In some embodiments, the ascorbic acid or salt thereof is present in the composition at a concentration of no more than 300 mM. In some embodiments, the ascorbic acid or salt thereof is present in the composition at a concentration of no more than 250 mM. In some embodiments, the ascorbic acid or salt thereof is present in the composition at a concentration of no more than 200 mM. In some embodiments, the ascorbic acid or salt thereof is present in the composition at a concentration of no more than 150 mM. In some embodiments, the ascorbic acid or salt thereof is present in the composition at a concentration of no more than 100 mM.

According to certain embodiments, the gentisic acid or salt thereof is present in the liquid aqueous composition at a concentration of 0.1 mM to 1 M. In some embodiments, the gentisic acid or salt thereof is present in the liquid aqueous at a concentration of 1 mM to 1 M. In some embodiments, the gentisic acid or salt thereof present in the composition at a concentration of 10 mM to 100 mM. In some embodiments, the gentisic acid or salt thereof is present in the composition at a concentration of 10 mM to 150 mM. In some embodiments, the gentisic acid or salt thereof is present in the composition AT a concentration of 20 mM to 125 mM. In some embodiments, the gentisic acid or salt thereof is present in the composition at a concentration of 90 mM to 110 mM. In some embodiments, the gentisic acid or salt thereof is present in the liquid aqueous at a concentration of about 100 mM. In some embodiments, the gentisic acid or salt thereof is present in the composition at a concentration of about 0.1 mg/ml to 100 mg/mL. In some embodiments, the gentisic acid or salt thereof is present in the composition at a concentration of about 0.5 mg/mL to 50 mg/mL. In some embodiments, the gentisic acid or salt thereof is present in the composition at a concentration of about 1 mg/ml to 20 mg/mL.

In some embodiments, the gentisic acid or salt thereof is present in the liquid aqueous composition at a concentration of from about 0.5 mM to about 30 mM. In some embodiments, the gentisic acid or salt thereof is present in the composition at a concentration of from about 3 mM to 25 mM. In some embodiments, the gentisic acid or salt thereof is present in the composition at a concentration of from about 5 mM to 20 mM. In some embodiments, the gentisic acid or salt thereof is present in the composition at a concentration of at least 0.5 mM. In some embodiments, the gentisic acid or salt thereof is present in the composition at a concentration of at least 3 mM. In some embodiments, the gentisic acid or salt thereof is present in the composition at a concentration of at least 5 mM. In some embodiments, the gentisic acid or salt thereof is present in the composition at a concentration of no more than 30 mM. In some embodiments, the gentisic acid or salt thereof is present in the composition at a concentration of no more than 25 mM. In some embodiments, the gentisic acid or salt thereof is present in the composition at a concentration of no more than 20 mM.

According to certain embodiments, the liquid aqueous composition comprises ethanol in an amount of 0.1-20% by volume, such as 1-20% by volume, 2-20% by volume, 5-20% by volume, 2-10% by volume, 5-10% by volume, and in certain embodiments may be less than 10% by volume, such as less than 5% by volume, or less than 1% by volume, of the liquid aqueous. In some embodiments, the ethanol is provided in a concentration of about 0.5% to about 20% by volume. In some embodiments, the ethanol is provided in a concentration of about 5% to about 15% by volume. In some embodiments, the ethanol is provided in a concentration of about 8% to about 12% by volume. In some embodiments, the ethanol is provided in a concentration of about 9% to about 11% by volume. In some embodiments, the ethanol is provided in a concentration of about 10% by volume. In some embodiments, the ethanol is provided in a concentration of at least 0.5% by volume. In some embodiments, the ethanol is provided in a concentration of at least 1% by volume. In some embodiments, the ethanol is provided in a concentration of at least 5% by volume. In some embodiments, the ethanol is provided in a concentration of at least 8% by volume. In some embodiments, the ethanol is provided in a concentration of at least 9% by volume. In some embodiments, the ethanol is provided in a concentration of at least 10% by volume. In some embodiments, the ethanol is provided in a concentration of no more than 20% by volume. In some embodiments, the ethanol is provided in a concentration of no more than 15% by volume. In some embodiments, the ethanol is provided in a concentration of no more than 12% by volume. In some embodiments, the ethanol is provided in a concentration of no more than 11% by volume, In some embodiments, the ethanol is provided in a concentration of no more than 10% by volume.

According to certain embodiments, further stabilizing agents can also be provided in addition to gentisic acid or salt thereof, ascorbic acid or salt thereof, or ethanol to improve the stability of the formulations described above, including frozen aqueous compositions and liquid aqueous compositions. For example, suitable further stabilizing agents can comprise any one or more of an amino acid or a peptide or a derivative thereof, a vitamin or a derivative thereof, a lipid or a derivative thereof, a carbohydrate or a derivative thereof, a volume expander or an antioxidant. In some embodiments, the amino acid or peptide is selected from N-Acetyl-L-cysteine, Glutathione, L-Lysine, Selenol-L-me-thionine, Glutathione, Albumin, Melatonin, Taurine, Ala-nine, Arginine, Asparagine, Aspartic acid, Cysteine, Gluta-mine, Glutamic acid, Glycine, Histidine, Isoleucine, Lysine, Methionine, Phenylalanine, Proline, Serine, Threo-nine, Tryptophan, Tyrosine, Valine, and derivatives thereof. In some embodiments, the amino acid is Methionine.

In some embodiments, the further stabilizing agent is an antioxidant, such as a flavonoid or a derivative thereof. In some embodiments, the flavonoid is (2S,3R)-2-(3,4-Dihydroxyphenyl)-3,4-di-hydro-1 (2H)-benzopyran-3,5,7-triol, 3-(3, 4, 5-trihydroxy-benzoate ((-) Catechin gallate or CG), 3,3',4',5,5',7-Hexa-hydroxyflavylium chloride, (-)-cis-3,3', 4',5,7-Pentahydroxyflavane (Epi-Catechin or EC), 7-Hydroxy-3-(4'-methoxyphenyl)-4H-benzopyran-4-one, 3,4,5-Trihydroxybenzoic acid (Gallic acid), 3,4',5,7-Tetrahydroxyflavone (Kaempferol), Luteolin, 2-(3,4-dihydroxyphenyl)-5,7-dihydroxy-3-[(2S,3R,4S,5 S,6R)-3, 4, 5-trihydroxy-6-[[(2R,3R,4R,5R,6S)-3,4,5-trihydroxy-6-methyloxan-2-yl]oxymethyl]oxan-2-yl]oxychromen-4-one (Rutin hydrate), Quercetin, (2R,3R)-5,7-Dihydroxy-2-(3,4,5-trihydroxyphenyl)-3,4-dihydro-2H-1-benzopyran-3-yl 3,4,5-trihydroxybenzoate (EpiGallo-Catechin gallate or EGCg), (2R,3R)-2-(3,4-dihydroxyphenyl)-5,7-dihydroxy-3,4-dihydro-2H-chromen-3-yl]3,4,5-trihydroxybenzoate or Epi-Catechin Gallate (ECG), (2R,3R)-2-(3,4,5-trihydroxyphenyl)-3,4-dihydro-2H-chromene-3,5,7-triol (Epigallo-Catechin or EGC), or (2R,3S)-2-(3,4,5-trihydroxyphenyl)-3,4-dihydro-2H-chromene-3,5,7-triol (Gallo-Catechin or GC). In some embodiments, the flavonoid is a catechin or a derivative thereof, for example, (2S,3R)-2-(3,4-Dihydroxyphenyl)-3,4-dihydro-1 (2H)-benzopyran-3,5,7-triol 3-(3,4,5-trihydroxybenzoate ((-) Catechin gallate or CG), (-)-cis-3, 3',4',5,7-Pentahydroxyflavane (Epi-Catechin or EC), 3,4,5-Trihydroxybenzoic acid (Gallic acid), (2R,3R)-5,7-Dihydroxy-2-(3,4,5-trihydroxyphenyl)-3,4-dihydro-2H-1-benzopyran-3-yl-3,4,5-trihydroxybenzoate (EpiGallo-Catechin gallate or EGCg), (2R,3R)-2-(3,4-dihydroxyphenyl)-5,7-dihydroxy-3,4-dihydro-2H-chromen-3-yl]3,4,5-trihydroxybenzoate or Epi-Catechin Gallate (ECG), (2R,3R)-2-(3,4,5-trihydroxypheny 1)-3,4-dihydro-2H-chromene-3,5,7-triol (Epigallo-Catechin or EGC), or (2R,3S)-2-(3,4,5-trihydroxyphenyl)-3,4-dihydro-2H-chromene-3,5,7-triol (Gallo-Catechin or GC). The antioxidant can also be a carotenoid or a derivative thereof, such as all-trans-Fucoxanthin, Lycopene, Xanthophyll, Beta carotene, Lycopene, or Lutein.

In some embodiments, the antioxidant is N-acetyl cysteine, N-tert-Butyl-a-phenylnitrone, 3-(3,4-Dihydroxyphenyl)-2-propenoic acid (Caffeic Acid), P-Carotene, Provitamin A, (2S,3R)-2-(3,4-Dihydroxyphenyl)-3,4-dihydro-1 (2H)-benzopyran-3, 5,7-triol 3-(3,4,5-trihydroxybenzoate ((-) Catechin gallate or CG), 1,4,5-Trihydroxycyclohexanecarboxylic acid, trans-4-Hydroxycinnamic acid (p-Coumaric acid), 3,3',4',5,5',7-Hexahydroxyflavylium chloride, Thiocytic Acid (Dihydro-lipoic Acid, DHLA), 4,4',5,5',6,6'-Hexahydroxydiphenic acid 2,6,2',6'-dilactone (Ellagic acid), (-)-cis-3,3',4',5,7-Pen-tahydroxyflavane (Epi-Catechin or EC), 2-Methoxy-4-(2-propenyl) phenol, trans-4-Hydroxy-3-methoxycinnamic acid (Ferulic acid), 7-Hydroxy-3-(4'-methoxyphenyl)-4H-benzopyran-4-one, all-trans-Fucoxanthin, 3,4,5-Trihydroxy-benzoic acid (Gallic acid), (2S,3R)-2-(3,4,5-Trihydroxyphe-nyl)-3, 4-dihydro-1 (211)-benzopyran-3, 5,7-triol ((-)-Gallocatechin), Glutathione, 2-(3,4-Dihydroxyphenyl) ethanol, 3,4',5,7-Tetrahydroxyflavone (Kaempferol), (±)-1, 2-Dithiolane-3-pentanoic acid, Luteolin, Lycopene, L-Lysine, Neochlorogenic acid, Oleic acid, trans-3,5,4'-Trihydroxystilbene (Resveratrol), 2-(3,4-dihydroxyphenyl)-5,7-dihydroxy-3-[(2S,3R,4S,5 S,6R)-3, 4,5-trihydroxy-6-[[(2R,3R,4R,5R,6S)-3,4,5-trihydroxy-6-methyloxan-2-yl]oxymethyl]oxan-2-yl]oxychromen-4-one, Rutin hydrate, Selenol-L-methionine, Thiourea, (+)-a-Tocopherol, Xan-thophyll, Citric acid (CA), Salicylic acid (SA), Erythorbic acid (EA), Phenol, Sodium bisulfite, Butylated hydroxy anisole, Butylated hydroxy toluene, Metabisulfite, Benzyl alcohol, Thymol, Lipoic acid (LA), Thioglycolic acid (TGA), 2,3 Dimercaptopropan-1-ol (BAL), Zinc, Selenium, Albumin, Mannitol, Sucrose, Melatonin, Ebselen, Pyruvic acid, Carboxy-PTIO, Trolox, Uric acid, Edaravone, Beta carotene, NADPH, Lycopene, Lutein, Catalase, Estrogen, Estradiol, Estriol, Ubiquinol, Copper, Quercetin, Cortisone, Taurine, (2R,3R)-5,7-Dihy-droxy-2-(3,4,5-trihydroxyphenyl)-3,4-dihydro-2H-1-benzo-pyran-3- yl 3,4,5-trihydroxybenzoate (EpiGallo-Catechin gallate or EGCg), (2R,3R)-2-(3,4-dihydroxyphenyl)-5,7-di-hydroxy-3,4-dihydro-2H-chromen-3-yl]3,4,5-trihydroxy-benzoate or Epi-Catechin Gallate (ECG), (2R,3R)-2-(3,4,5-trihydroxyphenyl)-3,4-dihydro-2H-chromene-3,5,7-triol (Epigallo-Catechin or EGC), (2R,3S)-2-(3,4,5-trihydroxy-phenyl)-3,4-dihydro-2H-chromene-3,5,7-triol (Gallo-Cat-echin or GC), (−)-Epigalocatechin-3-O-Gallate, 5-Aminole-vulibic Acid hydrate, Polysorbate 80, Garlic Acid, Hyaluronic Acid, Dextran 60-90, Selenol, and LysaKare.

In some embodiments, the further stabilizing agent can also be a vitamin or a derivative thereof, for example, L-13-Carotene, ProvitaminA, (+)-a-Tocopherol, Erythorbic acid (EA), Trolox, and Lutein. In some embodiments, further stabilizing agent is a lipid. The lipid can be a fatty acid, such as a saturated or unsaturated $C_6$ to $C_{30}$ fatty acid. In some embodiments, the fatty acid is oleic acid, Myristoleic acid, Palmitoleic acid, Sapienic acid, Elaidic acid, Vaccenic acid, or Linoleic acid, a-Linolenic acid. In another embodiment, the lipid is a steroid or derivatives thereof, for example, Estrogen, Estradiol, Estriol, or Cortisone. The further stabilizing agent can also be a carbohydrate or a derivative thereof, such as Mannitol, Sucrose, Dextran (e.g., Dextran 40, Dex-tran 70), and Cyclodextrins, (e.g., a (alpha)-cyclodextrin, (beta)-cyclodextrin, and y (gamma)-cyclodextrin). In some embodiments, the further stabilizing agent is a volume expander. The volume expander can be a polymer or a polymer mixture, such as PEG 3350, PEG 4000, Polygeline, Hae-maccel, Gelofusine, and PLENVU (polyethylene glycol 3350, sodium sulfate, sodium chloride and potassium chloride US FDA 2018 Label). In some embodiments, volume expander is selected from Dextran, Dextran 40, Dextran 70, Cyclodextrins, a (alpha)-cyclodextrin, 13 (beta)-cyclodextrin, and y (gamma)-cyclodextrin, PEG 3350, PEG 4000, Polygeline, Gelofusine, and PLENVU (polyethylene glycol 3350, sodium sulfate, sodium chloride and potassium chloride US FDA 2018 Label).

In some embodiments, the further stabilizing agent is selected from N-Acetyl-L-cysteine, N-tert-Butyl-a-phenylnitrone, 3-(3,4-Dihydroxyphenyl)-2-prope-noic acid (Caffeic Acid), 13-Carotene, Provitamin A, (2S, 3R)-2-(3,4-Dihydroxyphenyl)-3,4-dihydro-1 (2H)-benzopyran-3,5,7-triol 3-(3,4,5-trihydroxybenzoate ((−) Catechin gallate, or CG), 1,4,5-Trihydroxycyclohexanecar-boxylic acid, trans-4-Hydroxycinnamic acid (p-Coumaric acid), 3,3',4',5,5',7-Hexahydroxyflavylium chloride, Thio-cytic Acid (Dihydrolipoic Acid, DHLA), 4,4',5,5',6,6'-Hexa-hydroxydiphenic acid 2,6,2',6'-dilactone (Ellagic acid), (−)-cis-3,3',4',5,7-Pentahydroxyflavane (Epi-Catechin or EC), 2-Methoxy-4-(2-propenyl) phenol, trans-4-Hydroxy-3-methoxycinnamic acid (Ferulic acid), 7-Hydroxy-3-(4'-methoxyphenyl)-4H-benzopyran-4-one, all-trans-Fucoxan-thin, 3,4,5-Trihydroxybenzoic acid (Gallic acid), (2S,3R)-2-(3,4,5-Trihydroxyphenyl)-3,4-dihydro-1 (2H)-benzopyran-3,5,7-triol ((−)-Gallocatechin), Glutathione, 2-(3,4-Dihydroxyphenyl) ethanol, 3,4',5,7-Tetrahydroxyfla-vone (Kaempferol), (±)-1,2-Dithiolane-3-pentanoic acid, Luteolin, Lycopene, L-Lysine, Neochlorogenic acid, Oleic acid, trans-3,5,4'-Trihydroxystilbene (Resveratrol), 2-(3,4-dihydroxyphenyl)-5,7-dihydroxy-3-[(2S,3R,4S,5 S,6R)-3, 4, 5-trihydroxy-6-[[(2R,3R,4R,5R,6S)-3,4,5-trihydroxy-6-methyloxan-2-yl]oxymethyl]oxan-2-yl]oxychromen-4-one, Rutin hydrate, Selenol-L-methionine, Thiourea, (+)-a-To-copherol, Xanthophyll, Alanine and its derivatives, Arginine and its derivatives, Asparagine and its derivatives, Aspartic acid and its derivatives, Cysteine and its derivatives, Glu-tamine and its derivatives, Glutamic acid and its derivatives, Glycine and its derivatives, Histidine and its derivatives, Isoleucine and its derivatives, Lysine and its derivatives, Methionine and its derivatives, Phenylalanine and its derivatives, Proline and its derivatives, Serine and its derivatives, Threonine and its derivatives, Tryptophan and its derivatives, Tyrosine and its derivatives, Valine and its derivatives, Citric acid (CA), Salicylic acid (SA), Erythorbic acid (EA), Phenol, Sodium bisulfite, Butylated hydroxy anisole, Butylated hydroxy toluene, Glutathione, Metabisulfite, Benzyl alcohol, Thymol, Lipoic acid (LA), Thioglycolic acid (TGA), 2,3 Dimercaptopropan-1-ol (BAL), Zinc, Selenium, Albumin, Mannitol, Sucrose, Melatonin, Ebselen, Pyruvic acid, Carboxy-PTIO, Trolox, Uric acid, Edaravone, Beta carotene, NADPH, Lycopene, Lutein, Catalase, Estrogen, Estradiol, Estriol, Ubiquinol, Copper, Quercetin, Cortisone, 2,3-dimercapto-succinic acid (DMSA), monisoamyl derivative (Mi-ADMSA), Taurine, Dextran, Dextran 40, Dextran 70, PEG 3350, PEG 4000, Polygeline, Gelofusine, PLENVU (polyethylene glycol 3350, sodium sulfate, sodium chloride and potassium chloride US FDA 2018 Label), Cyclodextrins, a (alpha)-cyclodextrin, p (beta)-cyclodex-trin, and y (gamma)-cyclodextrin, (2R,3R)-5,7-Dihydroxy-2-(3,4,5-trihydroxyphenyl)-3,4-dihydro-2H-1-benzopyran-3-yl3,4,5-trihydroxybenzoate (EpiGallo-Catechin gallate or EGCg), (2R,3R)-2-(3,4-dihydroxyphenyl)-5,7-dihydroxy-3, 4-dihydro-2H-chromen-3-yl]3,4,5-trihydroxybenzoate or Epi-Catechin Gallate (ECG), (2R,3R)-2-(3,4,5-trihydroxy-phenyl)-3,4-dihydro-2H-chromene-3,5,7-triol (Epigallo-Catechin or EGC), (2R,3S)-2-(3,4,5-trihydroxyphenyl)-3,4-dihydro-2H-chromene-3,5,7-triol (Gallo-Catechin or GC).

In some embodiments, the liquid aqueous composition further contains one or more than one type of free metal chelators. Optionally, the one or more than one types of free metal chelators are present in the composition following the radiolabeling reaction. The free metal chelators are selected from any of the chelators listed in Table 4 provided above.

According to certain embodiments, the liquid aqueous composition comprises a metal chelator comprising diethylene triamine pentaacetic acid (DTPA). In some embodiments, the composition comprises DTPA in a concentration of from about 0.05 mM to about 1 mM. In some embodiments, the composition comprises DTPA in a concentration of from about 0.10 mM to about 0.50 mM. In some embodiments, the composition comprises DTPA in a concentration of from about 0.20 mM to about 0.30 mM. In some embodiments, the composition comprises DTPA in a concentration of about 0.25 mM. In some embodiments, the composition comprises DTPA in a concentration of at least 0.05 mM. In some embodiments, the composition comprises DTPA in a concentration of at least 0.10 mM. In some embodiments, the composition comprises DTPA in a concentration of at least 0.50 mM. In some embodiments, the composition comprises DTPA in a concentration of at least 0.25 mM. In some embodiments, the composition comprises DTPA in a concentration of no more than 1 mM. In some embodiments, the composition comprises DTPA in a concentration of no more than 0.05 mM. In some embodiments, the composition comprises DTPA in a concentration of no more than 0.3 mm. In some embodiments, the composition comprises DTPA in a concentration of no more than 0.25 mM.

According to certain embodiments, the liquid aqueous composition comprises the radiolabeled conjugate present in a concentration to provide a radioactive concentration (RAC) of from about 0.1 MBq/mL to about 5 MBq/ml. In some embodiments, the composition comprises a radioactive concentration (RAC) of from about 0.5 MBq/mL to about 2 MBq/mL. In some embodiments, the composition comprises a radioactive concentration (RAC) of from about 0.75 MBq/mL to about 1.5 MBq/mL. In some embodiments, the composition comprises a radioactive concentration (RAC) of about 1 MBq/mL. In some embodiments, the composition comprises a radioactive concentration (RAC) of at least 0.1 MBq/mL. In some embodiments, the composition comprises a radioactive concentration (RAC) of at least 0.5 MBq/mL. In some embodiments, the composition comprises a radioactive concentration (RAC) of at least 0.75 mBq/mL. In some embodiments, the composition comprises a radioactive concentration (RAC) of at least 1 MBq/mL. In some embodiments, the composition comprises a radioactive concentration (RAC) of no more than 5 MBq/mL. In some embodiments, the composition a radioactive concentration (RAC) of no more than 2 MBq/mL. In some embodiments, the composition comprises a radioactive concentration (RAC) of no more than 1.5 MBq/mL. In some embodiments, the composition comprises a radioactive concentration (RAC) of no more than 0.1 mBq/mL.

In certain embodiments, the liquid aqueous composition described above features that the aqueous composition has a radiochemical purity (RCP) of at least 90% after 120 hours of storage as determined by radio-TLC, iTLC, or HPLC.

In certain embodiments, the liquid aqueous composition described above features that the aqueous composition has an RCP of at least 95% after 120 hours of storage as determined by radio-TLC, iTLC, or HPLC.

In certain embodiments, the liquid aqueous composition described above features that the aqueous composition has a pH value in the range of about 6-8 (e.g., pH 6.5-8, pH 7-8, or pH 7.5-8) and has an RCP of at least 90% (e.g., at least 92%, at least 95%, at least 98%, at least 99%) after 120 hours of storage at a temperature below 15° C. (e.g., below 10° C., below 8° C., or 2-8° C.) as determined by radio-TLC, iTLC, or HPLC. In certain embodiments, the liquid aqueous composition described above features that the aqueous composition has a pH value in the range of about 7-8 and has an RCP of at least 95% after 120 hours of storage at 2-8° C. as determined by radio-TLC, iTLC, or HPLC.

In some embodiments, the RCP of a liquid aqueous composition (or a frozen aqueous composition described above) is determined by TLC only (not HPLC) depending on whether such composition comprises a stabilizing agent. In one embodiment, the liquid aqueous composition disclosed herein retains at least 90% of the radiolabeled conjugate (e.g., $^{225}$Ac-CROWN-L-TATE or other $^{225}$Ac-CROWN-L-TM compound) after 168 hours below or at about 25° C. In some embodiments, the liquid aqueous composition retains at least 95% of the radiolabeled conjugate after 168 hours below or at about 25° C. In some embodiments, the liquid aqueous composition retains at least 98% of the radiolabeled conjugate after 168 hours below or at about 25° C. In some embodiments, the liquid aqueous composition retains at least 85%, at least 90%, at least 92%, or at least 95% of the radiolabeled conjugate after 120 hours below or at about 25° C. In some embodiments, the liquid aqueous composition retains 95% or more of the radiolabeled conjugate after 48 hours, 72 hours, 96 hours, 120 hours, 148 hours, 168 hours, 192 hours, or 216 hours below or at about 25° C. In some embodiments, the liquid aqueous composition retains 90% or more of the radiolabeled conjugate after 48 hours, 72 hours, 96 hours, 120 hours, 148 hours, 168 hours, 192 hours, or 216 hours below or at about 25° C. In some embodiments, the liquid aqueous composition retains 90% or more of the radiolabeled conjugate after 48 hours, 72 hours, 96 hours, 120 hours, 148 hours, 168 hours, 192 hours, or 216 hours at or below about −20° C., and even at or below about −80° C. In some embodiments, the liquid aqueous composition retains 90% or more of the radiolabeled conjugate after 48 hours, 72 hours, 96 hours, 120 hours, 148 hours, 168 hours, 192 hours, or 216 hours at or below about −20° C., and even at or below −80° C., followed by storage at ambient (room temperature, about 25° C.) conditions for 1, 2, 3, 4, 5 or 6 hours. In some embodiments, the radionuclide is actinium-225, and wherein the liquid aqueous composition contains no more than about 10%, 9%, 8%, 7%, 6%, 5%, 4%, 3%, 2% and/or 1% free actinium after 48, 72, 96, 120 and/or 144 hours below or at about 25° C. (e.g. at or below about −20° C. and/or about −80° C.), compared to the total amount of actinium content in the liquid aqueous composition. Note that "free radionuclide" (e.g., "free actinium") refers to unbound radionuclide as well as radionuclide bound to any free metal scavengers added to the final formulation (e.g., DTPA).

In some embodiments, when the radionuclide or radiometal is $^{225}$Ac (actinium-225), the radiolabeled conjugate is present in the composition in an amount of that provides a radioactivity of about 0.5 to about 1000 μCi/mL. In some embodiments, the $^{225}$Ac-radiolabeled conjugate is present in the composition in an amount that provides a radioactivity of about 1 to about 100 μCi/mL, about 2 to about 80 μCi/mL, about 5 to about 70 μCi/mL, or about 10 to about 60 μCi/mL. In some embodiments, the $^{225}$Ac-radiolabeled conjugate is present in the composition at a concentration equivalent to about 15 to 45 μCi/mL. In some embodiments, the $^{225}$Ac-radiolabeled conjugate is present in the composition at a concentration equivalent to about 10 to 35 μCi/mL. In some embodiments, the $^{225}$Ac-radiolabeled conjugate is present in the composition at a concentration equivalent to about 10 to 25 μCi/mL. In some embodiments, the $^{225}$Ac-radiolabeled conjugate is present in the composition at a concentration equivalent to about 12 to 23 μCi/mL. In some embodiments, the $^{225}$Ac-radiolabeled conjugate is present in the composition in an amount that provides a radioactivity of at most about 5, 10, 15, 50, 75, 100, 200, or 500 μCi/mL. In some embodiments, the $^{225}$Ac-radiolabeled conjugate is present in the composition in an amount that provides a radioactivity of at most about 15 μCi/mL. In some embodiments, the $^{225}$Ac-radiolabeled conjugate is present in the composition in an amount that provides a radioactivity of at most about 35 μCi/mL. In some embodiments, the $^{225}$Ac-radiolabeled conjugate is present in the composition in an amount that provides a radioactivity of about 1 to 35 μCi/mL. In some embodiments, the $^{225}$Ac-radiolabeled conjugate is present in the composition in an amount that provides a radioactivity of at least about 1, 2, 3, 4, 5, 6, 7, 8, 9, 10, 11, 12, 13, 14, 15, 16, 17, 18, 19, 20, 25, 30, or 50 μCi/mL.

In some embodiments, when the radionuclide or radiometal is $^{177}$Lu (lutetium-177), the radiolabeled conjugate is present in the composition in an amount of that provides a radioactivity of about 0.5 to about 1000 mCi/mL. In some embodiments, the $^{177}$Lu-radiolabeled conjugate is present in the composition in an amount that provides a radioactivity of about 1 to about 100 mCi/mL, about 2 to about 80 mCi/mL, about 10 to about 70 mCi/mL, or about 20 to about 50 mCi/mL. In some embodiments, the $^{177}$Lu-radiolabeled conjugate is present in the composition in an amount that provides a radioactivity of at most about 15 mCi/mL. In some embodiments, the $^{177}$Lu-radiolabeled conjugate is present in the composition in an amount that provides a radioactivity of at most about 35 mCi/mL. In some embodiments, the $^{177}$Lu-radiolabeled conjugate is present in the composition in an amount that provides a radioactivity of at least about 1, 2, 3, 4, 5, 6, 7, 8, 9, 10, 11, 12, 13, 14, 15, 16, 17, 18, 19, 20, 25, 30, or 50 mCi/mL.

Methods of Manufacture

Another aspect of this disclosure relates to a method of preparing a radiopharmaceutical composition for intravenous administration to a subject. The method comprises:
(a) producing a pharmaceutically acceptable frozen aqueous composition, the frozen aqueous composition comprising:
a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

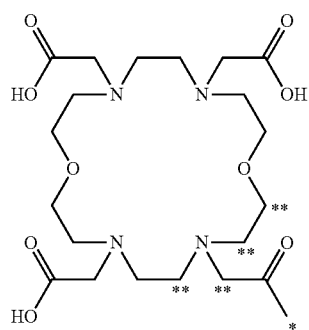

Formula I where * and  designate possible points of attachment of the chelator to L, and when the chelator is attached to L at the point designated by , the point designated by * represents the group-OH; and
a pH buffer,
(b) thawing the pharmaceutically acceptable frozen aqueous composition to form a radiopharmaceutical composition for intravenous administration, wherein the thawed composition has a pH value in the range of 5-8.

In some embodiments, the pharmaceutically acceptable frozen aqueous composition comprises one or more stabilizing agents described above, e.g., gentisic acid or a salt thereof, ascorbic acid or a salt thereof, ethanol, or a combination thereof.

According to one embodiment, a method of forming the radiolabeled conjugate comprises chelating one or more radionuclides, $R^N$, with an unlabeled conjugate in a chelation reaction mixture. The chelation reaction mixture, optionally comprising a radiolysis stabilizing solution that comprises gentisic acid or a salt thereof, ascorbic acid or a salt thereof, ethanol, or a combination thereof, is dispersed in an aqueous vehicle. The unlabeled conjugate comprises the formula C-L-TM above, with the chelator (C) bound to the cellular antigen binding moiety (TM), optionally via a linker, such as for example an unlabeled conjugate that corresponds to Formula 4, or a derivative and/or salt thereof,

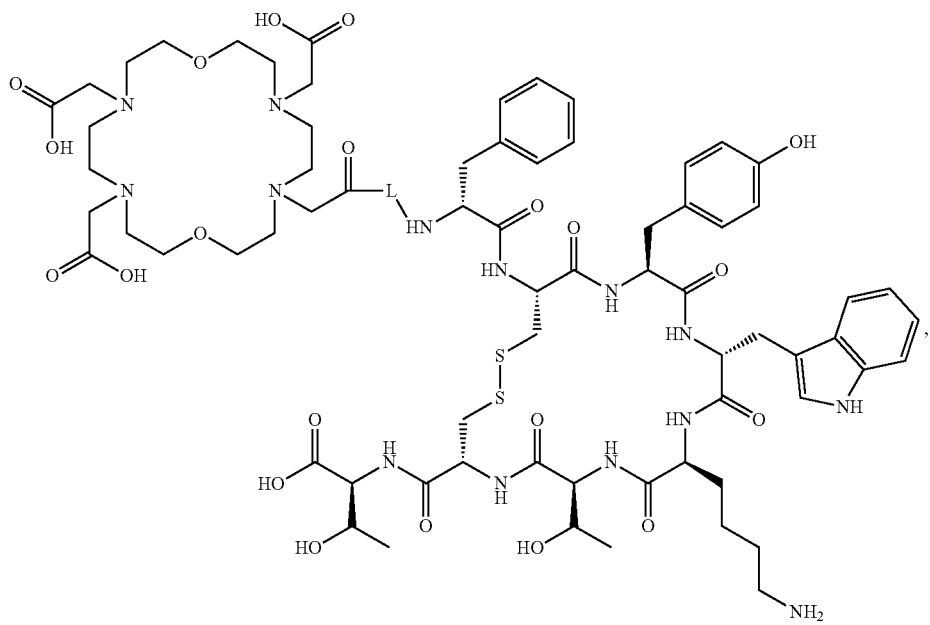

Formula 4 and L is a bond or a linker. According to one embodiment, the chelation mixture comprises a pH of 5.0-7.0, and is at a temperature of about 25° C.

In certain embodiments, the chelating reaction is performed in the presence of the radiolysis stabilizing solution. According to further embodiments, one or more components of the radiolysis stabilizing solution may be added while the chelating reaction is occurring, or one or more components of the radiolysis stabilizing solution may be added after the chelating reaction is completed. The radiolysis stabilizing solution may help stabilize the radiolabeled conjugate, so as to inhibit the release of the radionuclide from the chelator, or to otherwise inhibit radiolysis and degradation of the radiolabeled conjugate from the radiolabeled chelator.

By way of example, and according to one aspect of the disclosure, a radiolysis stabilizing solution containing gentisic acid or a salt thereof is present before, during or immediately following the radiolabeling reaction (the chelation of the radionuclide). By way of further example, and according to one aspect of the disclosure, a radiolysis stabilizing solution containing ascorbic acid or a salt thereof is present before, during, or formed immediately following the radiolabeling reaction. By way of further example, and according to one aspect of the disclosure, a radiolysis stabilizing solution containing ethanol is present before, during or formed immediately following the radiolabeling reaction. By way of further example, and according to one aspect of the disclosure, a radiolysis stabilizing solution containing gentisic acid or a salt thereof, and ascorbic acid or a salt thereof, is present before, during or formed immediately following the radiolabeling reaction. By way of further example, and according to one aspect of the disclosure, a radiolysis stabilizing solution containing gentisic acid or a salt thereof, and ethanol, is present before, during or formed immediately following the radiolabeling reaction. By way of further example, and according to one aspect of the disclosure, a radiolysis stabilizing solution containing ethanol and ascorbic acid or a salt thereof, is present before, during or formed immediately following the radiolabeling reaction. By way of further example, and according to one aspect of the disclosure, a radiolysis stabilizing solution containing gentisic acid or a salt thereof, ascorbic acid or a salt thereof, and ethanol is present before, during or formed immediately following the radiolabeling reaction.

In one embodiment, one or more of the components of the radiolysis stabilizing solution are added in a sequential fashion. For example, according to one embodiment, a first component of the radiolysis stabilizing solution, such as any one or more of gentisic acid or a salt thereof, ascorbic acid or a salt thereof, or ethanol, is added before, during, or immediately following a radiolabeling reaction, and a second and/or third component of the radiolysis stabilizing solution is added at a predetermined time after the first component, such as for example at some predetermined time during or following the radiolabeling reaction. As another example, the radiolabeling reaction may occur in the presence of a first component of the radiolysis stabilizing solution, with a second component of the radiolysis stabilizing solution being added following the radiolabeling reaction. According to another embodiments, all of the components of the radiolysis stabilizing solution may be added simultaneously to the radiolabeling reaction, and/or the unchelated targeting compound and radionuclide may be combined in a solution comprising all components of the radiolysis stabilizing solution.

According to one embodiment, the method of forming the radiolabeled conjugate further comprises first and second steps, where the first step comprises combining the radionuclide with the unlabeled conjugate in the chelation reaction mixture to form a reaction product mixture containing the labeled conjugate, and adding gentisic acid or a salt thereof, ascorbic acid or a salt thereof, or ethanol, or a combination thereof to the reaction product mixture to form a liquid aqueous composition. In another embodiment, the first step comprises combining the radionuclide with the unlabeled conjugate in the chelation reaction mixture to form a reaction product mixture containing the labeled conjugate, and adding gentisic acid or a salt thereof to the reaction product mixture to form a liquid aqueous composition. In another embodiment, the first step comprises combining the radionuclide with the unlabeled conjugate in the chelation reaction mixture to form a reaction product mixture containing the labeled conjugate, and adding ascorbic acid or a salt thereof to the reaction product mixture to form a liquid aqueous composition. In another embodiment, the first step comprises combining the radionuclide with the unlabeled conjugate in the chelation reaction mixture to form a reaction product mixture containing the labeled conjugate, and adding ethanol to the reaction product mixture to form a liquid aqueous composition. In a further embodiment, the first step comprises combining the radionuclide with the unlabeled conjugate in the chelation reaction mixture to form a reaction product mixture containing the labeled conjugate, and adding gentisic acid or a salt thereof and ascorbic acid or a salt thereof to the reaction product mixture to form a liquid aqueous composition. In yet a further embodiment, the first step comprises combining the radionuclide with the unlabeled conjugate in the chelation reaction mixture to form a reaction product mixture containing the labeled conjugate, and adding gentisic acid or a salt thereof and ethanol to the reaction product mixture to form a liquid aqueous composition. In a further embodiment, the first step comprises combining the radionuclide with the unlabeled conjugate in the chelation reaction mixture to form a reaction product mixture containing the labeled conjugate, and adding ascorbic acid or a salt thereof and ethanol to the reaction product mixture to form a liquid aqueous composition. In yet a further embodiment, the first step comprises combining the radionuclide with the unlabeled conjugate in the chelation reaction mixture to form a reaction product mixture containing the labeled conjugate, and adding gentisic acid or a salt thereof, ascorbic acid or a salt thereof, and ethanol to the reaction product mixture to form a liquid aqueous composition.

According to one embodiment, the radiolabeling reaction is allowed to occur for a predetermined period of time, such as for example for at least 5 mins, at least 10 mins, at least 30 mins, at least 1 hour, or at least 2 hours. According to certain embodiments, the radiolabeling reaction is carried out at a suitable pH for chelation of the radionuclide, such as a pH in the range of pH of 5-7. According to certain embodiments, the radiolabeling reaction can be carried out below or at about room temperature, such as below or at a temperature of from about 20° to about 28° C., such as about 25° C. In one embodiment, the radiolabeling reaction is carried out in the presence of a buffer, such as a sodium acetate/acetic acid buffer.

According to certain embodiments, once the radiolabeling reaction has completed, the radiolabeled conjugate having the chelated radionuclide may or may not be subject to further purification to remove, for example, unlabeled and unreacted compound, and/or radiolysis and degradation products. For example, in certain embodiments, the radiolabeled conjugate can be purified by any of a high performance liquid chromatography (HPLC), or other affinity column-based separation step. In certain embodiments, the radiolabeled conjugate can be purified by solid phase chromatography, including but not limited to, those using C18 columns and/or HLB columns. In certain embodiments, the radiolabeled conjugate needs no further purification.

To prepare for administration to a patient, a saline solution may be added to the radiolabeled conjugate and stabilizing solution, with an amount of saline solution added being determined by the dosage amount and concentration of the radiolabeled conjugate that is suitable for administration to the patient. According to certain embodiments, the stabilized liquid aqueous composition described herein comprises the combination of the saline solution with radiolabeled conjugate and stabilizing solution. According to certain further embodiments, one or more stabilizing agents, such as any of gentisic acid or salt thereof, ascorbic acid or salt thereof, or ethanol, may be added after combination of the radiolabeled conjugate with the saline solution, such as to increase levels of the one or more stabilizing agents in the stabilized formulation. Other stabilizing agents and further excipients may also be added. The stabilized liquid aqueous composition formed by methods described herein may further comprise the concentrations and compositions of stabilizing agents, as well as other characteristics, as described elsewhere herein for the liquid aqueous composition.

According to one embodiment, the stabilized liquid aqueous composition comprises no more than 10%, 9%, 8%, 7%, 6%, 5%, 4%, 3%, 2% and/or 1% of free $^{225}$Ac, at the time of administration to the patient.

According to one embodiment, methods for storage for the $^{225}$Ac-radiolabeled conjugate having the formula RC-L-TM, such as CROWN-L-TATE, are provided. These methods include freezing the formulation prior to for injection into a patient, e.g. at $-20°$ C. or $-80°$ C., such as for up to 7 days or longer (e.g., 14 days, 21 days, or 28 days) during shipment and delivery from the manufacturer to the site of patient administration. According to certain embodiments, upon removal from freezing conditions, the formulations are then held for up to a minimum of 4 hours at room temperature (e.g. 15-30° C.). In some embodiments the formulations are held for 4 hours, 6 hours, 8 hours, 24 hours and/or 48 hours at room temperature following removal from frozen conditions. According to certain embodiments, the method of storage results in less than 10% free 225Ac at the time of patient injection.

In certain embodiments, the liquid aqueous composition is frozen at a temperature in the range of about $-10°$ C. to about $-100°$ C. (e.g., at or below $-15°$ C., at or below $-20°$ C., at or below $-30°$ C., at or below $-40°$ C., at or below $-50°$ C., at or below $-60°$ C., at or below $-70°$ C., at or below $-80°$ C.). In some embodiments, the liquid aqueous composition is frozen at a temperature in the range of about $-15°$ C. to about $-90°$ C. In some embodiments, the liquid aqueous composition is frozen at a temperature in the range of from about $-20°$ C. to about $-80°$ C. In some embodiments, the liquid aqueous composition is frozen at a temperature of about $-20°$ C., such as from about $-15°$ C. to about $-25°$ C. In some embodiments, the liquid aqueous composition is frozen at a temperature of about $-80°$ C., such as from about $-75°$ C. to about $-85°$ C. In some embodiments, the liquid aqueous composition is frozen at a temperature of no more than $-15°$ C. In some embodiments, the liquid aqueous composition is frozen at a temperature of no more than $-20°$ C. In some embodiments, the liquid aqueous composition is frozen at a temperature of no more than $-30°$ C. In some embodiments, the liquid aqueous composition is frozen at a temperature of no more than $-50°$ C. In some embodiments, the liquid aqueous composition is frozen at a temperature of no more than $-75°$ C. In some embodiments, the liquid aqueous composition is frozen at a temperature of no more than $-100°$ C. In some embodiments, the liquid aqueous composition is frozen at a temperature of at least $-120°$ C. In some embodiments, the liquid aqueous composition is frozen at a temperature of at least $-100°$ C.

In some embodiments freezing at approximately $-80°$ C. is achieved using packaging containing dry ice (solid carbon dioxide). Dry ice has a surface temperature of $-78.5°$ C. The liquid aqueous composition may also optionally be shipped while frozen with dry ice, according to certain embodiments. In certain embodiments, the liquid aqueous composition may also optionally be shipped in a freezer, which follows the USP definition to be a place in which the temperature is controlled between $-25°$ C. and $-10°$ C. (or between $-13°$ F. and 14° F.). In certain embodiments, the liquid aqueous composition may also optionally be shipped under a cool condition (any temperature between 8° C. and 15° C. or between 46° F. and 59° F.), under a cold condition (any temperature not exceeding 8° C. or 46° F.), or under a refrigerated condition by using a refrigerator (which refers to a cold place in which the temperature is controlled between 2° C. and 8° C. or between 36° F. and 46° F.

According to certain embodiments, the liquid aqueous composition that has been frozen has a radiochemical purity (RCP) of the radiolabeled conjugate of at least 90%. In some embodiments, the liquid aqueous composition that has been frozen has a radiochemical purity (RCP) of the radiolabeled conjugate of at least 95%. In some embodiments, the liquid aqueous composition that has been frozen has a radiochemical purity (RCP) of the radiolabeled conjugate of at least 96%. In some embodiments, the liquid aqueous composition that has been frozen has a radiochemical purity (RCP) of the radiolabeled conjugate of at least 97%. In some embodiments, the liquid aqueous composition that has been frozen has a radiochemical purity (RCP) of the radiolabeled conjugate of at least 98%. In some embodiments, the liquid aqueous composition that has been frozen has a radiochemical purity (RCP) of the radiolabeled conjugate of at least 99%. In some embodiments, the liquid aqueous composition that has been frozen has a radiochemical purity (RCP) of the radiolabeled conjugate of at least 99.5%. In some embodiments, the liquid aqueous composition that has been frozen has a radiochemical purity (RCP) of the radiolabeled conjugate of at least 99.9%. The RCP is defined as the proportion of the total radioactivity in the sample which is present as the desired radiolabeled species. This value can be determined by HPLC, which allows separation and quantification of the desired radiolabeled species relative to all other radionuclides in any form, for example, free radionuclides, radionuclides bound to free metal chelators, and radionuclides bound to degraded peptide species. Other analytical techniques, such as TLC, are useful in separating and quantifying the amount of radionuclide that is no longer bound to the desired radiolabeled species, and so can also be used to determine RCP when radionuclide that is no longer bound to the desired radiolabeled species is the primary source of undesired radionuclide species (e.g., there is little or no degraded peptide species having bound radionuclide). Such radionuclide may be unbound in solution, or may be bound by a free metal chelator present in the formulation (e.g., DTPA).

According to certain embodiments, the liquid aqueous composition has the radiochemical purity (RCP) specified above at least 1 day after radiolabeling of the conjugate. In some embodiments, the liquid aqueous composition has the radiochemical purity (RCP) specified above at least 2 days after radiolabeling of the conjugate. In some embodiments, the liquid aqueous composition has the radiochemical purity (RCP) specified above at least 3 days after radiolabeling of the conjugate. In some embodiments, the liquid aqueous composition has the radiochemical purity (RCP) specified above at least 4 days after radiolabeling of the conjugate. In some embodiments, the liquid aqueous composition has the radiochemical purity (RCP) specified above at least 5 days after radiolabeling of the conjugate. In some embodiments, the liquid aqueous composition has the radiochemical purity (RCP) specified above at least 6 days after radiolabeling of the conjugate. In some embodiments, the liquid aqueous composition has the radiochemical purity (RCP) specified above at least 10 days after radiolabeling of the conjugate. In some embodiments, the liquid aqueous composition has the radiochemical purity (RCP) specified above at least 1 day after the start of freezing of the composition. In some embodiments, the liquid aqueous composition has the radiochemical purity (RCP) specified above at least 2 days after the start of freezing the liquid aqueous composition. In some embodiments, the liquid aqueous composition has the radiochemical purity (RCP) specified above at least 3 days after the start of freezing the liquid aqueous composition. In some embodiments, the liquid aqueous composition has the radiochemical purity (RCP) specified above at least 4 days after the start of freezing the liquid aqueous composition. In some embodiments, the liquid aqueous composition has the radiochemical purity (RCP) specified above at least 5 days after the start of freezing the liquid aqueous composition. In some embodiments, the liquid aqueous composition has the radiochemical purity (RCP) specified above at least 6 days after the start of freezing the liquid aqueous composition. In some embodiments, the liquid aqueous composition has the radiochemical purity (RCP) specified above at least 7 days after the start of freezing the liquid aqueous composition. In some embodiments, the liquid aqueous composition has the radiochemical purity (RCP) specified above at least 10 days after the start of freezing the liquid aqueous composition. In some embodiments, the liquid aqueous composition has the radiochemical purity (RCP) specified above at least 14 days after the start of freezing the liquid aqueous composition. In some embodiments, the liquid aqueous composition has the radiochemical purity (RCP) specified above at least 21 days after the start of freezing the liquid aqueous composition. In some embodiments, the liquid aqueous composition has the radiochemical purity (RCP) specified above at least 28 days after the start of freezing the liquid aqueous composition. In certain embodiments, the RCP is determined by a high performance liquid chromatography (HPLC) process, such as any of those described herein. In certain embodiments, the RCP is determined by a thin layer chromatography (TLC) process, such as any of those described herein.

In certain embodiments, the liquid aqueous composition is frozen for at least 1 day, at least 2 days, at least 3 days, at least 4 days, at least 5 days, at least 6 days, at least 7 days, at least 10 days, at least 14 days, at least 21 days, and/or at least 28 days. For example, the liquid aqueous composition maybe frozen within 1 hour, 2 hours, 3 hours, 4 hours, and/or 6 hours of preparation thereof. According to certain embodiments, the liquid aqueous composition can be frozen and then can also be thawed, for example in advance of administration to a patient. As another example, further excipients and/or additives can be added to the liquid aqueous composition upon thawing or at least partial thawing, and the composition can be administered and/or re-frozen for future administration thereof. Alternatively, in certain embodiments the radiolabeled conjugate can be frozen, and subsequently at least partly thawed to combine with antioxidants/stabilizers and other additives and/or excipients to form the radiopharmaceutical composition suitable for administration. That is, according to certain embodiments, the radiolabeled conjugate can be frozen shortly after the radiolabeling is complete, with or without having added any of the further components (anti-oxidants, etc.) of the liquid aqueous composition, at any of the freezing temperatures, durations, or any of the other freezing processes otherwise Methods of Use The present disclosure also covers a method of treating a disease (e.g., cancer) in a subject, wherein the method comprises administering to the subject in need thereof a therapeutically effective amount of a radiopharmaceutical composition or a dosage form of a frozen aqueous composition or liquid aqueous composition, as described above.

An additional aspect of this disclosure is a method of treating cancer in a subject, wherein the method comprises:
(a) thawing a pharmaceutically acceptable frozen aqueous composition to form an aqueous composition, wherein the aqueous composition has a pH value in the range of 5-8 and comprises a radiolabeled conjugate of formula RC-L-TM, or a derivative or a salt thereof, wherein TM is a cellular antigen binding moiety, L is a bond or a linker, and RC is a radiolabeled chelator comprising a radionuclide, $R^N$, coordinated by a chelator corresponding to Formula I or a derivative thereof:

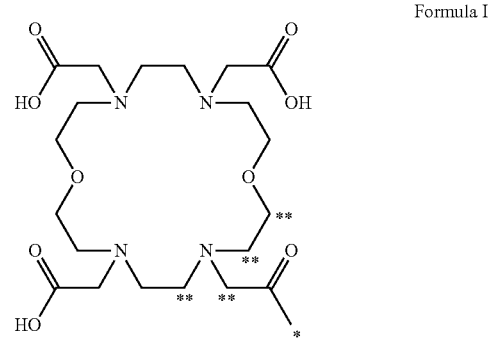

Formula I where * and  designate possible points of attachment of the chelator to L, and when the chelator is attached to L at the point designated by , the point designated by * represents the group-OH; and
(b) administering to the subject in need thereof a therapeutically effective amount of the aqueous composition.

In some embodiments, disclosed herein is a radiotherapeutic method of treating diseases or conditions using the radiolabeled conjugates comprising the formula RC-L-TM and/or Formula 5 above, such as in treating SSTR-expressing diseases or conditions using radiolabeled CROWN-L-TATE. The stabilized formulations described herein comprising the radiolabeled conjugate can, in certain embodiments, comprise radiotherapeutic formulations for treatment of disease states and/or conditions in a patient. In some embodiments, the radiolabeled conjugates may target cancers or tumors such as colorectal cancer, prostate cancer, pancreatic cancer, bladder cancer, clear cell renal cell carcinoma, gastrointestinal adenocarcinoma, melanoma, lung cancer, hepatocarcinoma, B-cell lymphoma, head and neck cancer, non-small cell lung carcinoma, breast cancer, solid malignancies, gynecologic cancers, glioma, insulinoma, neoplasm, multiple myeloma, ovarian cancer, and neuroendocrine tumors, among others. In some embodiments, the cancers or tumors are SSTR-expressing cancers or tumors, such as neuroendocrine tumors, small cell lung cancer, non-small cell lung cancer, carcinoids, lymphoma, prostate cancer, renal cancer, breast cancer, thyroid cancer, gastric cancer, colorectal cancer, bladder cancer, pancreatic cancer, lung cancer, liver cancer, brain tumor, melanoma, ovarian cancer, meningioma, or sarcoma.

Still within the scope of this disclosure is a radiodiagnostic method of imaging tissues, such as SSTR-expressing tissues, wherein the method comprises administering to a subject in need thereof a radiopharmaceutical composition or a dosage form of a frozen aqueous composition or liquid aqueous composition, as disclosed herein, for diagnosis purposes. In some embodiments, the methods of imaging relate to performing PET or SPECT imaging using radiolabeled conjugate comprising the formula RC-L-TM, wherein TM is a cellular antigen binding moiety, such as an SSTR binding moiety selected from those listed in Table 1, such as CROWN-L-TATE. The liquid aqueous compositions described herein comprising the radiolabeled conjugate can, in certain embodiments, comprise radiodiagnostic formulations for the diagnosis of disease states and/or conditions in a patient.

EXAMPLES

The following examples are provided to merely illustrate certain embodiments and aspects of the disclosure to gain a better understanding of the invention described herein. They are not intended and should not be interpreted to limit the scope of this invention in any way whatsoever.

Example 1

Example 1 illustrates the results in terms of radiochemical purity (RCP) measured for different formulations of $^{225}$Ac-radiolabeled CROWN-TATE. An unlabeled conjugate corresponding to Formula 4, with L being a bond (e.g. CROWN-TATE) was radiolabeled with $^{225}$Ac in solution using the reaction conditions in Table 5 below.

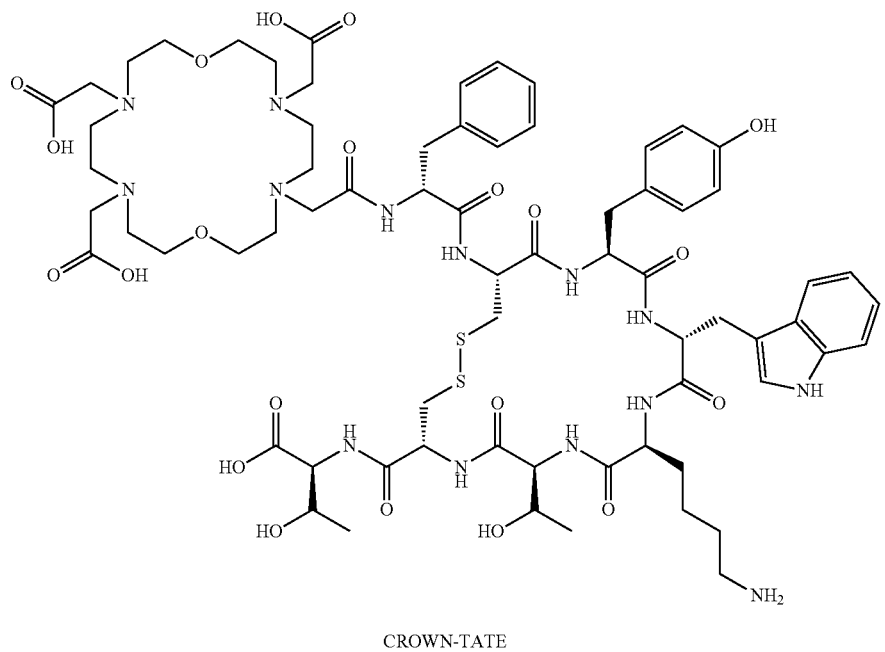 [SMILES: CC(O)[C@H](NC(=O)[C@@H]1CSSC[C@H](NC(=O)[C@@H](Cc2ccccc2)NC(=O)CN2CCOCCN(CC(=O)O)CCN(CC(=O)O)CCOCCN(CC(=O)O)CC2)C(=O)N[C@@H](Cc2ccc(O)cc2)C(=O)N[C@H](Cc2c[nH]c3ccccc23)C(=O)N[C@@H](CCCCN)C(=O)N[C@@H](C(C)O)C(=O)N1)C(=O)O]

CROWN-TATE

TABLE 5

| Reaction conditions | |
| --- | --- |
| Molar activity | 0.2 MBq/nmol |
| Reactive Concentration (RAC) | 5-10 MBq/mL |
| pH buffer | 0.2M NaOAc, 10% EtOH |
| Time/Temp | 20 min, RT |

*NaOAc is sodium acetate, and EtOH is ethanol

Following radiolabeling, the $^{225}$Ac-radiolabeled CROWN-TATE was formulated into a liquid aqueous composition including sodium ascorbate, gentisic acid, ethanol and saline, according to the formulation in Table 6 below.

TABLE 6

| Formulation | |
| --- | --- |
| RAC | 0.5 MBq/nmol |
| pH buffer | 400 mM sodium ascorbate |
| | 10 mM gentisic acid |
| | 10% EtOH |
| | Saline |

Different formulations were further prepared, including compositions with different concentrations of ascorbate and gentisic acid. The formulations were assessed for radiochemical purity (RCP) at different times, both for formulations stored at room temperature (RT) as well as formulations that were subjected to freezing shortly after the preparation thereof.

The radiochemical purity (RCP) of the $^{225}$Ac-radiolabeled CROWN-TATE was determined by iTLC (thin layer chromatography) using the following parameters in Table 7 below.

TABLE 7

| iTLC method | |
| --- | --- |
| Stationary phase | iTLC-SG (initial, broad peaks) |
| | iTLC-SA (preferred, narrows peaks) |
| Mobile phase | 0.1M Sodium Citrate (5% MeOH) |

The RCP results as determined by TLC for the formulations are provided in Table 8 below.

TABLE 8

| | Ascorbate | Gentisic Acid | Temp | RCP EOS | Day 1 RCP | Day 2 RCP | Day 3 RCP | Day 4 RCP | Day 5 RCP | Day 6 RCP |
| --- | --- | --- | --- | --- | --- | --- | --- | --- | --- | --- |
| Exp 1 | 400 mM | 10 mM | −20° C. | >99% | 98% | 98% | 97% | — | — | 96% |
| | 400 mM | 10 mM | RT | | 88% | 79% | 74% | — | — | 61% |
| Exp 2 | 200 mM | 5 mM | −20° C. | 99% | 96% | 94% | — | — | 93% | — |
| | 200 mM | 0 mM | −20° C. | >99% | >99% | >99% | — | — | >99% | — |
| | 100 mM | 5 mM | −20° C. | >99% | 98% | 97% | — | — | 95% | — |
| | 100 mM | 0 mM | −20° C. | >99% | >99% | >99% | — | — | >99% | — |
| Exp 3 | 400 mM 10 eq DTPA | 10 mM | −20° C. | >99% | >99% | — | — | 98% | — | — |
| | 400 mM | 0 mM | −20° C. | >99% | 99% | — | — | >99% | — | — |
| | 400 mM | 20 mM | −20° C. | >99% | 99% | — | — | 97% | — | — |

*End of Synthesis (EOS) >99%, after 3 h at RT, tested conditions have minimal free $^{225}$Ac for Exp 1 and Exp 3.

Figure 1B:
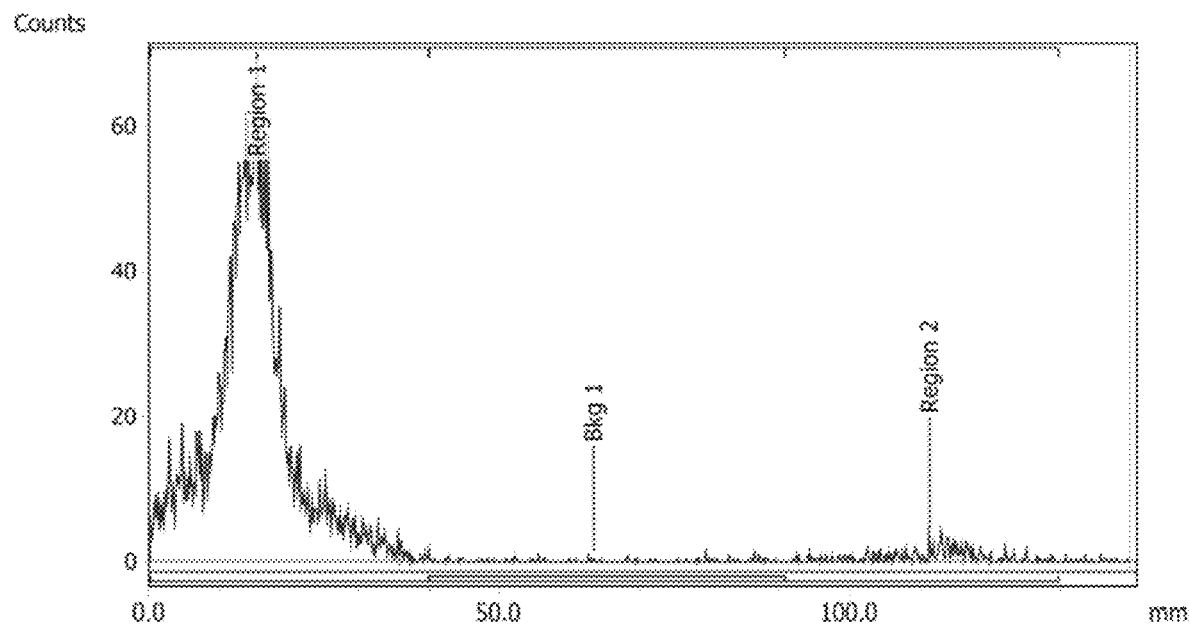

The examples show that freezing the formulations provides enhanced stability over room temperature formulations, as can be seen by comparing the RCP of the RT formulations with −20° C. formulations in Experiment 1 (Exp 1 in Table 8). FIGS. 1A-1B demonstrate the TLC data for RT (FIG. 1A) and −20° C. formulations (FIG. 1B) at 6 days, with significantly higher RCP for the formulations subjected to freezing for 6 days (96% RCP as compared to 61% for the RT formulation).

Figure 2A:
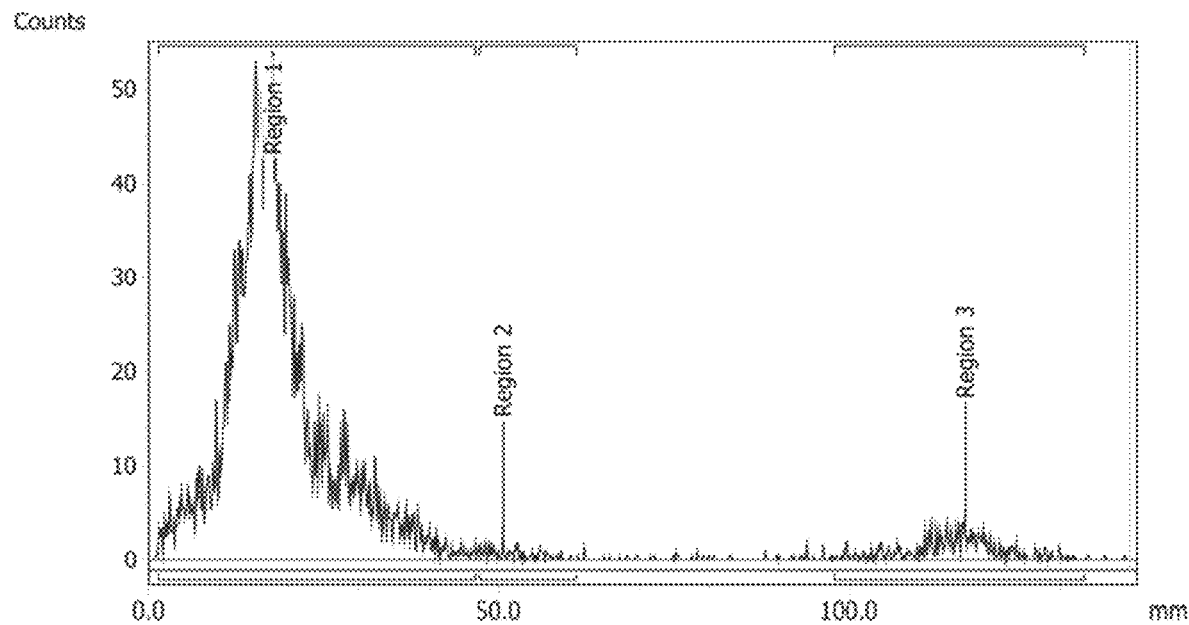
FIGS. 2A-2B show TLC data for radiolabeled CROWN-TATE formulations stored at −20° C. for 5 days, comparing a formulation having 5 mM gentisic acid and 200 mM ascorbate, pH ~5-6 (A), with a formulation containing no gentisic acid and 200 mM ascorbate, pH~6-7 (B), as described in Example 1 below.
Figure 2B:
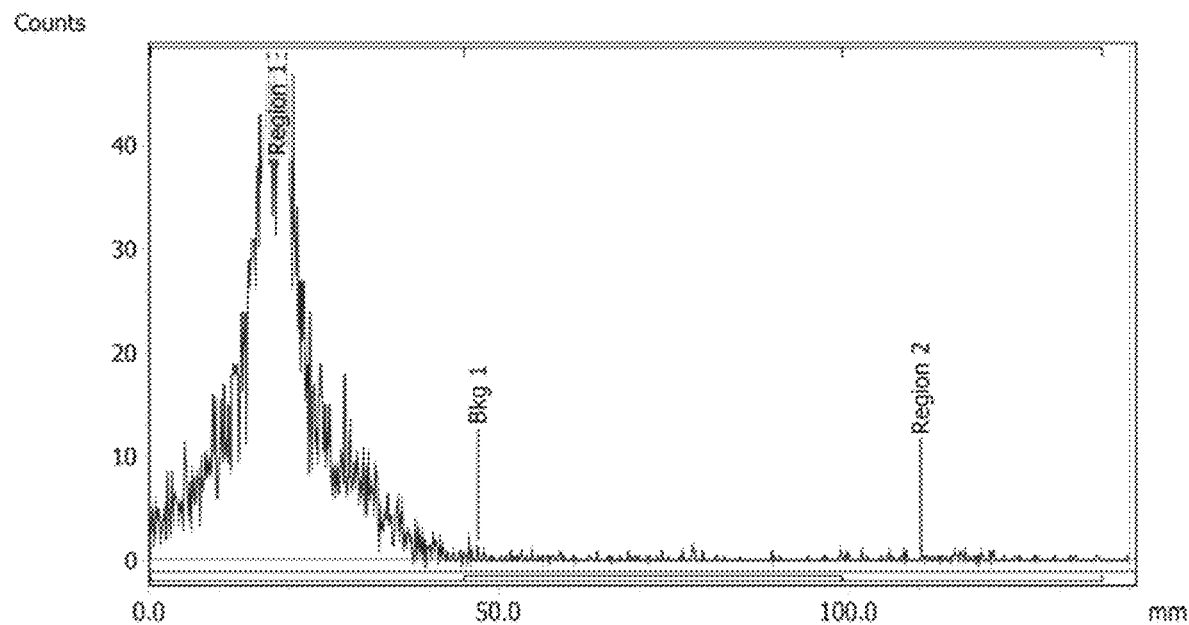

Experiment 2 (Exp 2 in Table 8) shows that addition of gentisic acid to the formulation can cause a reduction in RCP (compare Experiment 2 studies at 0 versus 5 mM), but freezing formulations containing gentisic acid can improve the stability (compare Experiment 2 with the RT study of Experiment 1). FIGS. 2A-2B show a comparison of an Experiment 2 formulation containing 5 mM gentisic acid at 5 days, after 5 days of freezing at −20° C., (FIG. 2A) with an Experiment 2 formulation having no gentisic acid, also after 5 days of freezing at −20° C. (FIG. 2B). The formulation having no gentisic acid exhibited greater than 99% RCP, whereas the formulation having 5 mM gentisic acid exhibited 93% RCP.

Experiment 3 (Exp 3 in Table 8) shows that the addition of DTPA is not immediately detrimental to the $^{225}$Ac-radiolabeled CROWN-TATE complex (compare Experiment 3, first row, having 10 eq. of DTPA, with Experiment 1, first row, having no DTPA).

The ability to stabilize compositions by freezing imparts significant advantages, particularly for formulations such as $^{225}$Ac doses that are generally manufactured centrally and shipped to the location of administration. Ensuring the stability of the metal-CROWN complex may be challenging, for example due to the potential for the complex to dissociate in solution. For example, Yang et al. have reported significant dissociation over time in solution due to transmetalation when La(NO$_3$)$_3$ was added in 5-fold molar excess to the a solution containing a $^{225}$Ac-complexed ligand via CROWN. (Yang et al., Chem. Eur. J. 2020, 26, 11435-11440, Supporting Information)

Example 2

In this example, the effects of temperature and DTPA were tested on formulations, to assess the resulting stability as assessed by the radiochemical purity.

An unlabeled conjugate corresponding to Formula 4, with L being a bond (e.g. CROWN-TATE) was radiolabeled with $^{225}$Ac in solution using the reaction conditions in Table 9 below.

TABLE 9

| Reaction conditions | |
| --- | --- |
| Molar activity | 0.2 MBq/nmol |
| RAC | 10 MBq/mL |
| pH buffer | 0.2M NaOAc, 10% EtOH |
| Time/Temp | 20 min, RT |

Following radiolabeling, the $^{225}$Ac-radiolabeled CROWN-TATE was formulated into a liquid aqueous composition including sodium ascorbate, ethanol and saline, such as according to the formulation in Table 10 below.

TABLE 10

| Formulation | |
| --- | --- |
| RAC | 0.5 MBq/nmol |
| pH buffer | 400 mM sodium ascorbate |
| | Saline |
| | 10% EtOH |

The radiochemical purity (RCP) of the $^{225}$Ac-radiolabeled CROWN-TATE was determined by iTLC (thin layer chromatography) using the following parameters in Table 11 below.

TABLE 11

| iTLC method | |
| --- | --- |
| Stationary phase | iTLC-SA |
| Mobile phase | 0.1M Sodium Citrate (5% MeOH) |

The RCP results as determined by TLC for the formulations are provided in Table 12 below.

TABLE 12

| Experiment | RCP @ EOS | Storage Temp. | DTPA (eq) | 3 h | 1 d Stability | 2 d Stability | 5 d Stability |
| --- | --- | --- | --- | --- | --- | --- | --- |
| A | >99% | RT | — | >99% ± 0.1 | 98.7 ± 0.1 | 97.2 ± 0.1 | 88.7 ± 0.8 |
| B | | −20° C. | — | — | >99% ± 0.1 | >99% ± 0.1 | >99% ± 0.1 |
| C | | RT | 10 | >99% | 98% | 95% | 83% |
| | | | 100 | >99% | 98% | 96% | 83% |
| | | | 1000 | >99% | 98% | 98% | 86% |
| D | | −20° C. | 10 | — | >99% | >99% | >99% |
| | | | 100 | — | >99% | >99% | >99% |
| | | | 1000 | — | >99% | >99% | >99% |

Figure 3A:
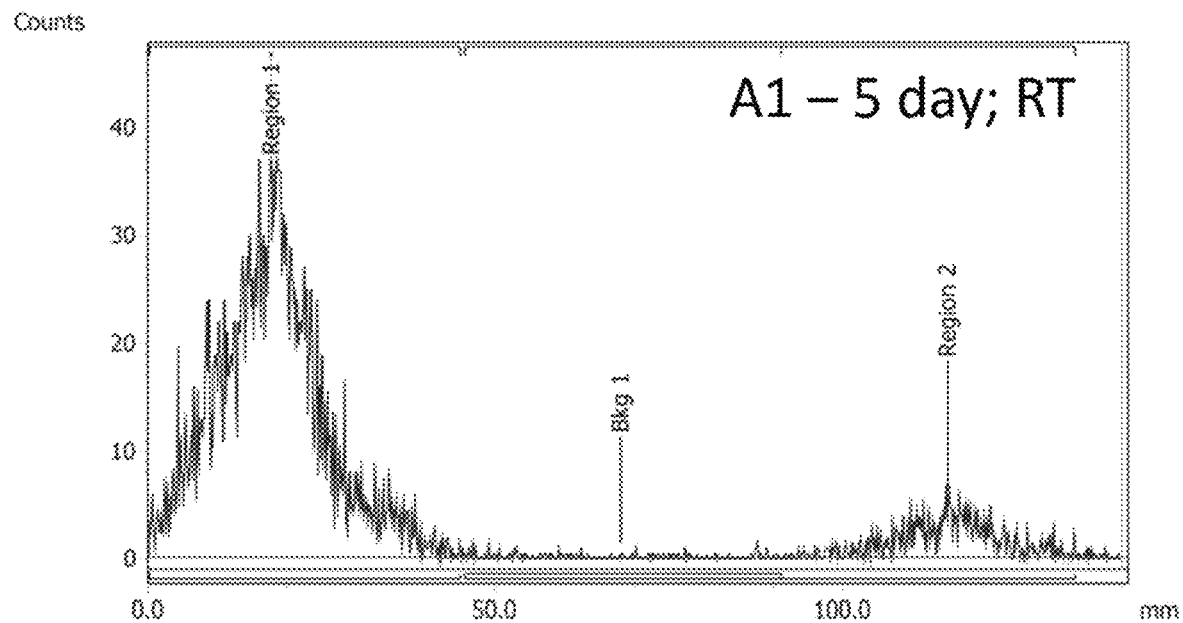
FIGS. 3A-3B show TLC data for radiolabeled CROWN-TATE formulations containing ascorbate but no gentisic acid or DTPA, comparing a formulation stored for 5 days at room temperature (A) with a formulation stored for 5 days at −20° C. (B), as described in Example 2 below.
Figure 3B:
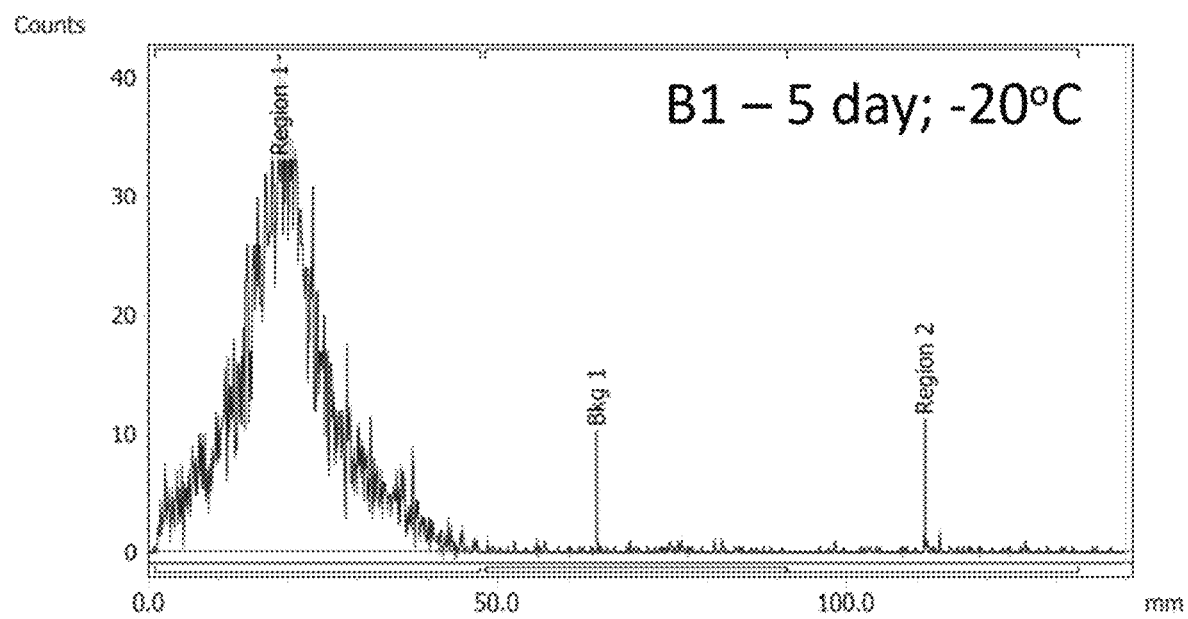

As can be seen from Table 12, the stability of the formulations at −20° C. was superior to room temperature stability (compare Experiment A at room temperature, about 88.7% RCP, to Experiment B at −20° C., greater than 99% RCP). FIGS. 3A-3B show the TLC data comparing stability at room temperature after 5 days for Experiment A (FIG. 3A) with stability at −20° C. after 5 days for Experiment B (FIG. 3B).

Figure 4A:
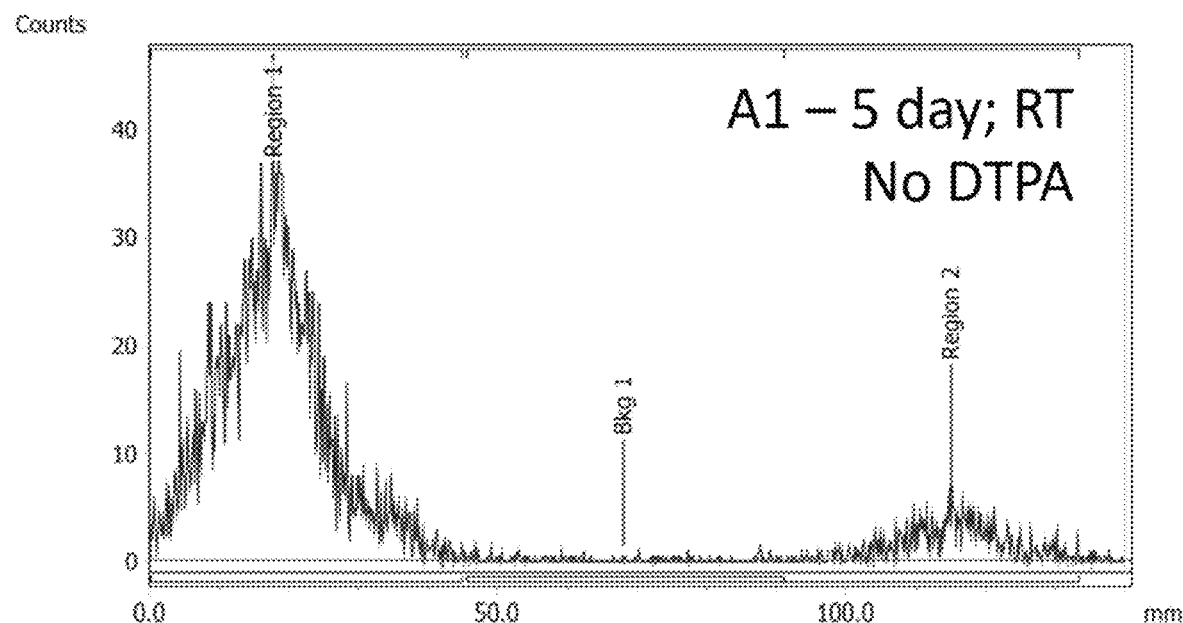
FIGS. 4A-4B show TLC data for radiolabeled CROWN-TATE formulations stored for 5 days at room temperature, comparing a formulation without any DTPA (A) with a formulation having 10 eq DTPA (B), as described in Example 2 below.
Figure 4B:
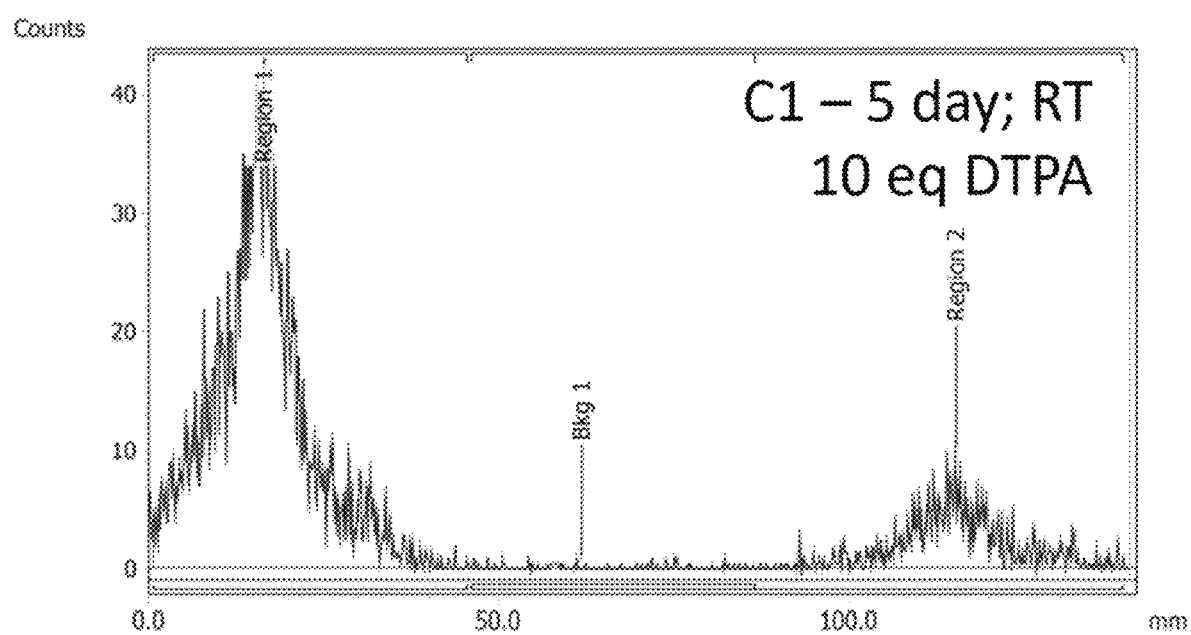

Comparison of Experiment A with Experiment C shows that DTPA is slightly detrimental to stability when stored at room temperature. FIGS. 4A-4B show the TLC data comparing the stability without DTPA (FIG. 4A) and with DTPA (FIG. 4B) after storing for 5 days at room temperature, with an RCP of about 88.7% for the composition without DTPA, and 83%-86% for the composition with DTPA.

Figure 5A:
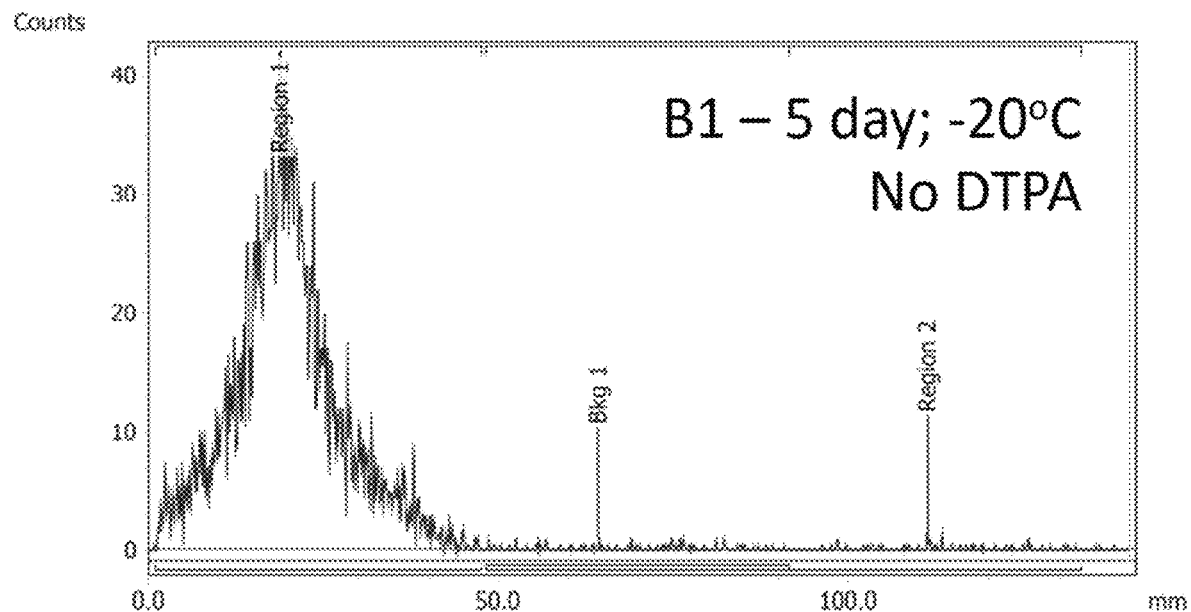
FIGS. 5A-5B show TLC data for radiolabeled CROWN-TATE formulations stored for 5 days at −20° C., comparing a formulation without any DTPA (A) with a formulation having 10 eq DTPA (B), as described in Example 2 below.
Figure 5B:
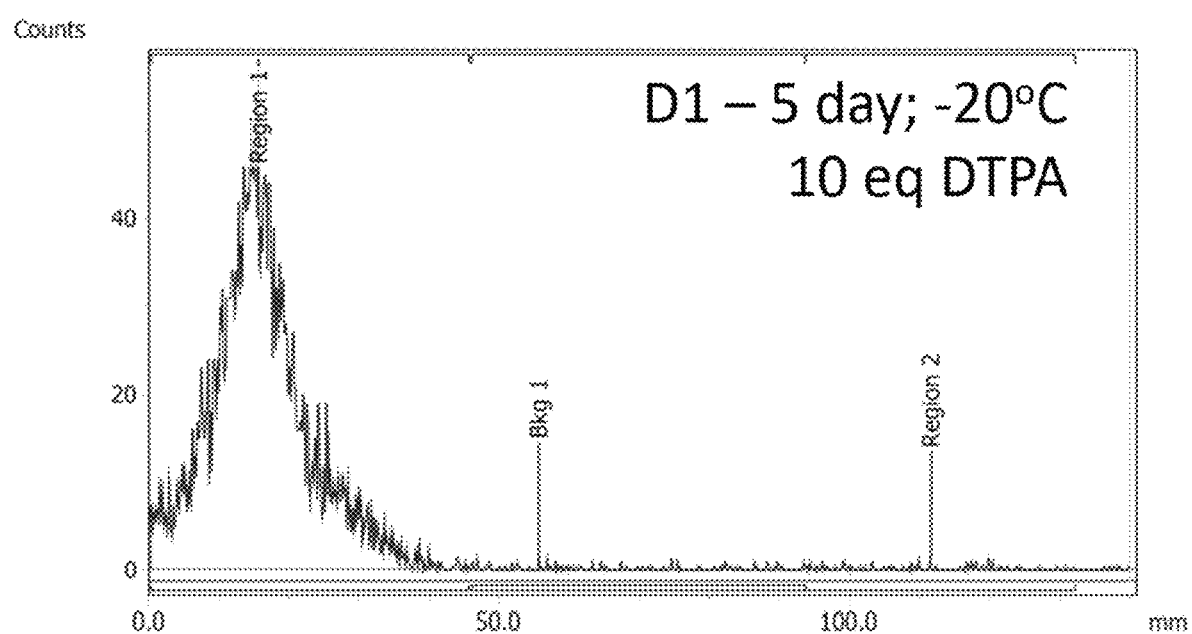

In contrast, comparison of Experiment B with Experiment D shows that the addition is DTPA does not appear to be detrimental with the formulation is stored at −20° C. (compare Experiment B with no DTPA, to Experiment D with various quantities of DTPA). FIGS. 5A-5B show the TLC data comparing the stability without DTPA (FIG. 5A) and with DTPA (FIG. 5B) after storing for 5 days at −20° C., with an RCP of greater than 99% for the composition without DTPA, and also greater than 99% for the composition with 10 eq DTPA.

Accordingly, the results show that the stability at −20° C. is similar for compositions not having DTPA as well as those having DTPA. This is in contrast to the dissociation that has been reported in the presence of competing free metal scavenger DTPA over a period 7 hours at room temperature (Yang et al., *Chem. Eur. J.* 2020, 26, 11435-11440, Supporting Information). As DTPA and other chelators provide advantages in sequestering free metals to facilitate their excretion in vivo, the ability to provide stable formulations containing DTPA can impart significant advantages.

Example 3

In this example, the effects of ethanol on various formulations with and without DTPA, to determine the resulting stability as assessed by the radiochemical purity. An unlabeled conjugate corresponding to Formula 4, with L being a bond (e.g. CROWN-TATE) was radiolabeled with $^{225}$Ac in solution using the reaction conditions in Table 13 below.

TABLE 13

| Reaction conditions | |
| --- | --- |
| Molar activity | 1 MBq/nmol |
| RAC | 10 MBq/mL |
| pH buffer | 0.2M NaOAc, 10% EtOH |
| Time/Temp | 20 min, RT |

Following radiolabeling, the $^{225}$Ac-radiolabeled CROWN-TATE was formulated into a liquid aqueous composition including sodium ascorbate, saline, and ethanol, such as according to the formulation in Table 14 below.

TABLE 14

| Formulation | |
| --- | --- |
| RAC | 0.5 MBq/nmol |
| pH buffer | 400 mM sodium ascorbate |
| | Saline |
| | (initially without EtOH, 10% EtOH was added after 1 d when low RCP was observed and precipitation was suspected) |

The radiochemical purity (RCP) of the $^{225}$Ac-radiolabeled CROWN-TATE was determined by iTLC (thin layer chromatography) using the following parameters in Table 15 below.

TABLE 15

| iTLC method | |
| --- | --- |
| Stationary phase | iTLC-SA |
| Mobile phase | 0.1M Sodium Citrate (5% MeOH) |

The RCP results as determined by TLC for the formulations are provided in Table 16 below. Notably, the ethanol was added after it became apparent that the formulations without ethanol exhibited precipitation of the radiolabeled compound.

TABLE 16

| Rxn Set | DTPA (eq) | EtOH | Crude | EOS | 4 h | 1 d |
| --- | --- | --- | --- | --- | --- | --- |
| 1 (n = 2) | 0 | — | >99% | >99% | 72 ± 5% | 45 ± 5% |
| | | 10% | | | | 75 ± 17% |

TABLE 16-continued

| Rxn Set | DTPA (eq) | EtOH | Crude | EOS | 4 h | 1 d |
|---|---|---|---|---|---|---|
| | 100 | — | | 85 ± 10% | 74 ± 13% | 70 ± 16% |
| | | 10% | | | | 74 ± 19% |

As can be seen from the above, the addition of ethanol improves the compound solubility and thus also the RCP. Notably, these experiments did not involve addition of ethanol initially with the formulation buffer, as the ethanol was only added after precipitation of the radiolabeled conjugate became apparent. The stability of the formulation may thus be even higher if ethanol were to be added with the initial buffer. Also, the RCP quantification without ethanol is not believed to be entirely representative due to this precipitation of the conjugate.

Figure 6A:
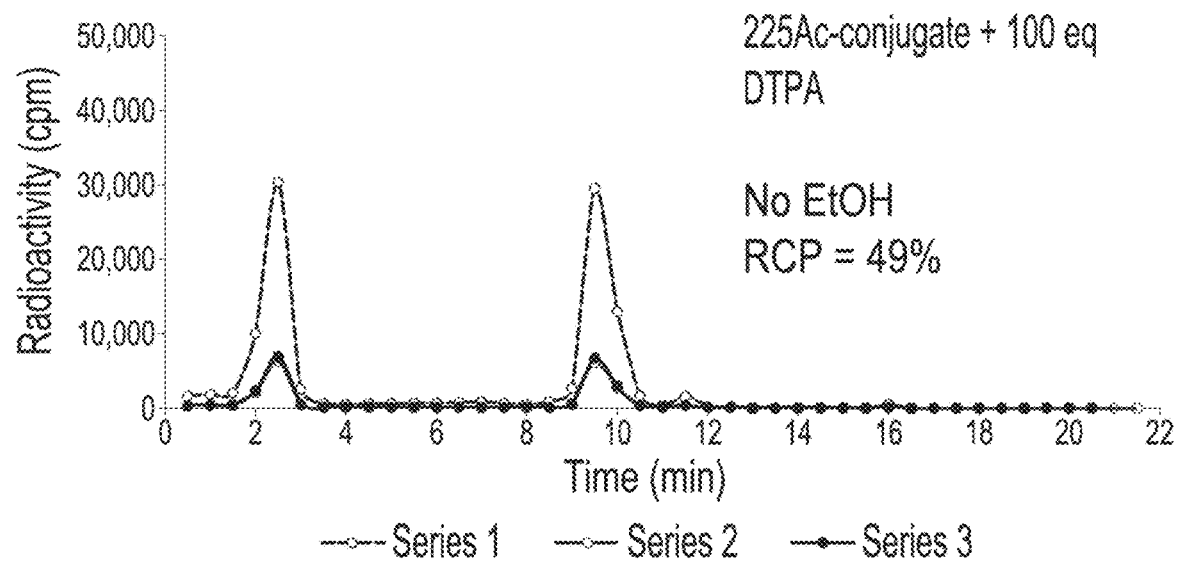
FIGS. 6A-6B show HPLC data for radiolabeled CROWN-TATE formulations at room temperature, comparing a formulation without ethanol (A) with a formulation having 10% ethanol (B), as described in Example 3 below.
Figure 6B:
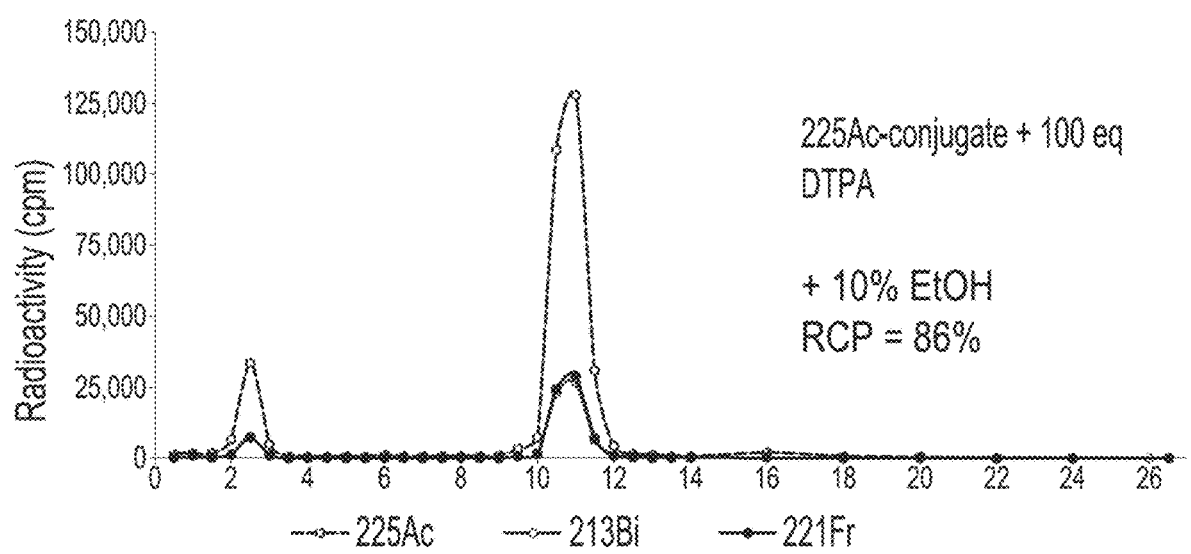

Preliminary studies with HPLC quantification (HPLC: Luna, 40 mM NH$_4$COOH pH 4.8, gradient (5-95% B, 20 mins) on a composition prepared with 1 MBq/nmol radiolabeled conjugate, 400 mM ascorbate at pH 5-6, 100 eq of DTPA, and saline, at room temperature, also showed a 37% increase in RCP after 24 hours following addition of ethanol (10%). Results for the formulation with ethanol (FIG. 6B) and without ethanol (FIG. 6A) are shown in FIGS. 6A-6B.

Example 4

In this example, exemplary formulations of 225Ac-labeled CROWN-TATE are provided, with their resulting stability assessed by the radiochemical purity. An unlabeled conjugate corresponding to Formula 4, with L being a bond (e.g. CROWN-TATE) was radiolabeled with $^{225}$Ac in solution using the reaction conditions in Table 17 below.

TABLE 17

| Reaction conditions | |
|---|---|
| Molar activity | 1 MBq/nmol |
| RAC | 10 MBq/mL |
| pH buffer | 0.2M NaOAc, 10% EtOH |
| Time/Temp | 20 min, RT |

Following radiolabeling, the $^{225}$Ac-radiolabeled CROWN-TATE was formulated into liquid aqueous compositions including water and ethanol (pH buffer 1); water, ethanol and sodium ascorbate (pH buffer 2); and water, ethanol, sodium ascorbate and DTPA (pH buffer 3), according to the formulation in Table 18 below. The formulations were also frozen for 5 days at −20° C.

TABLE 18

| Formulation | |
|---|---|
| RAC | 1 MBq/mL |
| pH buffer 1 | Water |
| | 10% EtOH |
| pH buffer 2 | 250 mM sodium ascorbate |
| | 10% EtOH |
| | Water |
| pH buffer 3 | 250 mM sodium ascorbate |
| | 0.25 mM DTPA |
| | 10% EtOH |
| | Water |

The radiochemical purity (RCP) of the $^{225}$Ac-radiolabeled CROWN-TATE was determined by iTLC (thin layer chromatography) using the following parameters in Table 19 below.

TABLE 19

| iTLC method | |
|---|---|
| Stationary phase | iTLC-SA |
| Mobile phase | 0.1M Sodium Citrate (5% MeOH) |

The radiochemical purity (RCP) of the $^{225}$Ac-radiolabeled CROWN-TATE was also determined by HPLC (High Performance Liquid Chromatography) using the following parameters in Table 20 below.

TABLE 20

| HPLC Method | |
|---|---|
| Stationary phase | Aeris Column |
| Mobile phase | Mobile Phase A: 40 mM NH$_4$COOH pH 4.8/ Mobile Phase B: CH$_3$CN |
| Gradient | 0-1 min, 5% CH$_3$CN; 1-21 min, 5-95% CH$_3$CN; 21-23 min, 95% CH$_3$CN; 23-23.5 min, 95-5% CH$_3$CN; 23.5-27 min, 5% CH$_3$CN |

The RCP results as determined by TLC and HPLC for the formulations are provided in Table 21 below.

TABLE 21

| | | EOS | | 1 d (rt) | | 3 d (rt) | | 5 d (rt) | | 5 d (−20° C.) | |
|---|---|---|---|---|---|---|---|---|---|---|---|
| | Code | TLC | HPLC | TLC | HPLC | TLC | HPLC | TLC | HPLC | TLC | HPLC |
| *Control (n = 1) | C/D | <1% | 0% | <1% | 0% | — | — | — | *0% | — | N/A |
| 10% EtOH | S1/A | >99% | 96% | >99% ± 0.1 | 93% | — | — | **>99% ± 0.1 | *84% | 99.4% ± 0.2 | *94% |
| 10% EtOH 250 mM ascorbate | S2/B | >99% | 97% | 96.9% ± 0.4 | 94% | — | — | 78.8% ± 0.4 | *88% | 98.8% ± 0.1 | *94% |
| 10% EtOH 250 mM ascorbate 0.25 mM DTPA | S3/C | >99% | 98% | 97.0% ± 0.3 | 94% | — | 89% | 82% ± 1.2 | *90% | 98.6% ± 0.5 | *95% |

*Contaminated test tubes due to HPLC collection issues
**Added DTPA to TLC sample, RCP ~97-98%

As can be seen from the above, the buffers 1-3 provided excellent RCP at 5 days, for samples frozen at −20° C.

The above testing was repeated for formulations prepared according to the reaction conditions specified in Table 22 below, using the formulations of Table 18 above (including freezing at −20° C. for 5 days), and TLC and HPLC parameters in Tables 19 and 20 above.

TABLE 22

| Reaction conditions | |
| --- | --- |
| Molar activity | 0.2 MBq/nmol |
| RAC | 10 MBq/mL |
| pH buffer | 0.2M NaOAc, 10% EtOH |
| Time/Temp | 20 min, RT |

The RCP results as determined by TLC and HPLC for the formulations prepared using the reaction conditions of Table 22 are provided in Table 23 below.

TABLE 23

| | | EOS | | 1 d (rt) | | 3 d (rt) | | *5-6 d (rt) | | *5-6 d (−20° C.) | |
| --- | --- | --- | --- | --- | --- | --- | --- | --- | --- | --- | --- |
| | Code | TLC | HPLC | TLC | HPLC | TLC | HPLC | TLC | HPLC | TLC | HPLC |
| Control (n = 1) | C/D | <1% | 0% | <1% | 0% | — | — | — | 0% | — | — |
| 10% EtOH | S1/A | >99% | 94% | >99% ± 0.1 | 94% | — | — | >99% ± 0.1 | 86% | >99% ± 0.1 | 92% |
| 10% EtOH 250 mM ascorbate | S2/B | >99% | 96% | >97.6% ± 0.2 | 95% | — | — | 80.6% ± 2.5 | 80% | 99.2% ± 0.1 | 95% |
| 10% EtOH 250 mM ascorbate 0.25 mM DTPA | S3/C | >99% | 98% | >97.1% ± 0.4 | 96% | — | — | 79.4% ± 1.2 | 84% | 99.5% ± 0.1 | 98% |

As can be seen from Table 23, the different formulations provide excellent stability as determined by the RPC.

Example 5

In this example the effects of pH and storage temperature on product stability were assessed. An unlabeled conjugate corresponding to Formula 4, with L being a bond (e.g. CROWN-TATE) was radiolabeled with $^{225}$Ac in solution using the reaction conditions in Table 24 below.

TABLE 24

| Reaction conditions | |
| --- | --- |
| Molar activity | 3 MBq/nmol |
| RAC | 10 MBq/mL |
| pH buffer | 0.4M NaOAc, 10% EtOH |
| Time/Temp | 20 min, RT |

Following radiolabeling, the $^{225}$Ac-radiolabeled CROWN-TATE was formulated into liquid radiopharmaceutical compositions including water, ethanol, sodium ascorbate and DTPA and either some volume of 1 M of HCl or NaOH to achieve the desired pH for pH 4-8 buffers, such as according to the formulation in Table 25 below. The formulations were assessed at room temperature and 2-8° C. at days 0, 1 and 5. Additionally frozen samples at −20° C. were also assessed at day 5.

TABLE 25

| Formulation | |
| --- | --- |
| RAC | 2 MBq/mL |
| pH 4 buffer | 0.25 mM DTPA, 10% EtOH + NaOAsc (100 mM) + water + 1M HCl (640 μL) |
| pH 5 buffer | 0.25 mM DTPA, 10% EtOH + NaOAsc (100 mM) + water + 1M HCl (175 μL) |
| pH 6 buffer | 0.25 mM DTPA, 10% EtOH + NaOAsc (100 mM) + water + 1M HCl (10 μL) |
| pH 7 buffer | 0.25 mM DTPA, 10% EtOH + NaOAsc (100 mM) + water + 1M NaOH (15 μL) |
| pH 8 buffer | 0.25 mM DTPA, 10% EtOH + NaOAsc (100 mM) + water + 1M NaOH (33 μL) |

The radiochemical purity (RCP) of the $^{225}$Ac-radiolabeled CROWN-TATE was determined by iTLC (thin layer chromatography) using the following parameters in Table 26 below.

TABLE 26

| iTLC method | |
| --- | --- |
| Stationary phase | iTLC-SA |
| Mobile phase | 0.1M Sodium Citrate (5% MeOH) |

The RCP results as determined by TLC for the formulations are provided in Table 27 below.

TABLE 27

| | FDP pH 4 | | | FDP pH 5 | | | FDP pH 6 | | | FDP pH 7 | | | FDP pH 8 | | |
|---|---|---|---|---|---|---|---|---|---|---|---|---|---|---|---|
| Reaction at end of synthesis (EOS) RCP pH | 99.96 | | | | | | | | | | | | | | |
| Storage temperature | RT | 2-8° C. | −20° C. | RT | 2-8° C. | −20° C. | RT | 2-8° C. | −20° C. | RT | 2-8° C. | −20° C. | RT | 2-8° C. | −20° C. |
| Day 0 | 96.0 | 96.0 | N/A | 98.5 | 98.5 | N/A | 98.8 | 98.77 | N/A | 98.71 | 98.71 | N/A | 99.12 | 99.12 | N/A |
| Day 1 | 21.98 | 44.33 | N/A | 84.62 | 88.01 | N/A | 91.8 | 98.72 | N/A | 97.82 | 99.9 | N/A | 99.61 | 98.55 | N/A |
| Day 5 | 0.62 | 3.38 | 86.15 | 7.64 | 56.97 | 95.0 | 60.8 | 91.96 | 99.08 | 89.09 | 97.65 | 99.56 | 86.31 | 99.05 | 98.03 |

The data above demonstrate that final drug products (FDPs) in formulation buffers at pH 6-8, stored at 2-8° C. and −20° C., maintained excellent RCP after 5 days. In contrast, all FDPs stored at room temperature exhibited RCP less than 90% at Day 5. FDPs in formulation buffers at pH 4 and 5 showed a significant decrease in RCP, with RCP less than 90% at Day 5 for all storage conditions, except for pH 5 at −20° C.

Example 6

In this example the effects of pH and thaw over time of the FDP stability stored at −20° C. storage temperature on product stability were assessed. An unlabeled conjugate corresponding to Formula 4, with L being a bond (e.g. CROWN-TATE) was radiolabeled with $^{225}$Ac in solution using the reaction conditions in Table 28 below.

TABLE 28

| Reaction conditions | |
|---|---|
| Molar activity | 3 MBq/nmol |
| RAC | 10 MBq/mL |
| pH buffer | 0.4M NaOAc, 10% EtOH |
| Time/Temp | 20 min, RT |

Following radiolabeling, the $^{225}$Ac-radiolabeled CROWN-TATE was formulated into liquid radiopharmaceutical compositions including water, ethanol, sodium ascorbate and DTPA and either some volume of 1 M of HCl or NaOH to achieve the desired pH for pH 4-8 buffers, such as according to the formulation in Table 29 below. The formulations were stored at −20° C. for 5 days, the samples were left to that at room temperature and the RCP was monitored at 1, 3, 6 and 24 h post thaw by TLC. The RCP results as determined by TLC are displayed in Table 31 below.

TABLE 29

| Formulation | |
|---|---|
| RAC | 2 MBq/mL |
| pH 4 buffer | 0.25 mM DTPA, 10% EtOH + NaOAsc (100 mM) + water + 1M HCl (640 μL) |
| pH 5 buffer | 0.25 mM DTPA, 10% EtOH + NaOAsc (100 mM) + water + 1M HCl (175 μL) |
| pH 6 buffer | 0.25 mM DTPA, 10% EtOH + NaOAsc (100 mM) + water + 1M HCl (10 μL) |
| pH 7 buffer | 0.25 mM DTPA, 10% EtOH + NaOAsc (100 mM) + water + 1M NaOH (15 μL) |

TABLE 29-continued

| Formulation | |
|---|---|
| RAC | 2 MBq/mL |
| pH 8 buffer | 0.25 mM DTPA, 10% EtOH + NaOAsc (100 mM) + water + 1M NaOH (33 μL) |

The radiochemical purity (RCP) of the $^{225}$Ac-radiolabeled CROWN-TATE was determined by iTLC (thin layer chromatography) using the following parameters in Table 30 below.

TABLE 30

| iTLC method | |
|---|---|
| Stationary phase | iTLC-SA |
| Mobile phase | 0.1M Sodium Citrate (5% MeOH) |

The frozen −20° C. samples from the above experiments were thawed and the RCP was monitored at 1, 3, 6 and 24 h post thaw by TLC. The RCP results as determined by TLC are displayed in Table 31 below.

TABLE 31

| pH | FDP pH 4 | FDP pH 5 | FDP pH 6 | FDP pH 7 | FDP pH 8 |
|---|---|---|---|---|---|
| 0 h post thaw | 86.15 | 95.0 | 99.08 | 99.56 | 98.03 |
| 1 h post thaw | 82.93 | 93.25 | 97.17 | 99.12 | 99.07 |
| 3 h post thaw | 44.59 | 89.64 | 97.81 | 99.07 | 99.07 |
| 6 h post thaw | 21.96 | 83.54 | 96.59 | 99.52 | 99.42 |
| 24 h post thaw | 2.45 | 52.81 | 82.58 | 88.47 | 88.07 |

As shown in Table 31, formulations at pH 6-8 exhibit excellent stability, with RCP greater than 90% up to 6 hours post thaw. However, by 24 hours post thaw, RCP decreases to less than 90%. Formulations at pH 5 maintain RCP greater than 90% only up to 1 hour post thaw, while formulations at pH 4 show RCP less than 90% even at 0 hours post thaw.

Example 7

In this example the effects of pH on CROWN-MC1R product stability stored for 7 days at a temperature below −15° C. storage temperature followed by 4 hours at room temperature were assessed. An unlabeled conjugate corresponding to CROWN-MC1R (shown below) was radiolabeled with $^{225}$Ac in solution in two separate reactions using the reaction conditions in Table 32 and Table 33 below.

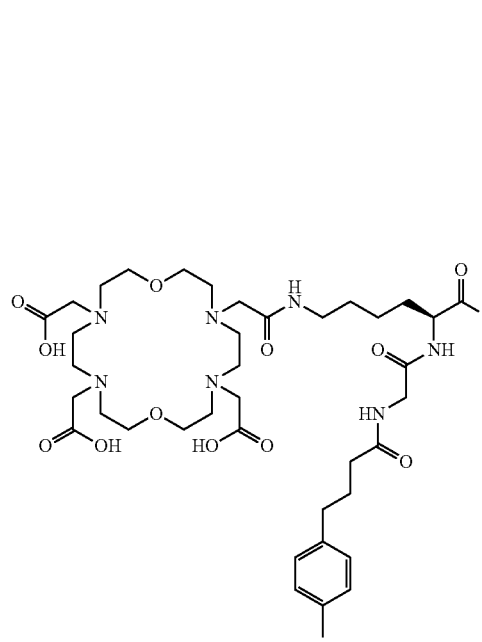
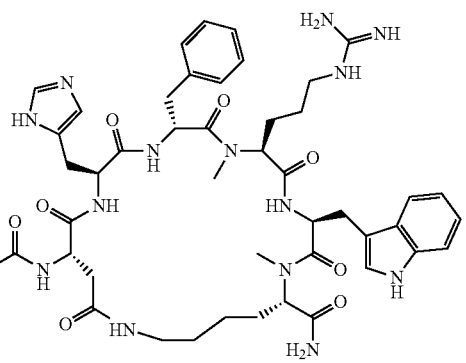

CROWN-MC1R

TABLE 32

225Ac-radiolabeled CROWN-MC1R Reaction conditions #1

| | |
|---|---|
| Molar activity | 3.25 MBq/nmol |
| RAC | 10 MBq/mL |
| Ingredients | 0.25M NaOAc, 10% EtOH, 6.5 mM sodium gentisate |
| Time/Temp | 20 min, 25° C. |

TABLE 33

225Ac-radiolabeled CROWN-MC1R Reaction conditions #2

| | |
|---|---|
| Molar activity | 3.25 MBq/nmol |
| RAC | 10 MBq/mL |
| Ingredients | 0.44M NaOAc, 10% EtOH, 6.5 mM sodium gentisate |
| Time/Temp | 20 min, 25° C. |

Following radiolabeling, the 225Ac-radiolabeled CROWN-MC1R Reaction conditions #1 was formulated into liquid radiopharmaceutical compositions comprising water, ethanol, sodium ascorbate, and DTPA and NaOH to achieve the final drug product (FDP) formulation in Table 34 below.

TABLE 34

225Ac-radiolabeled CROWN-MC1R Formulation #1

| | |
|---|---|
| RAC | 2 MBq/mL |
| Buffer | 0.05M NaOAc, 6% EtOH, 1.3 mM sodium gentisate, 100 mM sodium ascorbate, 0.05 mg/mL DTPA |
| FDP pH | 5.8 |

Following radiolabeling, the 225Ac-radiolabeled CROWN-MC1R Reaction conditions #2 was formulated into liquid radiopharmaceutical compositions comprising water, ethanol, sodium ascorbate, and DTPA and sodium phosphate to achieve the FDP formulation in Table 35 below.

TABLE 35

225Ac-radiolabeled CROWN-MC1R Formulation #2

| | |
|---|---|
| RAC | 2 MBq/mL |
| Buffer | 0.09M NaOAc, 6% EtOH, 1.3 mM sodium gentisate, 100 mM sodium ascorbate, 0.05 mg/mL DTPA, 8.4 mM Sodium phosphate |
| FDP pH | 6.8 |

The radiochemical purity (RCP) of 225Ac-radiolabeled CROWN-MC1R Formulation 1 and 225Ac-radiolabeled CROWN-MC1R Formulation 2 was determined by iTLC (thin layer chromatography) using the following parameters in Table 36 below.

TABLE 36 iTLC method

| | |
|---|---|
| Stationary phase | iTLC-SG |
| Mobile phase | 100 mM Citrate, pH 5.5 |

225Ac-radiolabeled CROWN-MC1R Formulation 1 and 225Ac-radiolabeled CROWN-MC1R Formulation 2 were stored at a temperature below −15° C. for 7 days plus 2 hours or longer at room temperature. The RCP was monitored on Day 0 and Day 7 plus 2 hours or longer at room temperature. RCP results as determined by TLC are displayed in Table 37 below.

TABLE 37

|  | $^{225}$Ac-radiolabeled CROWN-MC1R Formulation #1 | $^{225}$Ac-radiolabeled CROWN-MC1R Formulation #2 |
| --- | --- | --- |
| Day 0 | 99% | 99% |
| Day 7 (below −15° C.) + 6 hours room temperature | 96% | 98%* |

*Day 7 (below −15° C.) + 2 hours room temperature

As shown in Table 37, $^{225}$Ac-radiolabeled CROWN-MC1R Formulation #1 and Formulation #2 shows stability greater than 95% as measured by radio-iTLC at both Day 0 and Day 7 plus at least 2 hours at room temperature.

```
                        SEQUENCE LISTING

Sequence total quantity: 10
SEQ ID NO: 1            moltype = AA  length = 8
FEATURE                 Location/Qualifiers
source                  1..8
                        mol_type = protein
                        organism = synthetic construct
SEQUENCE: 1
FCFWKTCT                                                                 8

SEQ ID NO: 2            moltype = AA  length = 8
FEATURE                 Location/Qualifiers
source                  1..8
                        mol_type = protein
                        organism = synthetic construct
SEQUENCE: 2
FCYWKTCT                                                                 8

SEQ ID NO: 3            moltype = AA  length = 8
FEATURE                 Location/Qualifiers
source                  1..8
                        mol_type = protein
                        organism = synthetic construct
SEQUENCE: 3
FCFWKTCT                                                                 8

SEQ ID NO: 4            moltype = AA  length = 8
FEATURE                 Location/Qualifiers
source                  1..8
                        mol_type = protein
                        organism = synthetic construct
SEQUENCE: 4
FCYWKTCT                                                                 8

SEQ ID NO: 5            moltype = AA  length = 8
FEATURE                 Location/Qualifiers
source                  1..8
                        mol_type = protein
                        organism = synthetic construct
SEQUENCE: 5
FCFWKTCT                                                                 8

SEQ ID NO: 6            moltype = AA  length = 8
FEATURE                 Location/Qualifiers
source                  1..8
                        mol_type = protein
                        organism = synthetic construct
SEQUENCE: 6
FCYWKVCT                                                                 8
```

```
SEQ ID NO: 7              moltype = AA  length = 8
FEATURE                   Location/Qualifiers
source                    1..8
                          mol_type = protein
                          organism = synthetic construct
SEQUENCE: 7
FCYFKTCY                                                                        8

SEQ ID NO: 8              moltype = AA  length = 8
FEATURE                   Location/Qualifiers
source                    1..8
                          mol_type = protein
                          organism = synthetic construct
SEQUENCE: 8
FCYFKTCY                                                                        8

SEQ ID NO: 9              moltype = AA  length = 8
FEATURE                   Location/Qualifiers
source                    1..8
                          mol_type = protein
                          organism = synthetic construct
SEQUENCE: 9
FCYFKTCY                                                                        8

SEQ ID NO: 10             moltype = AA  length = 8
FEATURE                   Location/Qualifiers
source                    1..8
                          mol_type = protein
                          organism = synthetic construct
SEQUENCE: 10
FCYWKVCW                                                                        8
```

What is claimed is:

1. A dosage form comprising a frozen aqueous pharmaceutically acceptable composition, the frozen aqueous composition comprising a pH buffer and a radiolabeled conjugate comprising $^{225}$Ac coordinated by a chelator corresponding to Formula I:

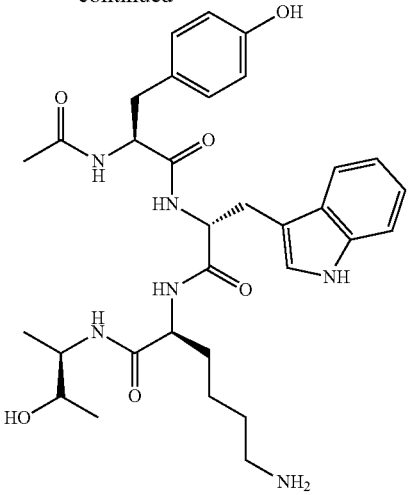

Formula I wherein, upon thawing, the frozen aqueous composition has a pH value in the range of 5-8 and is suitable for intravenous administration, and wherein the frozen aqueous composition has a radiochemical purity (RCP) of at least 95% after 120 hours storage at a temperature of −20° C. as determined by TLC.

2. The dosage form of claim 1, wherein the frozen aqueous composition further comprises one or more stabilizing agents.

3. The dosage form of claim 2, wherein the one or more stabilizing agents comprise a radiolysis stabilizer selected from ethanol, ascorbic acid or a salt thereof, gentisic acid or a salt thereof, or a combination thereof.

4. The dosage form of claim 3, wherein the one or more stabilizing agents comprise ethanol.

5. The dosage form of claim 4, wherein the one or more stabilizing agents comprise ethanol in the amount of 1-20% by volume.

6. The dosage form of claim 3, wherein the one or more stabilizing agents comprise ascorbic acid, or a salt thereof, present in the aqueous composition at a concentration of 1-500 mM or 0.1-100 mg/mL.

7. The dosage form of claim 3, wherein the one or more stabilizing agents comprise gentisic acid, or a salt thereof, present in the aqueous composition at a concentration of 0.1-1000 mM or 0.1-100 mg/mL.

8. The dosage form of claim 2, wherein the one or more stabilizing agents comprise diethylene triamine pentaacetic acid (DTPA) present in the aqueous composition at a concentration of 0.05-1 mM.

9. The dosage form of claim 1, wherein the frozen aqueous composition has a pH value in the range of 5.5-8 upon thawing.

10. The dosage form of claim 1, wherein the frozen aqueous composition has a pH value in the range of 6-8 upon thawing.

11. A method of treating cancer in a subject, wherein the method comprises thawing the dosage form of claim 1 and administering to the subject in need thereof a therapeutically effective amount of the thawed dosage form.

12. The dosage form of claim 1 wherein the frozen aqueous composition consists essentially of saline, pH buffer(s), a radiolabeled conjugate comprising $^{225}$Ac coordinated by a chelator corresponding to Formula I, and a stabilizing agent selected from the group consisting of ethanol, ascorbic acid or a salt thereof, gentisic acid or a salt thereof and combinations thereof.

13. The dosage form of claim 1 wherein the frozen aqueous composition consists essentially of saline, pH buffer(s), a radiolabeled conjugate comprising $^{225}$Ac coordinated by a chelator corresponding to Formula I, and a stabilizing agent selected from the group consisting of (i) ethanol at a concentration of 1-20% by volume, (ii) ascorbic acid or a salt thereof at a concentration of 1-500 mM or 0.1-100 mg/mL, (iii) gentisic acid or a salt thereof at a concentration of 0.1-1000 mM or 0.1-100 mg/mL, and (iv) combinations thereof.

14. A dosage form comprising a frozen aqueous pharmaceutically acceptable composition, the frozen aqueous composition comprising a pH buffer and a radiolabeled conjugate comprising $^{225}$Ac coordinated by a chelator corresponding to Formula I:

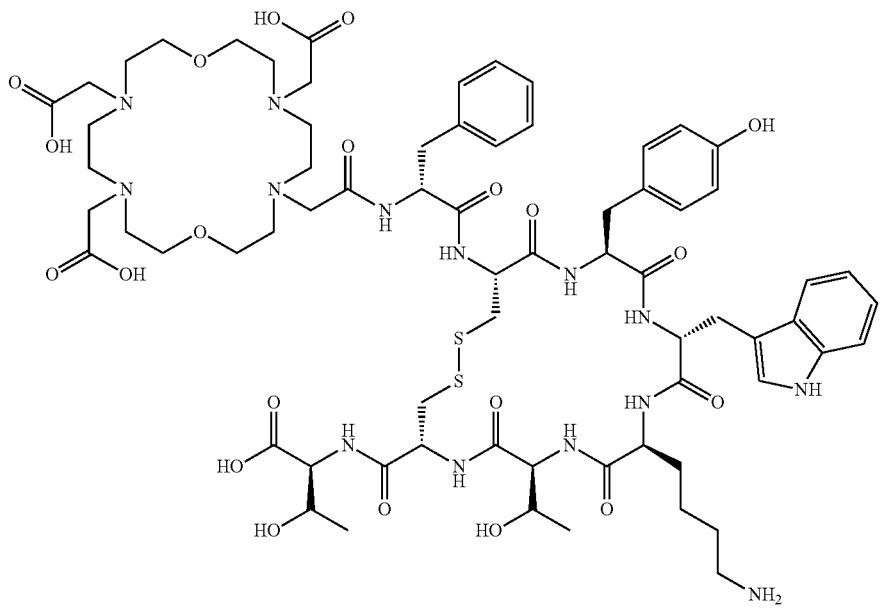

Formula I wherein the frozen aqueous composition has a radiochemical purity (RCP) of at least 95% after 120 hours storage at a temperature of −20° C. as determined by TLC.

15. The dosage form of claim 14 wherein the frozen aqueous composition comprises a stabilizing agent selected from the group consisting of (i) ethanol, (ii) ascorbic acid or a salt thereof, (iii) gentisic acid or a salt thereof, and (iv) combinations thereof.

16. The dosage form of claim 14 wherein the frozen aqueous composition comprises a stabilizing agent selected from the group consisting of (i) ethanol at a concentration of 1-20% by volume, (ii) ascorbic acid or a salt thereof at a concentration of 1-500 mM or 0.1-100 mg/mL, (iii) gentisic acid or a salt thereof at a concentration of 0.1-1000 mM or 0.1-100 mg/mL, and (iv) combinations thereof.

17. The dosage form of claim 14, wherein the frozen aqueous composition comprises a stabilizing agent selected from the group consisting of ethanol, ascorbic acid or a salt thereof, gentisic acid or a salt thereof and combinations thereof, and has a pH value in the range of 5.5-8 upon thawing.

18. The dosage form of claim 14, wherein the frozen aqueous composition comprises a stabilizing agent selected from the group consisting of ethanol, ascorbic acid or a salt thereof, gentisic acid or a salt thereof and combinations thereof, and has a pH value in the range of 6-8 upon thawing.

\* \* \* \* \*